United States Patent
Yamauchi et al.

[19]

[11] Patent Number: 6,047,103
[45] Date of Patent: *Apr. 4, 2000

[54] DATA TRANSMITTER, DATA TRANSMITTING METHOD, DATA RECEIVER, INFORMATION PROCESSOR, AND INFORMATION RECORDING MEDIUM

[75] Inventors: Kazuhiko Yamauchi, Neyagawa; Hiroshi Ueda, Shiki-gun; Masayuki Kozuka, Neyagawa; Yoshihisa Fukushima, Osaka; Makoto Tatebayashi, Takarazuka; Syunji Harada; Koichiro Endo, both of Osaka, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/849,357

[22] PCT Filed: Oct. 4, 1996

[86] PCT No.: PCT/JP96/02900

§ 371 Date: Aug. 11, 1997

§ 102(e) Date: Aug. 11, 1997

[87] PCT Pub. No.: WO97/14249

PCT Pub. Date: Apr. 17, 1997

[30] Foreign Application Priority Data

| Oct. 9, 1995 | [JP] | Japan | 7-261269 |
| Nov. 16, 1995 | [JP] | Japan | 7-298024 |
| Feb. 6, 1996 | [JP] | Japan | 8-019591 |
| Jul. 8, 1996 | [JP] | Japan | 8-177629 |

[51] Int. Cl.[7] .................................................. H04N 5/91
[52] U.S. Cl. ........................... 386/94; 386/5; 360/60
[58] Field of Search ............................ 386/94, 124, 125, 386/126, 111, 112; 360/60; 380/5, 10, 20, 21, 23, 4, 25, 24; 348/7, 13; 340/825.34

[56] References Cited

U.S. PATENT DOCUMENTS

| 5,475,756 | 12/1995 | Merritt | 380/24 |
| 5,574,787 | 11/1996 | Ryan | 380/5 |
| 5,694,381 | 12/1997 | Sako | 369/58 |
| 5,710,674 | 1/1998 | Takei et al. | 360/60 |
| 5,724,475 | 3/1998 | Kirsten | 386/109 |
| 5,778,142 | 7/1998 | Taira et al. | 386/97 |

FOREIGN PATENT DOCUMENTS

| 6-124539 | 5/1994 | Japan . |
| 7-21697 | 1/1995 | Japan . |
| 8-6729 | 1/1996 | Japan . |

*Primary Examiner*—Wendy Garber
*Assistant Examiner*—Christopher Onuaku
*Attorney, Agent, or Firm*—Ratner & Prestia

[57] ABSTRACT

A data transmitting device capable of performing copyright protection processing, when digital data retrieved from the information recording medium is AV data, which includes: an interface section for receiving information specifying the digital data to be output and the data receiving device and for outputting the digital data via the digital interface; a judgment section for judging whether or not the digital data includes video information; an authentication section for authenticating whether not the data receiving device is a proper data receiving device having a function of converting digital data into video data based on authentication data output from the data receiving device; a data retrieval section for retrieving the specified digital data from an external medium; and a control section for controlling the interface section to output the digital data via the digital interface only when the judgment section judges that the digital data includes video information and the authentication section authenticates that the data receiving device is the proper data receiving device. A data transmitting method, a data receiving device, an information processing apparatus, and an information recording medium are also provided.

12 Claims, 31 Drawing Sheets

FIG. 1
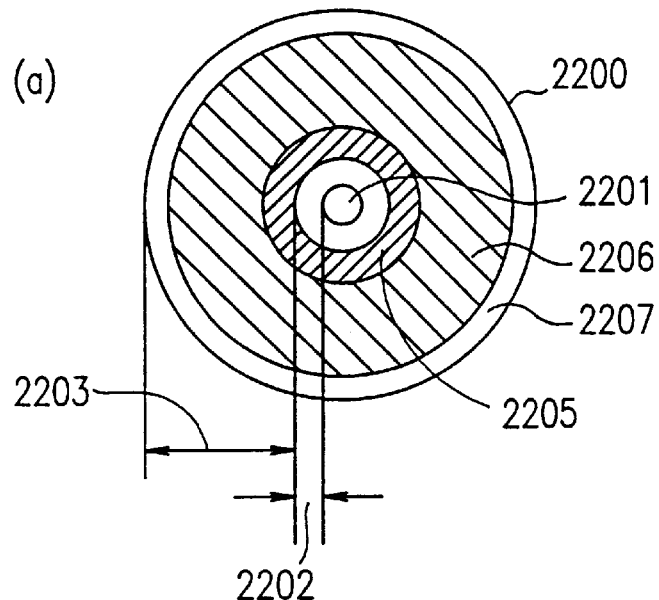
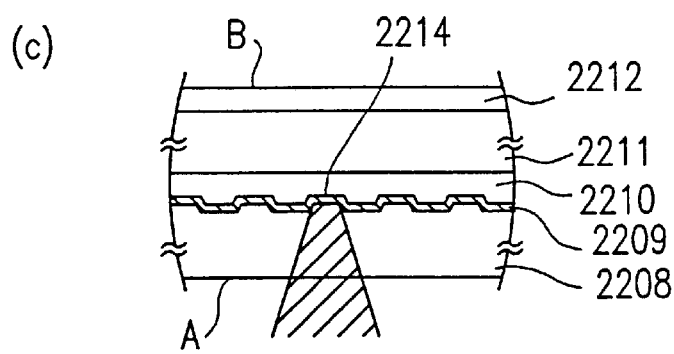
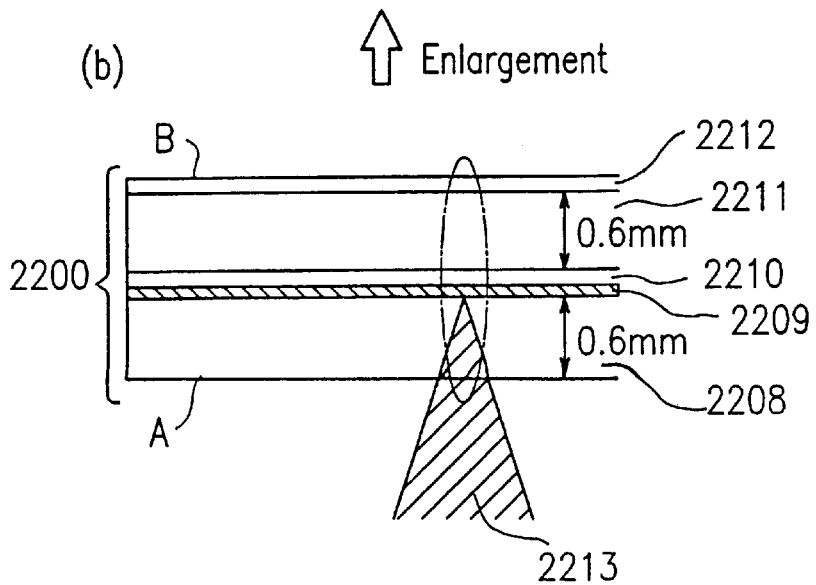

FIG. 3
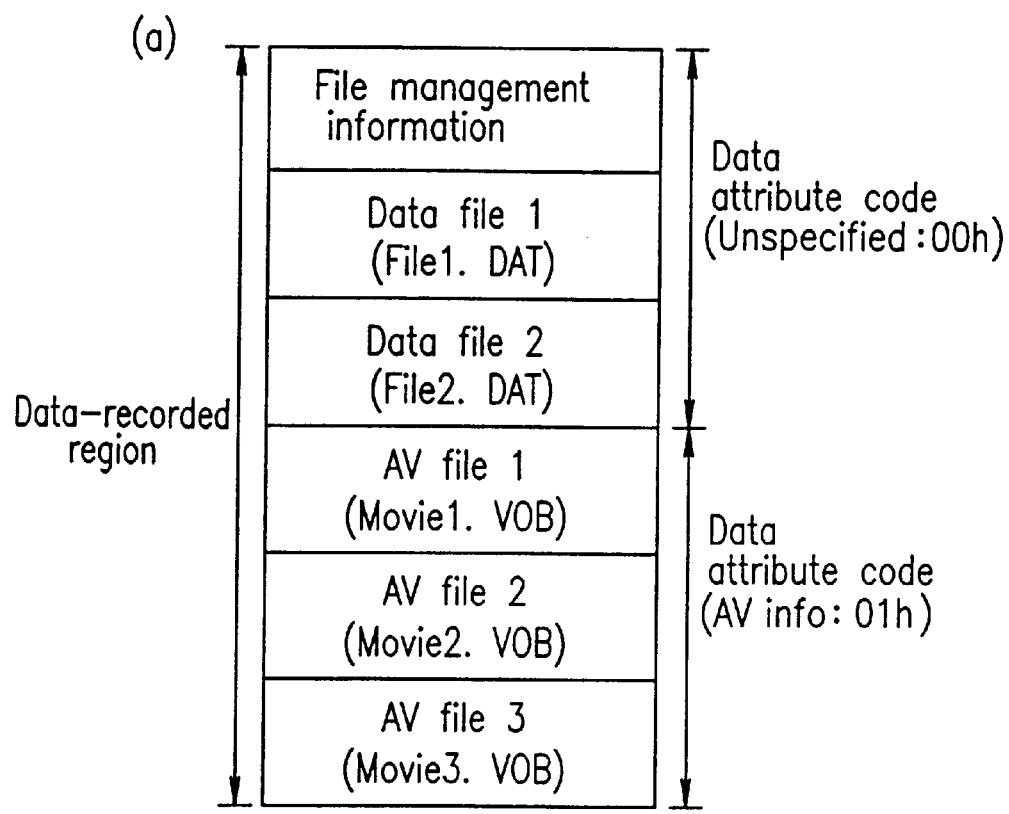
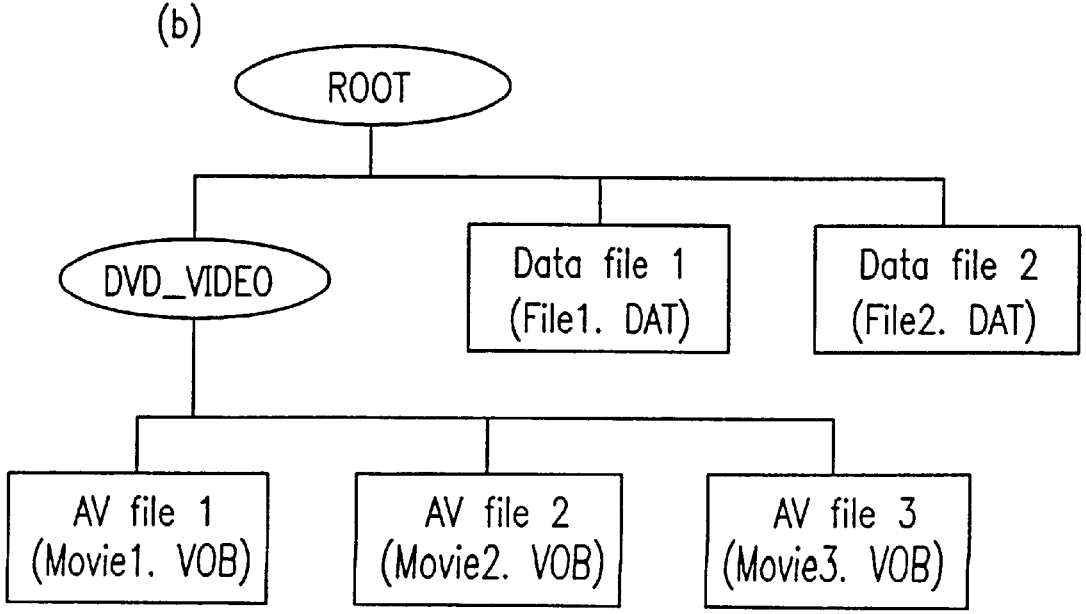

FIG. 4

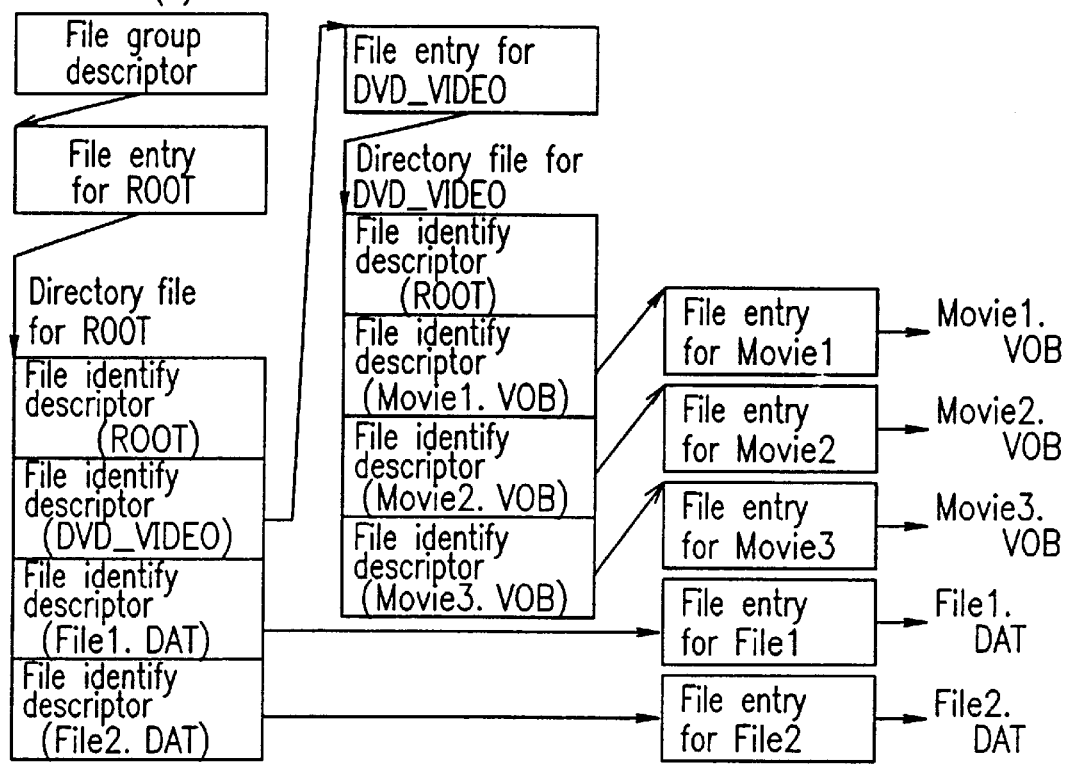

(b)
File identify descriptor for directory

| Management info |
| Identification info (directory) |
| Directory name length |
| File entry address |
| Info for extension |
| Directory name |

| Name rule | Meaning |
|---|---|
| 'DVD_VIDEO' | AV info directory |
| Others | Other directories |

(c)
File identify descriptor for file

| Management info |
| Identification info (file) |
| Directory name length |
| File entry address |
| Info for extension |
| File name |

| Name rule | Meaning |
|---|---|
| Extender is 'VOB' | AV info directory |
| Other extenders | Other directories |

| | 7 | 6 | 5 | 4 | 3 | 2 | 1 | 0 |
|---|---|---|---|---|---|---|---|---|
| 0 | Peripheral device classification code | | | Device type code | | | | |
| 1 | RMB | | Device type modifier | | | | | |
| 2 | Standard version info | | | | | | | |
| 3 | Support info | | Reserved | | Response data type | | | |
| 4 | Added data length (n−4) | | | | | | | |
| 5~n | Added data | | | | | | | |

(b)

| Type code | Device type | |
|---|---|---|
| 00000 | Direct access device | |
| 00001 | Sequential access device | |
| 00010 | Printer device | |
| 00011 | Processor device | |
| 00100 | Write once device | |
| 00101 | CD-ROM device | |
| 00110 | Scanner device | |
| 00111 | Optical memory device | |
| 01000 | Media changer device | |
| 01001 | Communication device | |
| 10101 | AV disk reproduction only device | AV device |
| 10111 | AV disk recording/reproduction device | |
| 10010 | AV signal processing device | |
| 11111 | Undefined device | |
| Others | Reserved | |

FIG.29

| Start sector No. | Number of sectors | CGMS code |
|---|---|---|
| 1001 | 2000 | Copying permitted |
| 10001 | 50000 | Copying inhibited |

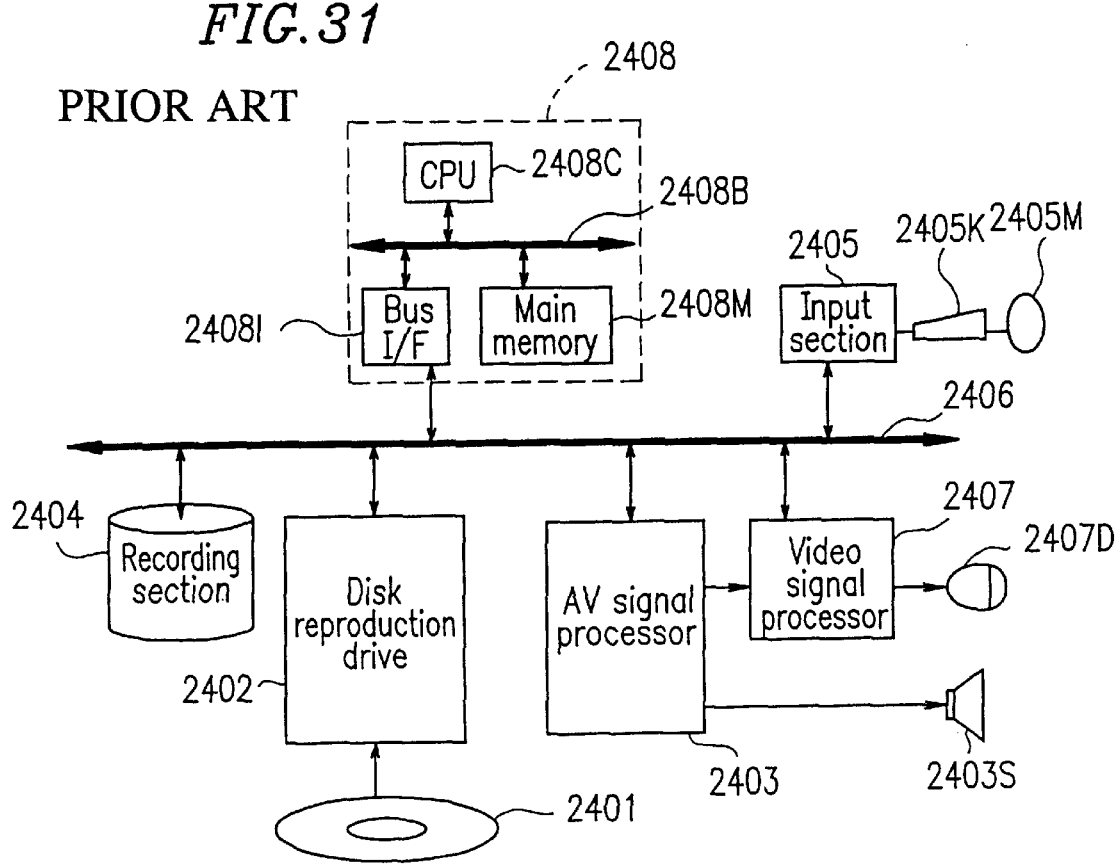

DATA TRANSMITTER, DATA TRANSMITTING METHOD, DATA RECEIVER, INFORMATION PROCESSOR, AND INFORMATION RECORDING MEDIUM

THIS APPLICATION IS A U.S. NATIONAL PHASE APPLICATION OF PCT INTERNATIONAL APPLICATION PCT/JP96/02900.

TECHNICAL FIELD

The present invention relates to an information recording medium for recording an information signal representing at least one of program data, audio information, and video information, data transmitting device/method for retrieving the information signal from the information recording medium, a data receiving device for reproducing a video signal from the retrieved video digital data, and an information processing apparatus including the data transmitting device and the data receiving device.

BACKGROUND ART

A CD-ROM (compact disc read only memory) is known as an information recording medium for program data, audio information, and video information. Such a CD-ROM has an information capacity of 540 MB and is widely used as a distribution medium for program data, audio information, and video information. Information recorded in the CD-ROM is retrieved and processed by a personal computer incorporating a CD-ROM drive, for example.

In recent years, with the enhancement in the processing environments of audio information and video information on personal computers, audio information and video information stored in a CD-ROM can be directly output on a personal computer. When video information is stored in a CD-ROM, it is necessary to conduct digital compression to the video information and to store the compressed video information in the CD-ROM, since the video information has a large amount of data. An MPEG1 (moving picture experts group 1) method, for example, is used as a method for compressing video information where the transfer rate of CD-ROMs of 1.2 Mbps is available. The MPEG1 method employs interframe compression as its main compression principle. Video information is a moving picture composed of still pictures called "several ten frames per second". In the interframe compression, sufficient data for reproducing a still picture is prepared for one frame every several frames. For the remaining frames, only data representing the difference from the frame provided with sufficient data is prepared, thus to compress the required data amount.

In the MPEG1 method, in reality, audio information which is mixed in video information is also compressed together with the video information, generating digital data called an MPEG system stream. It is therefore difficult to unconditionally distinguish the video information from the audio information in the digital data. Such data including video information and audio information as well as information required for reproducing the data mixed therein is often called data having an audio and video (AV) data configuration or AV data. Herein, such data including video information and audio information mixed therein is referred to as "AV data".

In the MPEG1 method, the horizontal resolution of images is on the order of 250 lines. This is not sufficiently high for applications requiring high-quality images such as movie applications. A laser disc (LD) having a horizontal resolution of 430 lines has conventionally been used as a medium for storing such applications requiring high-quality images. The LD however stores video information in an analog form. In recent years, a digital video disk (DVD) has been proposed as a new optical disk which stores data in a digital form so as to be processed by personal computers and has a level of resolution required for movie application. The DVD has an information capacity eight times or more of that of the CD-ROM and realizes a data transmission rate five times or more of that of the CD-ROM. The DVD employs a MPEG2 method as the method for compressing video information which realizes a horizontal resolution of 450 lines or more to obtain high-quality moving pictures required for movie applications.

Hereinbelow, a personal computer incorporating a CD-ROM drive as a conventional information processing apparatus will be described with reference to FIGS. 30 and 31, where AV data stored in the CD-ROM is directly reproduced and output by the personal computer itself.

FIG. 31 is a view showing a configuration of a conventional personal computer having a CD-ROM drive. In FIG. 31, reference numeral 2401 denotes a CD-ROM which records an MPEG stream of AV data managed by a filing system. Reference numeral 2402 denotes a disk reproduction drive which reproduces the optical disk 2401 and outputs digital data of a designated sector number. Reference numeral 2403 denotes an AV signal processor which conducts a predetermined decompressing processing to the MPEG stream, converts it into an analog audio signal and a digital video signal, and outputs the results. The analog audio signal is audibly output via a speaker 2403S.

Reference numeral 2404 denotes a recording section which is a hard disk. Reference numeral 2405 denotes an input section which has a mouse 2405K and a keyboard 2405M and receives instructions form the external. Reference numeral 2406 denotes an I/O bus.

Reference numeral 2407 denotes a video signal processor synthesizes a digital video signal output from the AV signal processor 2403 with a video signal for display generated inside the personal computer and outputs the results as an analog video signal to a display device 2407D. The analog video signal is visually output by the display device 2407D. The video signal processor 2407 is typically a video card. A controller 2408 includes a CPU 2408C, a bus interface (I/F) 2408I, and a main memory 2408M which are connected with one another by a processor bus 2408B. An operating system (OS) program for managing the filing system and a reproduction control program as an application operated on the OS for reproducing AV data in the optical disk 2401 in accordance with the user's instructions are loaded in the controller 2408. A graphic user interface generated according to the reproduction control program loaded in the controller 2408 is displayed on the external display device connected to the AV signal processor 2403.

FIG. 30 is a front view of the display device. Reference numeral 2301 denotes the display device. Reference numeral 2302 denotes a display region. Reference numeral 2303 denotes a MPEG moving picture display region. Reference numeral 2304 denotes a control panel display region. Reference numeral 2305 denotes a graphic for providing a feedback of the coordinates designated on the screen by the keyboard 2405K and the mouse 2405M connected to the input section 2405.

The operation of the conventional CD-ROM drive incorporated personal computer with the above configuration will be described.

Since the overall operation of the personal computer is the same as that of general personal computers (e.g., PC-AT compatible machines), detailed description thereof is omitted here. Only the operations relating to the present invention, i.e., the operation for reproducing and outputting AV data in the optical disk 2401 and the operation for copying a file in the optical disk 2401 to the recording section 2404 will be described.

First, the operation for reproducing and outputting AV data will be described. When the user designates a control panel indicating "reproduction start" displayed on the control panel display region 2304 by the use of the mouse 2405M connected to the input section, the controller 2408 interprets the input as the reproduction control command indicating "reproduction start" from the input coordinates and calculates a recording address of a file storing a predetermined MPEG stream for reproduction start in the optical disk 2401 in accordance with the filing system. The controller 2408 sends a data read command (READ #Address) to the disk reproduction drive 2402 to read data in the calculated recording address, and outputs the read digital data to the AV signal processor 2403 in accordance with a data write command (WRITE). The AV signal processor 2403 processes the input MPEG stream of digital data in a predetermined manner and converts the data into an analog audio signal and a digital video signal and outputs the results. The analog audio signal is audibly output via the speaker 2403S. The digital video signal is input into the video signal processor 2407, where the digital video signal is synthesized with video information for display generated inside the computer and displayed by the display device 2407D as images.

Thus, the MPEG stream reproduced from the optical disk 2401 is displayed in the MPEG moving picture display region 2303 of the display device 2407D.

The operation for copying a file recorded in the optical disk 2401 to the recording section 2404 will be described. The input section 2405 receives a command input by the user via the keyboard 2405K. When the input command is a copy command requesting to copy a file in the optical disk 2401 to the recording section 2404, the controller 2408 calculates the recording address of the file to be read in the optical disk 2401 in accordance with the filing system. After calculating the recording address, the controller 2408 sends a data read command (READ #Address) to the disk reproduction drive 2402 to read digital data in the calculated recording address, and sends a data write command (WRITE) to the recording section 2404 so that the data is output and held in the recording section 2404.

With the above configuration, however, digital data retrieved from the optical disk 2401 is uniformly processed by the controller 2408 without distinguishing AV data from others. This makes it difficult to perform a copyright protection processing on AV data.

The "copyright protection processing" as used herein refers to a processing where a copyrighter of AV data specifies the conditions for the use of the AV data in an information processing apparatus. More specifically, the copyrighter may permit only reproduction/output of the AV data (i.e., prohibit copying of the AV data to a hard disk and the like) or permit both reproduction/output and copying of the AV data.

With the above conventional configuration, if the user mistakenly inputs a copy command requesting to copy a file including AV data of which copying is not permitted to the recording section 2404, the disk reproduction drive 2402 receives the same data read command (READ #Address) as that received when the video data reproduction command is input. As a result, the AV data is read and stored in the recording section 2404 as is done for other general data.

As another problem, the operation of the controller 2408 is dynamically determined by loading the OS and the reproduction control program. If the loaded program has an error, an erroneous operation of copying a file including AV data may arise, irrespective of the operation by the user.

For the above reasons, there exists a possibility that AV data of which copying is not permitted may be secondarily stored in a hard disk and the like. Therefore, the copyright of such AV data is not completely protected. This problem is especially serious for such applications that require high horizontal resolution to obtain high-quality images. To take precautions against this problem, authors of such applications may set higher prices to compensate expected damage due to infringement of the copyright, or authors may even give up the idea of producing movie applications and the like of which copyright is extraordinarily valuable. As a result, a sound market where a number of applications are presented to the users at appropriate prices is not expected, which is greatly disadvantageous for the users.

In order to overcome the above problem, an objective of the present invention is to provide data transmitting device/method, a data receiving device, an information processing apparatus, and an information recording medium, where AV data recorded in the information recording medium can be audibly and visually output by a personal computer and, when digital data retrieved from the information recording medium is AV data, the AV data is subjected to a copyright protection processing to protect the AV data from being illegally copied due to an erroneous operation by the user or an erroneous program. According to the present invention, since the protection of the copyright of applications is ensured, a number of applications are urged to be circulated in the market at appropriate prices, and thus advantages for the users are secured.

DISCLOSURE OF THE INVENTION

The data transmitting device of the present invention is a data transmitting device connected to a digital interface for outputting digital data including video information to a data receiving device via the digital interface, the data transmitting device including: an interface section for receiving information specifying digital data to be output and the data receiving device and for outputting the digital data via the digital interface; a judgment section for judging whether or not the digital data includes video information; an authentication section for authenticating whether or not the data receiving device is a proper data receiving device having a function of converting digital data into video data based on authentication data output from the data receiving device; a data retrieval section for retrieving the specified digital data from an external medium; and a control section for controlling the interface section to output the digital data via the digital interface only when the judgment section judges that the digital data includes video information and the authentication section authenticates that the data receiving device is the proper data receiving device, whereby the above objective is attained.

In one embodiment, the authentication section generates first authentication data, outputs the first authentication data to the data receiving device via the interface section, receives second authentication data generated by the data receiving device based on the first authentication data, and judges whether or not the data receiving device is the proper data receiving device based on the second authentication data, and the first authentication data is different each time the first authentication data is generated.

In one embodiment, the authentication section authenticates whether or not the data receiving device is the proper data receiving device and proves itself as a proper data transmitting device, by mutually exchanging the authentication data between the data transmitting device and the data receiving device.

In one embodiment, the digital data is stored in an information recording medium, a region of the information recording medium in which the digital data is stored includes a plurality of sectors each having a header region and a data region, and the header region stores an address of the sector and a data attribute flag indicating whether or not the digital data stored in the data region includes video information, and the judgment section judges whether or not the digital data retrieved from the information recording medium includes video information for each sector by examining the data attribute flag stored in the header region.

The data receiving device according to the present invention is a data receiving device connected to a digital interface for receiving digital data including video information from a data transmitting device via the digital interface, for converting the digital data into video data, and for outputting the video data, the data receiving device including: an interface section for receiving the digital data via the digital interface, an authentication section for generating authentication data indicating that the data receiving device has a function of converting the digital data into video data and for outputting the authentication data; and a conversion section for converting the digital data into the video data, whereby the above objective is attained.

In one embodiment, the authentication section receives first authentication data output from the data transmitting device, generates second authentication data based on the first authentication data and a predetermined conversion function.

In one embodiment, the authentication section proves that the data receiving device is the proper data receiving device and authenticates whether or not the data transmitting device is a proper data transmitting device, by mutually exchanging the authentication data between the data transmitting device and the data receiving device, and the conversion section converts the digital data into the video data only when the authentication has been successful.

In one embodiment, the data transmitting device connected to a digital interface for outputting digital data including video information to a data receiving device via the digital interface, the data transmitting device includes: an interface section for receiving information receiving the digital data to be output and the data receiving device and for outputting the digital data via the digital interface; a judgment section for judging whether or not the digital data includes video information; an authentication section for authenticating whether or not the data receiving device is a proper data receiving device having a function of converting digital data into video data based on authentication data output from the data receiving device; a data retrieval section for retrieving the specified digital data from an external medium; an encrypting section for converting the retrieved digital data into encrypted digital data; and a control section for controlling the interface section to output the encrypted digital data via the digital interface only when the judgment section judges that the digital data includes video information and the authentication section authenticates that the data receiving device is the proper data receiving device, whereby the above objective is attained.

In one embodiment, the authentication section generates first authentication data, outputs the first authentication data to the data receiving device via the interface section, receives second authentication data generated by the data receiving device based on the first authentication data, and judges whether or not the data receiving device is the proper data receiving data based on the second authentication data, the first authentication data is different each time the first authentication data is generated, and the encrypting section generates an encrypting key using the first authentication data and encrypts the digital data using the encrypting key.

In one embodiment, the authentication section generates first authentication data, outputs the first authentication data to the data receiving device via the interface section, receives second authentication data generated by the data receiving device based on the first authentication data, judges whether or not the data receiving device is the proper data receiving data based on the second authentication data, receiving third authentication data output from the data receiving device, generating fourth authentication data based on the third authentication data and a predetermined conversion function, and output the fourth authentication data, the first authentication data is different each time the authentication data is generated, and the encrypting section generates an encrypting key using the first authentication data and the third authentication data and encrypts the digital data using the encrypting key.

In one embodiment, the digital data is stored in an information recording medium, a region of the information recording medium in which the digital data is stored includes a plurality of sectors each having a header region and a data region, and the header region stores an address of the sector and a data attribute flag indicating whether or not the digital data stored in the data region includes video information, and the judgment section judges whether or not the digital data retrieved from the information recording medium includes video information for each sector by examining the data attribute flag stored in the header region.

The data receiving device according to the present invention is a data receiving device connected to a digital interface for receiving encrypted digital data including video information from a data transmitting device via the digital interface, for converting the encrypted digital data into video data, and for outputting the video data, the data receiving device including: an interface section for receiving the encrypted digital data via the digital interface; an authentication section for generating authentication data indicating that the data receiving device has a function of converting the digital data into the video data and for outputting the authentication data; a decrypting section for converting the encrypted digital data into decrypted digital data; and a conversion section for converting the digital data into the video data, whereby the above objective is attained.

In one embodiment, the authentication section receives first authentication data output from the data transmitting device, generates second authentication data based on the first authentication data and a predetermined conversion function, and outputs the second authentication data, and the decrypting section generates a decrypting key using the first authentication data and decrypts the encrypted digital data using the decrypting key.

In one embodiment, the authentication section receives first authentication data output from the data transmitting device, generates second authentication data based on the first authentication data and a predetermined conversion function, and outputs the second authentication data; generates third authentication data; outputs the third authentication data to the data transmitting device via the interface section; receives fourth authentication data generated by the data transmitting device based on the third authentication data; judges whether or not the data transmitting device is the proper data transmitting device based on the fourth authentication data, the third authentication data is different each time the third authentication data is generated, and the decrypting section generates a decrypting key using the first authentication data and the third authentication data and decrypts the encrypted digital data using the decrypting key.

The data transmitting device according to the present invention includes: a data retrieval section for retrieving digital data by reproducing an information recording medium having a sector structure having a header region and a data region, the header region storing a data attribute flag indicating whether or not the digital data stored in the data region is video information; a judgment section for judging whether or not the digital data is video information based on the data attribute flag; and a control section for outputting the digital data and the data attribute flag when the digital data is video information, whereby the above objective is attained.

The data receiving device according to the present invention is a data receiving device connected to a digital interface for receiving digital data including video information from a data transmitting device via the digital interface, for converting the digital data into video data, and for outputting the video data, the data receiving device including: an interface section for receiving the digital data via the digital interface; a judgment section for judging whether or not the digital data is video information based on the data attribute flag included in the received digital data indicating whether or not the digital data is video information; and a control section for prohibiting the digital data from being output to the digital interface without being converted into the video data when the digital data is video information, whereby the above objective is attained.

The information processing apparatus according to the present invention is an information processing apparatus including a data transmitting device for retrieving digital data including video information from an information recording medium, a data receiving device for converting the retrieved digital data into video data, a control section for instructing the data transmitting device to output the digital data to the data receiving device, and a digital interface connecting the data transmitting device, the data receiving device and the control section, wherein the information recording medium has a sector structure having a header region and a data region, the header region storing a data attribute flag indicating whether or not digital data stored in the data region is video information, the data transmitting device receives information specifying digital data to be retrieved and the data receiving device; retrieves the specified digital data from the information recording medium; judges whether or not the data region includes video information based on the data attribute flag; authenticates whether or not the data receiving device is a proper data receiving device when the data region includes video information; and outputs the retrieved digital data via the digital interface only when the authentication has been successful, and the data receiving device proves itself as the proper data receiving device in response to the authentication from the data transmitting device via the digital interface and converts the retrieved digital data into video data, whereby the above objective is attained.

The information processing apparatus according to the present invention is an information processing apparatus including a data transmitting device for retrieving digital data including video information from an information recording medium, a data receiving device for converting the retrieved digital data into video data, a control section for instructing the data transmitting device to output the digital data to the data receiving device, and a digital interface connecting the data transmitting device, the data receiving device and the control section, wherein the information recording medium has a sector structure having a header region and a data region, the header region storing a data attribute flag indicating whether or not digital data stored in the data region is video information, the data transmitting device receives information specifying digital data to be retrieved and the data receiving device; retrieves the specified digital data from the information recording medium; judges whether or not the data region includes video information based on the data attribute flag; authenticates whether or not the data receiving device is a proper data receiving device when the data region includes video information; and outputs the retrieved digital data after encrypting via the digital interface only when the authentication has been successful, and the data receiving device proves itself as the proper data receiving device in response to the authentication from the data transmitting device and converts the digital data into the video data after decrypting the encrypted digital data received via the digital interface, whereby the above objective is attained.

The information processing apparatus according to the present invention is an information processing apparatus including a data transmitting device for retrieving digital data including video information from an information recording medium, a data receiving device for converting the retrieved digital data into video data, a control section for instructing the data transmitting device to output the digital data to the data receiving device, and a digital interface connecting the data transmitting device, the data receiving device and the control section, wherein the information recording medium has a sector structure having a header region and a data region, the header region storing a data attribute flag indicating whether or not digital data stored in the data region is video information, the control section outputs a data retrieval command specifying digital data to be retrieved to data receiving device; the data transmitting device receives information specifying digital data to be retrieved and the data receiving device; retrieves the specified digital data from the information recording medium; judges whether or not the data region includes video information based on the data attribute flag; authenticates whether or not the data receiving device is a proper data receiving device when the data region includes video information; and outputs the retrieved digital data and the data attribute flag via the digital interface only when the authentication has been successful, and the data receiving device receives the data retrieval command output from the control section and outputs the command to the data transmitting device; proves itself as the proper data receiving device in response to the authentication from the data transmitting device via the digital interface; receives the digital data and the data attribute flag via the digital interface; and judges whether or not the retrieved digital data is video information based on the data attribute flag and, when the retrieved digital data is video information, converts the digital data into video data and prohibits the digital data from being output via the digital interface without being converted into video data, whereby the above objective is attained.

In one embodiment, the information recording medium stores digital data obtained by inter-frame compressing video data with a horizontal resolution of 450 lines or more in the data region, and the data receiving device converts the digital data into the video data by inter-frame decompressing the digital data.

The data transmitting method according to the present invention is a data transmitting method for transmitting digital data including video information to a data receiving device via a digital interface, the method including the steps of: receiving information specifying the digital data to be output and the data receiving device and for outputting the digital data via the digital interface; judging whether or not the digital data includes video information; authenticating whether or not the data receiving device is a proper data receiving device having a function of converting the digital data into video data based on authentication data output from the receiving device; retrieving the specified digital data from an external medium; and controlling to output the digital data via the digital interface only when the digital data includes video information and the data receiving device is the proper data receiving device, whereby the above objective is attained.

The data transmitting method according to the present invention is a data transmitting method for transmitting digital data including video information to a data receiving device via a digital interface, the method including the steps of: receiving information specifying the digital data to be output and the data receiving device and for outputting the digital data via the digital interface; judging whether or not the digital data includes video information; authenticating whether or not the data receiving device is a proper data receiving device having a function of converting the digital data into video data based on authentication data output from the receiving device; retrieving the specified digital data from an external medium; converting the retrieved digital data into encrypted digital data; and controlling to output the encrypted digital data via the digital interface only when the digital data includes video information and the data receiving device is the proper data receiving device, whereby the above objective is attained.

The data transmitting method according to the present invention includes the steps of: retrieving digital data by reproducing an information recording medium having a sector structure having a header region and a data region, the header region storing a data attribute flag indicating whether or not digital data stored in the data region is video information; judging whether or not the digital data is video information based on the data attribute flag; and outputting the digital data and the data attributing flag when the digital data is video information, whereby the above objective is attained.

The information recording medium according to the present invention includes a plurality of sectors managed with addresses and the sectors being classified into a data region and a lead-in region which is reproduced prior to the data region, wherein a sector in the lead-in region stores map information indicating an address of a sector in the data region in which the video data is stored, whereby the above objective is attained.

The information recording medium according to the present invention includes a plurality of sectors each having a header region and a user data region, the information recording medium storing file management information for managing a plurality of files each composed of at least one sector as a group under a directory, wherein the user data region stores digital data including at least video information and the file management information, the header region stores a data attribute flag indicating whether or not the user data region includes video information or information required to reproduce the video information, and the file management information includes file identification information indicating whether or not the file includes the video information and whether or not a file including the video information exists under the directory, whereby the above objective is attained.

Thus, according to the present invention, a data transmitting device, a data transmitting method, a data receiving device, and an information processing apparatus, where AV data is protected from being illegally copied to a memory such as a HDD (hard disk drive) and thus the copyright of applications can be protected, are provided.

According to the present invention, a data transmitting device, a data transmitting method, a data receiving device, and an information processing apparatus, where AV data is encrypted before being transmitted to a digital interface, are provided. With this configuration, the AV data can be protected even if externally retrieved.

BRIEF DESCRIPTION OF THE DRAWINGS

FIG. 1 is a structural view of an optical disk according to the present invention.

FIG. 3 is a view illustrating a logical structure of recorded data called a logical format of the optical disk.

FIG. 4 is a view illustrating the ISO 13346 standard utilized as a filing system for the logical format shown in FIG. 3.

FIG. 8 is a view illustrating a format of device attribute information.

FIG. 29 is a view illustrating an example of map information.

FIG. 31 is a view illustrating a configuration of a conventional personal computer having a CD-ROM drive.

BEST MODE FOR CARRYING OUT THE INVENTION

Figure 2:
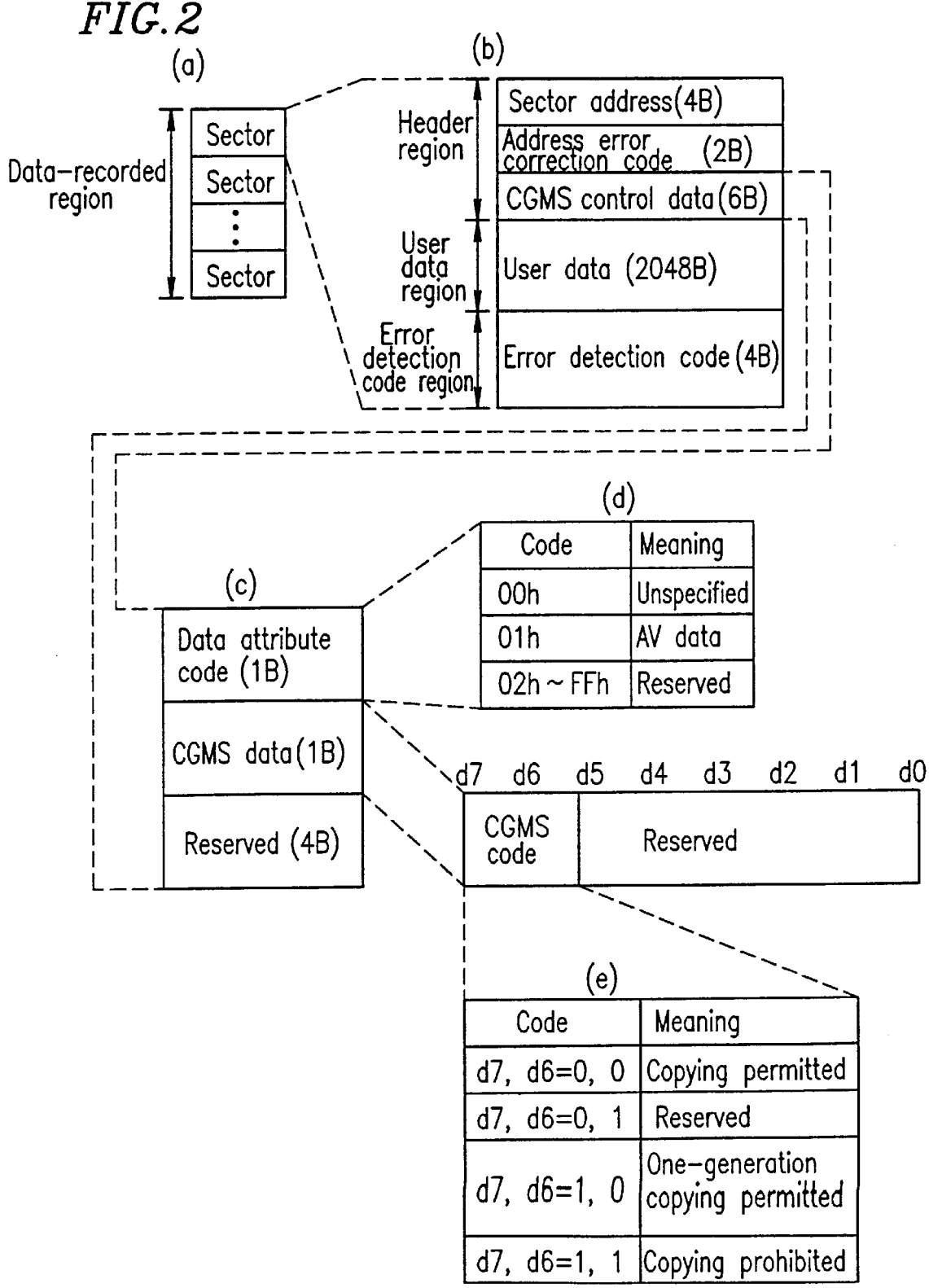
FIG. 2 is a view illustrating a physical structure for storing data called a physical format of the optical disk.

Hereinbelow, the present invention will be described by way of examples with reference to the accompanying drawings. In the drawings, the same components are denoted by the same reference numerals.

In the present specification, it is assumed that a "data transmitting device" outputs digital data to a "data receiving device" via a bus. The digital data is not necessarily AV data. The data transmitting device which can properly handle AV data is specifically called a "proper data transmitting device". The data receiving device which can properly handle AV data is specifically called a "proper data receiving device". To "properly handle" as used herein is to "handle digital data after performing the copyright protection procedure". For example, a device which "properly handles" AV data prohibits digital data, including AV data of which copyright should be protected, reproduced from an information recording medium such as a DVD, from being improperly stored in a hard disk as it is. The proper data transmitting device and the proper data receiving device typically have an internal semiconductor chip such as a ROM (read only memory) used to process authentication data and proof data which will be described later in detail.

The "information processing apparatus" as used herein includes a proper data transmitting device and a proper data receiving device.

The "digital interface" as used herein includes buses for data transmission between the data transmitting device and the data receiving device and interfaces connected to the buses, including, for example, I/O buses such as PCI buses and SCSI buses.

EXAMPLE 1

First, a DVD (digital video disk) which is an optical disk as the information recording medium used for information processing apparatuses of Examples 1 to 3 according to the present invention will be described with reference to FIGS. 1 to 4. FIG. 1 is a structural view of the DVD. FIG. 2 is a view illustrating a physical structure for storing data called a physical format of the optical disk. FIG. 3 is a view illustrating a logical structure of recorded data called a logical format of an optical disk. FIG. 4 is a view illustrating the ISO 13346 standard utilized as a filing system for the logical format shown in FIG. 3.

<The Structure of the Optical Disk>

FIG. 1 shows the structure of the optical disk which is a DVD. Portion (a) of FIG. 1 is a front view of the DVD. Portion (b) of FIG. 1 is a sectional view of the DVD. Portion (c) of FIG. 1 is an enlarged sectional view of portion (b) of FIG. 1.

As shown in portion (a) of FIG. 1, a DVD 2200 has a center hole 2201. A clamp region 2202 is provided around the center hole 2201, and an information recording region 2203 is provided in the outside of the clamp region 2202 for storing digital data.

As shown in portion (b) of FIG. 1, the information recording region 2203 of the DVD 2200 is formed to include a first transparent substrate 2208 with a thickness of about 0.6 mm (in the range of 0.05 mm to 0.7 mm), an information layer 2209 made of a reflection film such as a metal thin film formed on the first transparent substrate 2208, a second transparent substrate 2211, and an adhesive layer 2210 formed between the information layer 2209 and the second transparent substrate 2211 for adhering these layers to each other. A print layer 2212 for label printing may be formed on the second transparent substrate 2211, if necessary. The print layer 2212 may be formed partially.

As shown in portion (c) of FIG. 1, the bottom surface of the DVD on which a light beam 2213 is incident and from which information is to be retrieved is referred to as a surface A, while the top surface of the DVD where the print layer 2212 is formed is referred to as a surface B. Pits are formed on a surface facing between the first transparent substrate 2208 and the information layer 2209 by molding technique. Information is recorded in the DVD by forming pits with various lengths at various pitches in accordance with the information. The shapes of pits formed on the first transparent substrate 2208 are transferred to the information layer 2209. The lengths and pitches of pits, as well as the pitch of information tracks composed of pit rows, are smaller compared with those of a CD. As a result, the recording density per area has been improved.

The surface A of the first transparent substrate 2208 where no pits are formed is flat. The second transparent substrate 2211 which is formed for reinforcement is made of the same material as the first transparent substrate 2208 and has the same thickness, i.e., about 0.6 mm. The second transparent substrate 2211 is flat on both surfaces.

Information is retrieved from the DVD by irradiating the pits with the light beam 2213 to detect a change in the reflectance ratio of a light spot 2214. The diameter of the light spot 2214 for the DVD is about 1/1.6 of that of a light spot for the CD since the numerical aperture (NA) of an objective lens is larger and the wavelength λ of the light beam is smaller compared with those of the CD.

A DVD having the above-mentioned structure can record information of about 4.7 gigabytes on one side. The storage capacity of about 4.7 gigabytes is about eight times as large as that of a conventional CD. A DVD having such a large storage capacity can greatly improve the image quality of moving pictures and obtain a reproduction time as long as two hours or more. Thus, the DVD is quite suitable for the recording medium for high-quality images.

As shown in portion (a) of FIG. 1, the information recording region is classified into a lead-in region 2205, a data-recorded region 2206, and a lead-out region 2207 in this order from the inside. The lead-in region 2205 stores data for initialization of a disk reproduction drive at the start of reproduction. The data-recorded region 2206 stores digital data which is different depending on each of the various applications. The lead-out region 2207 does not store meaningful digital data but only informs the disk reproduction drive of the end of the data-recorded region 2206. In the reproduction by the disk reproduction drive, the lead-in region 2205 is first reproduced when the disk is mounted, and data-recorded region 2206 is then reproduced in accordance with instructions input from outside.

<The Physical Format of the Optical Disk>

FIG. 2 shows a physical format of the optical disk.

As shown in portion (a) of FIG. 2, the data-recorded region 2206 of the optical disk is divided into a plurality of sectors. Each of the sectors is a minimum unit for writing or reading data.

Portion (b) of FIG. 2 shows a structure of the sector. Each sector has a 12-byte header region, a 2048-byte user data region, and a 4-byte error detection code region in this order from the top.

In the user data region, digital data which contains either file management information or application information including AV data is stored. As the AV data of the application information, an MPEG stream is stored. As the file management information, information for constructing a filing system is stored to manage a plurality of sectors as a file and a plurality of such files as a directory.

In the sector header region, a sector address as address information for identifying the sector, an error correction code for the sector address, and CGMS control data (Copy Generation Management System control data) for controlling the reproduction of the sector are stored in this order from the top. The sector address information includes information for identifying the lead-in region 2205, the data-recorded region 2206, or the lead-out region 2207, so that the disk reproduction drive can judge which region the sector belongs to, based on the sector address information.

Portion (c) of FIG. 2 shows a structure of the CGMS control data. The CGMS control data is composed of a data attribute code, CGMS data, and reserved data.

Portion (d) of FIG. 2 is a view illustrating the data attribute code of the CGMS control data. The data attribute code has a size of 1 byte. The data attribute code "01h" ("h" denotes hexadecimal notation) indicates that AV data is recorded in the user data region. The data attribute code "00h" indicates that no data attribute is specified.

Portion (e) of FIG. 2 illustrates the CGMS data of the CGMS control data. The CGMS data has a size of 1 byte. The two most significant bits of the CGMS data are used as a CGMS code. In the two most significant bits, control information is stored for controlling a copying operation for digital data stored in the user data region. The CGMS code "00" indicates that the copying is permitted, "10" indicates that one-generation copying is permitted, and "11" indicates that copying is prohibited.

When the optical disk having the sector structure shown in FIG. 2 is reproduced by the disk reproduction drive of the information processing apparatus to retrieve digital data stored in the optical disk, the CGMS control data of each sector is examined before the user data region of the sector is reproduced. This makes it possible to judge whether or not the user date region of the sector stores AV data and the contents for permission of copying operation before the reproduction of the user data region.

<The Logical Format of the Optical Disk>

The logical format as a logical data structure of information stored in the data-recorded region of the optical disk will be described with reference to FIG. 3. FIG. 3 is a view showing the logical format of the optical disk. As shown in portion (a) of FIG. 3, the data-recorded region includes file management information at the head thereof and a plurality of files following the file management information. A "file" as used herein is a unit for managing data stored in a plurality of sectors as one group. Information indicating an attribute of each file is stored in the file management information. The file management information may further include information for managing a plurality of such files as a unit called a directory.

Portion (b) of FIG. 3 shows an exemplified file/directory structure of the optical disk used in this example. The oval represents a directory, while the rectangle represents a file. In this exemplified structure, there exists one directory DVD_VIDEO and two files File1.DAT and File2.DAT under a directory ROOT. The directory DVD_VIDEO has three files Movie1.VOB, Movie2.VOB and Movie3.VOB.

In this example, a file name rule is established for files containing AV data. The extender VOB is added to the file name as identifying information of files. A directory having a name of DVD_VIDEO is exclusively used for storing AV data. This directory stores only files containing AV data. In this exemplified structure, Movie1.VOB, Movie2.VOB and Movie3.VOB are files containing AV data. Hereinafter, files containing AV data are simply referred to as "AV data files". File1.DAT and File2.DAT are files which do not contain AV data.

Thus, in the reproduction of data in the optical disk according to the present invention, by interpreting the file name rule, it is possible to judge whether or not the file to be read is an AV data file. For example, in the exemplified structure shown in FIG. 3, if the path for a file to be read includes the directory name DVD_VIDEO, the file to be read is judged to be an AV data file. The file management information described in this example conforms to the ISO 13346 standard.

Next, the procedure and method for obtaining the recording address of a file from a file name in the filing system based on the ISO 13346 standard utilized in the logical format shown in FIG. 3 will be described with reference to FIG. 4. FIG. 4 shows the logical relationship between data in the file management information in accordance with the ISO 13346 standard. Since the ISO 13346 standard is applicable to not only read-only disks but also rewritable disks, the recording position of each file is stored in information called file entry and managed as shown in FIG. 4(a).

For example, for the AV data file Movie1.VOB, a file entry for Movie1 exists in the file management information. For the general file File1.DAT, a file entry for File1 exists in the file management information. In order to obtain the recording address of a file, therefore, the corresponding file entry should be obtained. The file entry for each file can be obtained by tracing directories which form the file hierarchical structure. The directory information exists in the file management information as a directory file. The directory file is composed of a plurality of file identity descriptors each of which has the recording address of the file entry for a file or a directory managed by the directory together with the file name. The file entry for the root which is positioned at the top of the directory hierarchical structure is stored in a file set descriptor which is stored at a predetermined position in the file management information. This makes it possible to obtain the target file entry by tracing the directory hierarchical structure using file names starting from the root so as to obtain the address information from the file entry. As shown in portions (b) and (c) of FIG. 4, the file and directory name rules for AV data are established for the file identity descriptors.

Next, referring to FIGS. 5, 6, 7 and 8, an information processing apparatus for retrieving data from the information recording medium mentioned above with reference to FIGS. 2 to 4 so as to reproduce and output video data will be described.

Figure 5:
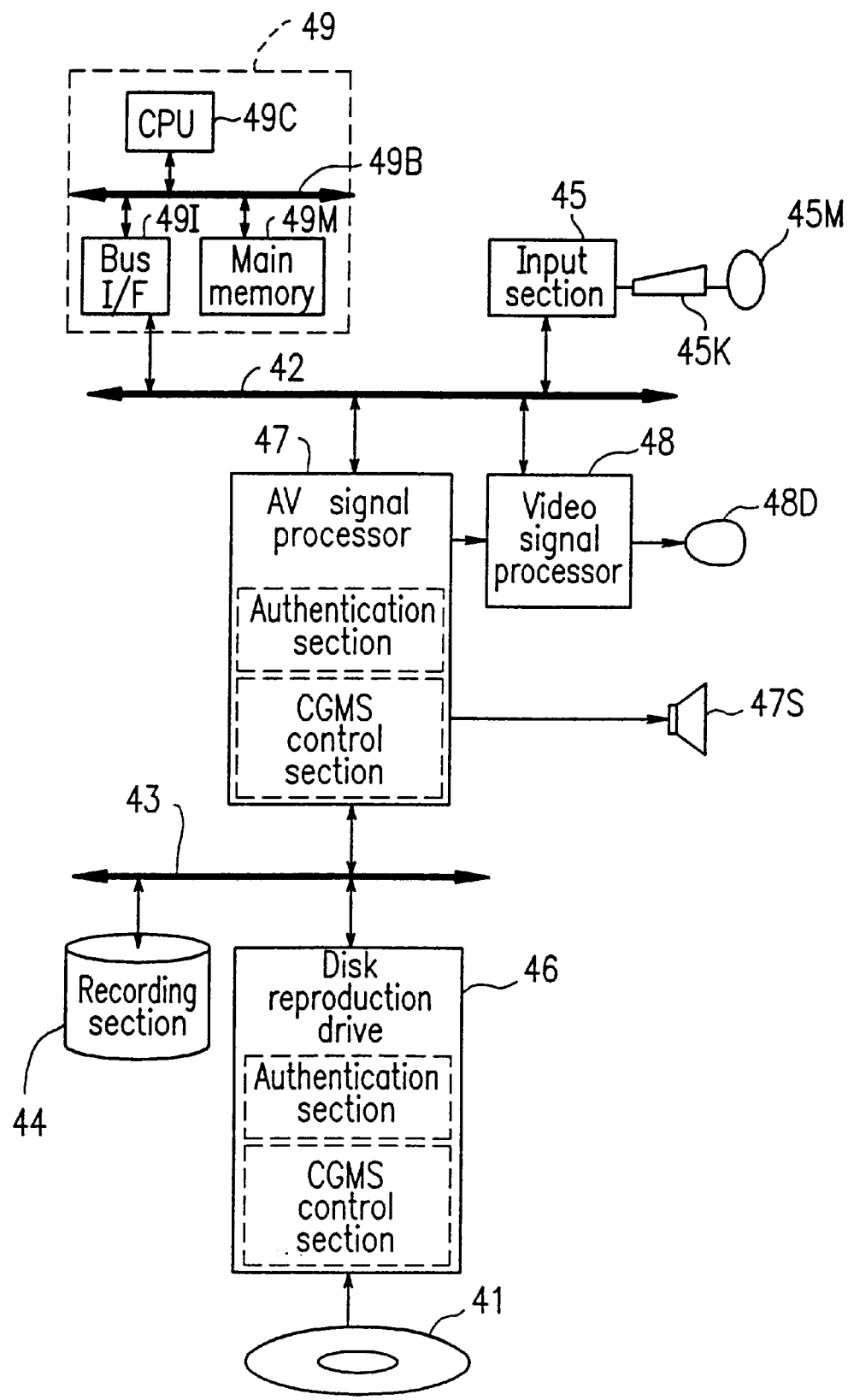
FIG. 5 is a block diagram of an information processing apparatus for an information recording disk of Example 1 according to the present invention.

FIG. 5 is a block diagram of the information processing apparatus of Example 1 for reproducing data in the above-described information recording medium (i.e., the DVD). Reference numeral 41 denotes an optical disk, reference numeral 42 denotes an I/O bus, reference numeral 43 denotes an SCSI bus, reference numeral 44 denotes a recording section, reference numeral 45 denotes an input section, reference numeral 46 denotes a disk reproduction drive, reference numeral 47 denotes an AV signal processor, reference numeral 48 denotes a video signal processor, and reference numeral 49 denotes a controller. Herein, each component will be described. The disk reproduction drive 46 and the AV signal processor 47 of this example corresponds to a data transmitting device and a data receiving device according to the present invention, respectively, which are both included in the information processing apparatus according to the present invention.

An optical disk 41 as the information recording medium is a DVD having the structure shown in FIG. 1. In the optical disk 41, digital data having a structure illustrated in FIGS. 2, 3 and 4 is stored. The I/O bus 42 is an internal bus for connecting the controller 49, the input section 45, the recording section 44, the AV signal processor 47 and the video signal processor 48. As the I/O bus 42, a PCI bus or an ISA bus may be used, for example.

The SCSI bus 43 is an external interface employing an SCSI (small computer systems interface) method as the data transmission method and connects the recording section 44, the AV signal processor 47 and the disk reproduction drive 46 to each other as individual devices.

In the SCSI method, each device connected to the bus has an ID code for identification of the device on the bus. A device which is to transmit data or a command first outputs to the bus a request for exclusive use of the bus together with ID codes of its own and a receiver device of the data. Upon receipt of a response from the receiver device, the transmitter device is entitled to exclusively use the bus and then transmits data and a command. In this way, the devices connected to the SCSI bus can identify each other with their ID codes at data transmission. These devices connected to the SCSI bus also have device attribute information indicating their types and functions. FIG. 8 shows a format of the data attribute information. Portion (a) of FIG. 8 shows a format of entire data attribute information. As shown in portion (a) of FIG. 8, the three most significant bits of the first one byte store a peripheral device classification code and the five least significant bits of the first one byte store a device type code. Portion (b) of FIG. 8 shows the relationship between the device type codes and the device types corresponding to the device type codes. As shown in portion (b) of FIG. 8, the device type code (10101) indicates an "AV disk reproduction-only device", (10111) indicates an "AV disk recording/reproduction device", and (10010) indicates an "AV signal processing device". Hereinbelow, each of the "AV disk reproduction-only device (10101)", the "AV disk recording/reproduction device (10111)", and the "AV signal processing device (10010)" is referred to as an "AV device". The disk reproduction drive 46 in this example corresponds to the "AV disk reproduction-only device (10101)" and the AV signal processor 47 in this example corresponds to the "AV signal processing device (10010)", which are both AV devices. When a device connected to the SCSI bus receives an SCSI authentication command (INQUIRY), the device returns back the device attribute information of the device via the SCSI bus. The device which has received the device attribute information holds the device attribute information therein together with the ID code of the device which has returned the device attribute information. Thus, once a device obtains the device attribute information of another device by sending the SCSI authentication command (INQUIRY), the device can recognize the device type of the other device whose device attribute information has been obtained.

In the present specification, the operation of authenticating that each of the device which sends data and the device which receives data is the AV device by the use of the SCSI authentication command (INQUIRY) is called "AV device mutual authentication".

The AV device's mutual authentication is performed by respective authentication sections of the disk reproduction drive 46 and the AV signal processor 47 shown in FIG. 5. The authentication sections are typically realized by microprocessors 509 and 610 and programs for controlling the microprocessors which will be described later.

The recording section 44 is a memory connected to the SCSI bus 43, typically a hard disk, which records digital data and outputs the recorded digital data in response to an instruction from the controller 49. The recording section 44 is not limited to a hard disk. As long as the recording section 44 has a function of secondarily recording digital data, it may be any type of memory. For example, the recording section 44 may be a magneto-optical (MO) disk.

The input section 45 for receiving an external instruction from the user is connected to a mouse 45M and a keyboard 45K. The disk reproduction drive 46 is a data transmitting device which reproduces digital data from the optical disk 41 and outputs the reproduced data to the SCSI bus 43.

Figure 6:
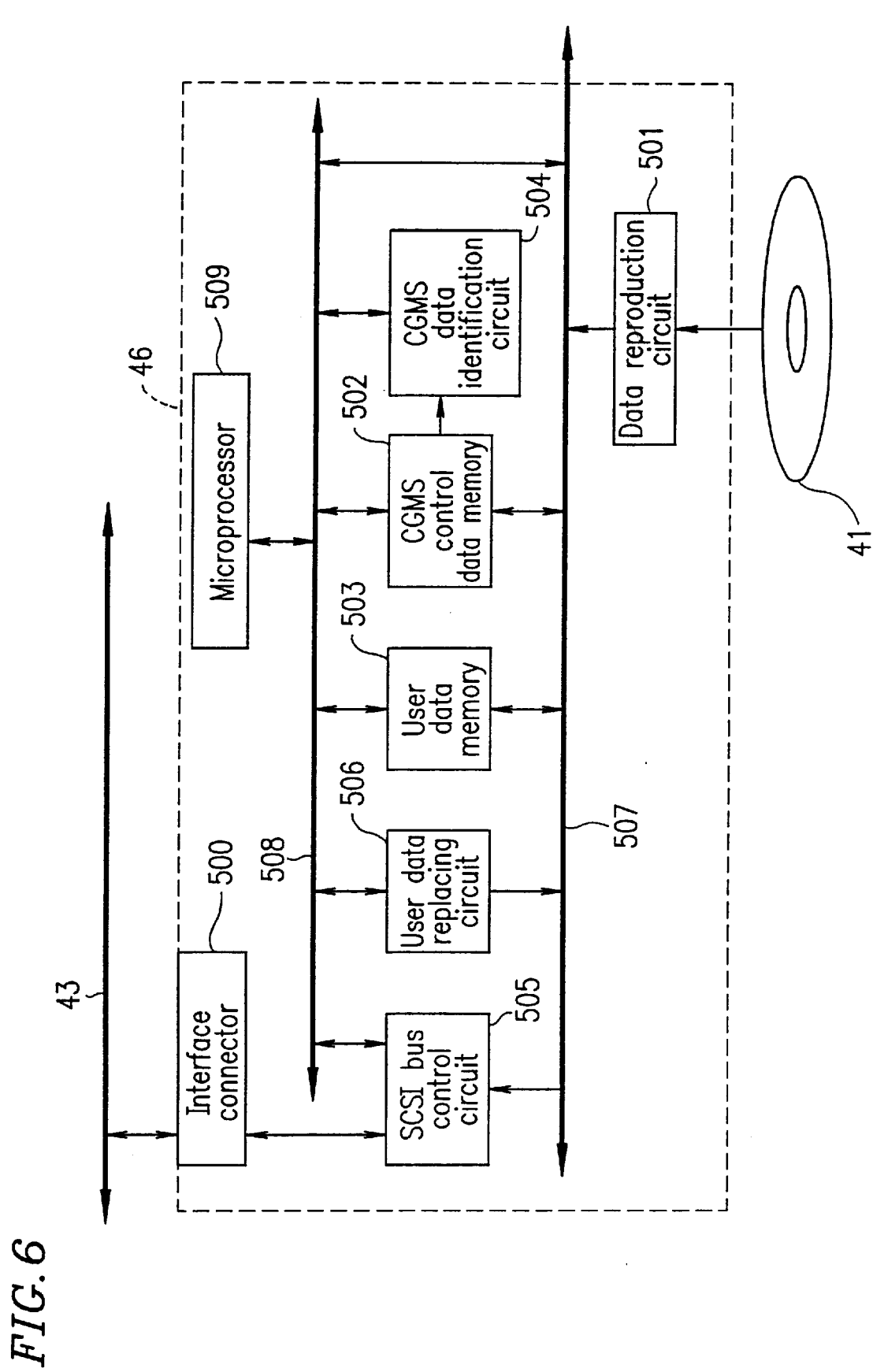
FIG. 6 is a block diagram showing an internal configuration of a disk reproduction drive 46.

FIG. 6 shows an internal configuration of the disk reproduction drive 46. The disk reproduction drive 46 includes an interface connector 500, a data reproduction circuit 501, a CGMS (copy generation management system) control data memory 502, a user data memory 503, a CGMS data identification circuit 504, an SCSI bus control circuit 505, a user data replacing circuit 506, an internal data bus 507, a control bus 508, and a microprocessor 509. Hereinafter, the configuration and the operation of the disk reproduction drive 46 will be described.

The interface connector 500 connects the disk reproduction drive 46 to the SCSI bus 43. The data reproduction circuit 501 controls a relevant disk driver in accordance with a specified sector number as address information, reads digital data stored in the specified sector from the optical disk 41, and sends user data in the user data region of the sector to the user data memory 503 and CGMS control data in the sector header region of the sector to the CGMS control data memory 502.

The CGMS control data memory 502 stores CGMS control data of the sector data. The user data memory 503 stores user data of the sector data.

The CGMS data identification circuit 504 reads the CGMS control data stored in the CGMS control data memory 502, determines whether the data attribute of the user data stored in the user data memory 503 is "unspecified" or "AV data" based on the data attribute code of the CGMS control data, and sends the data attribute to the microprocessor 509. The CGMS data identification circuit 504 also determines whether the copy restricting information of the user data stored in the user data memory 503 is "copying permitted", "one-generation copying permitted", or "copying prohibited" based on the CGMS data of the CGMS control data and sends the copy restricting information to the microprocessor 509.

The SCSI bus control circuit 505 controls the transmission/receiving of commands and data according to the SCSI method via the SCSI bus 43.

The user data replacing circuit 506 reads the user data stored in the user data memory 503 in response to an instruction from the microprocessor 509 and converts the user data into null data. The "null data" as used herein refers to dummy data which carries no information such as "0000h".

The internal data bus 507 transmits data read by the data reproduction circuit 501 or data to be output by the SCSI bus control circuit 505 to the SCSI bus 43.

The control bus 508 transmits instruction information (i.e., a set of commands) output from the microprocessor 509 and processing result information transmitted from the respective circuits.

The microprocessor 509 controls the entire disk reproduction drive 46 in accordance with the SCSI commands received by the SCSI bus control circuit 505. Hereinbelow, the control by the microprocessor 509 performed when the SCSI authentication command (INQUIRY) for authenticating the device types of data transmitter and receiver devices and performing the mutual authentication, an SCSI command (READ) for reading digital data in the optical disk, and an exclusive SCSI command (READ_AV) for reading AV digital data in the optical disk are input.

When the microprocessor 509 judges that the input SCSI command is the SCSI command (INQUIRY), it sends back device attribute data of the disk reproduction drive 46 itself in the format shown in FIG. 8 to a device which has sent the SCSI command (INQUIRY) via the SCSI bus control circuit 505. Conversely, the microprocessor 509 sends the SCSI authentication command (INQUIRY) to a device connected to the SCSI bus, receives attribute data of the device, and holds the attribute data in an internal memory, for example, together with the ID code of the device.

When the microprocessor 509 judges that the input SCSI command is the SCSI data read command (READ), it controls the data reproduction circuit 501 to read digital data recorded in the optical disk 41 in accordance with the sector number affixed to the command as a parameter. The digital data read by the data reproduction circuit 501 is separated into CGMS control data stored in the header region of the sector and user data stored in the user data region of the sector, and these data are stored in the CGMS control data memory 502 and the user data memory 503, respectively.

After the digital data of the sector is read, the microprocessor 509 instructs the CGMS data identification circuit 504 to judge whether or not the user data (2048 bytes) stored in the user data memory 503 is AV data. When the user data is not AV data, the microprocessor 509 controls the SCSI bus control circuit 505 to transfer the user data (2048 bytes). When the user data is AV data, the microprocessor 509 controls the user data replacing circuit 506 to replace the user data (2048 bytes) with null data (2048 bytes) as a copyright protection processing and then controls the SCSI bus control circuit 505 to output the replaced data. Such a series of controls performed by the microprocessor 509 are stored in an internal memory as a program.

When the microprocessor 509 judges that the input SCSI command is the SCSI AV data read command (READ_AV), it controls the data reproduction circuit 501 to read digital data recorded in the optical disk 41 in accordance with the sector number affixed to the command as a parameter. The digital data read by the data reproduction circuit 501 is separated into CGMS control data stored in the header region of the sector and user data stored in the user data region of the sector, and these data are stored in the CGMS control data memory 502 and the user data memory 503, respectively.

After the digital data of the sector is read, the microprocessor 509 instructs the CGMS data identification circuit 504 to judge whether or not the user data (2048 bytes) stored in the user data memory 503 is AV data. In addition, it is judged whether or not the device type of the device which has sent the SCSI AV data read command (READ_AV) is an AV device with reference to the attribute data of the device obtained and held in response to the SCSI command (INQUIRY). When it is judged that the user data (2048 bytes) is not AV data or that the user data (2048 bytes) is AV data and the device which has sent the READ_AV command is an AV device, the microprocessor 509 controls the SCSI bus control circuit 505 to output the digital data of a total of 2054 bytes as a data transmission unit. The digital data of the total 2054 bytes is composed of the CGMS control data (6 bytes/sector) stored in the CGMS control data memory 502 and the user data (2048 bytes/sector) stored in the user data memory 503 to the device which has sent the READ_AV command (AV device, in this case).

When it is judged that the user data is AV data and the device type of the device which has sent the READ_AV command is not an AV device, the microprocessor 509 controls the user data replacing circuit 506 to replace the user data (2048 bytes) stored in the user data memory 503 with null data (2048 bytes) as a copyright protection processing, adds the CGMS control data (6 bytes) stored in the CGMS control data memory 502, and then controls the SCSI bus control circuit 505 to output the resultant digital data of a total of 2054 bytes as a data transmission unit. The description of the disk reproduction drive 46 is terminated here.

Figure 7:
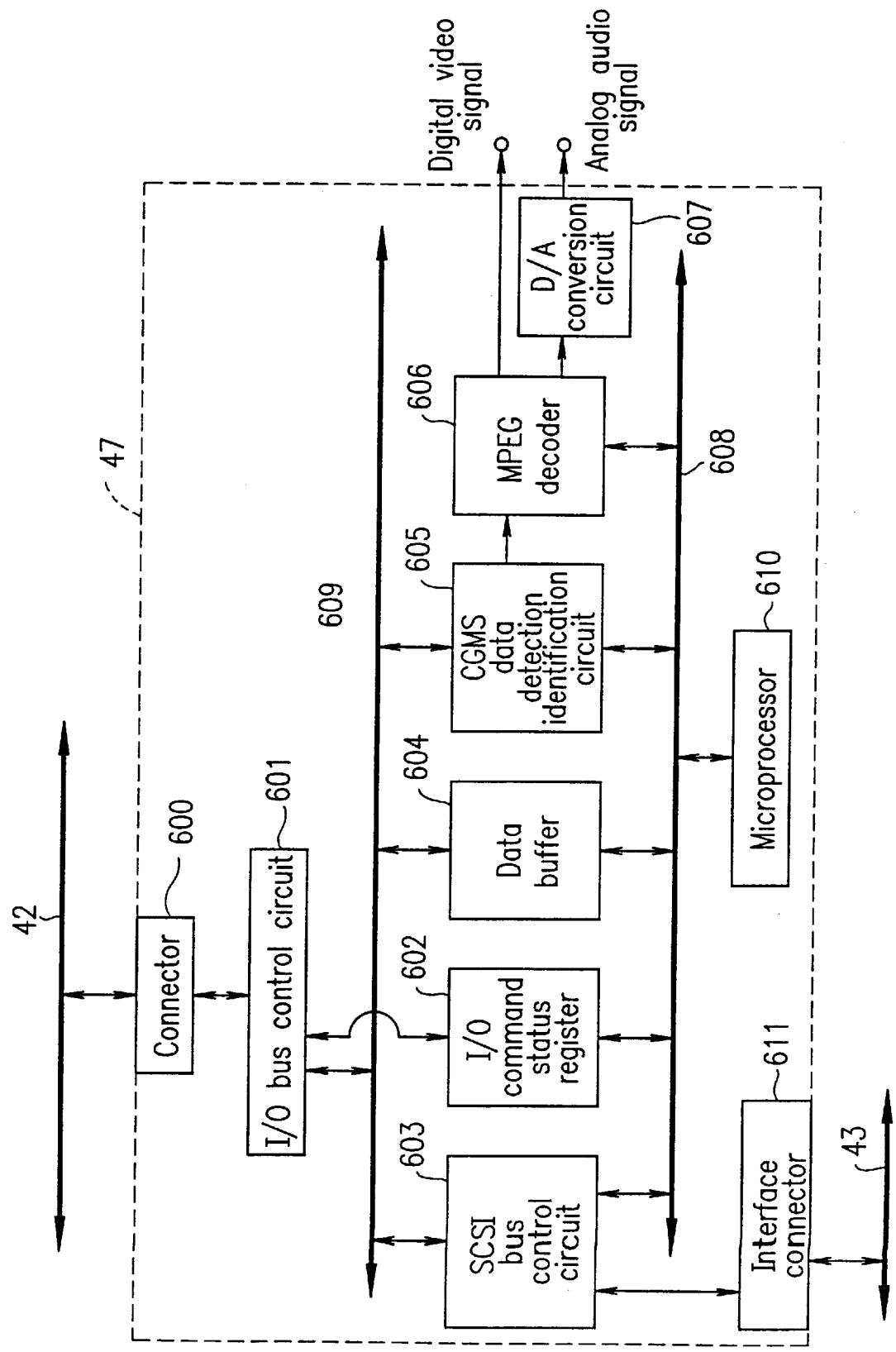
FIG. 7 is a block diagram showing an internal configuration of an AV signal processor 47.

Next, the configuration and the operation of the AV signal processor 47 will be described. FIG. 7 shows an internal configuration of the AV signal processor 47. As shown in FIG. 7, the AV signal processor 47 includes a connector 600, an I/O bus control circuit 601, an I/O command status register 602, an SCSI bus control circuit 603, a data buffer 604, a CGMS data detection/identification circuit 605, an MPEG decoder 606, a D/A conversion circuit 607, a control bus 608, an internal data bus 609, a microprocessor 610, and an interface connector 611.

The connector 600 connects the AV signal processor 47 to the I/O bus 42. The I/O bus control circuit 601 identifies a signal input from the I/O bus 42. When the input signal is data, the I/O bus control circuit 601 outputs the data to the data buffer 604. When the input signal is a control signal such as an I/O command, the I/O bus control circuit 601 stores the signal to the I/O command status register 602.

The I/O command status register 602 stores a command sent from the controller 49 to the AV signal processor 47 and results of the processing by the AV signal processor 47.

The SCSI bus control circuit 603 is connected to the SCSI bus 43 via the interface connector 611 to transmit/receive data and commands according to the SCSI method. The SCSI bus control circuit 603 sends the SCSI AV data read command (READ_AV) to the disk reproduction drive 46 in accordance with an instruction from the microprocessor 610, to request the disk reproduction drive 46 to read AV data in the optical disk 41.

The data buffer 604 receives data on the control bus 608 and the internal data bus 609 and temporarily stores the data.

The CGMS data detection/identification circuit 605 detects CGMS control data from the input digital data and judges the data attribute from the value of the data attribute code of the CGMS control data. When the input digital data is AV data, The CGMS data detection/identification circuit 605 outputs only user data to the MPEG decoder 606. When the input digital data is not AV data, the CGMS data detection/identification circuit 605 stops the output of the digital data to the MPEG decoder 606.

The MPEG decoder 606 performs a predetermined processing to the input digital data which is an MPEG stream, and converts the digital data into video digital data and audio digital data, and outputs the converted data. The D/A conversion circuit 607 converts the audio digital data sent from the MPEG decoder 606 into audio analog data, and outputs the converted data.

The control bus 608 transmits instruction information sent from the microprocessor 609 and processing result information output from the respective circuits. The internal data bus 609 is connected to the I/O bus control circuit 601, the SCSI bus control circuit 603, the data buffer 604 and the CGMS data detection/identification circuit 605, and transmits digital data from the respective devices.

The microprocessor 610 controls the entire AV signal processor 47 by identifying I/O commands input to the I/O command status register 602 and SCSI commands received by the SCSI bus control circuit 603. Hereinbelow, only commands in relation with the present invention, i.e., a data read I/O command (IO_READ), an AV data reproduction I/O command (IO_PLAY), and the SCSI authentication command (INQUIRY) will be described.

When the microprocessor 610 judges that the SCSI command input into the SCSI bus control circuit 603 is the SCSI authentication command (INQUIRY), it controls the SCSI bus control circuit 603 to send back the device attribute data of the AV signal processor 47 to the device which has sent the SCSI authentication command (INQUIRY). The format of the device attribute data is as shown in FIG. 8. The device type code of the AV signal processor 47 is the "AV signal processing device (10010)" which represents a type of the AV device described above.

When the microprocessor 610 judges that the command input into the I/O command status register 602 is the data read I/O command (IO_READ), it controls the SCSI bus control circuit 603 to send the SCSI read command (READ) for reading digital data in the optical disk 41 to the disk reproduction drive 46. The microprocessor 610 then temporarily stores the digital data received by the SCSI bus control circuit 603 in the data buffer 604 and controls the I/O bus control circuit 601 to output the digital data stored in the data buffer 604 to the controller 49 via the I/O bus 42.

When the microprocessor 610 judges that the command input into the I/O command status register 602 is the AV data reproduction I/O command (IO_PLAY), mutual authentication is performed with the disk reproduction drive 46. More specifically, the microprocessor 610 controls the SCSI bus control circuit 603 to send the SCSI authentication command (INQUIRY) to the disk reproduction drive 46 and judges whether or not the data transmitting device is an AV device based on the device attribute data sent back from the device. When the device type of the data transmitting device is not an AV device, the microprocessor 610 stores an error status in the I/O command status register 602 and terminates the processing.

When the device type of the data transmitting device is authenticated to be an AV device, the microprocessor 610 controls the SCSI bus control circuit 603 to send the SCSI AV data read command (READ_AV) to the disk reproduction drive 46. The microprocessor 610 temporarily stores the received digital data in the data buffer 604 and then transmits the digital data to the CGMS data detection/identification circuit 605. When the CGMS data detection/identification circuit 605 judges that the digital data is AV data, it transmits the digital data to the MPEG decoder 606. When it judges that the digital data is not AV data, it stops the output of the digital data to the MPEG decoder 606. The digital data received by the MPEG decoder 606 is subjected to a predetermined process and converted into a digital video signal and a digital audio signal. The digital video signal is output to the video signal processor 48. The digital audio signal is converted into an analog audio signal by the D/A conversion circuit 607 and audibly output via a speaker 47S.

The interface connector 611 connects the AV signal processor 47 to the SCSI bus 43. When digital data is received from a device which has been authenticated to be an AV device and the received data is judged to be AV data by the CGMS data detection/identification circuit 605, the microprocessor 610 prohibits the digital data input into the AV signal processor 47 and held in the data buffer 604 from being output outside the AV signal processor 47 via the connector 600 or the interface connector 611 before being input into the MPEG decoder 606. More specifically, the digital data is prohibited from being output via the connector 600 by disabling an address line or a data line from the connector 600 to the data buffer 604. Also, the digital data is prohibited from being output via the interface connector 611 by neglecting an SCSI command requesting to output the data in the data buffer 604 even if such a command is received by the interface connector 611. The description of the AV signal processor 47 is terminated here.

The video signal processor 48 generates graphic data in accordance with an instruction from the controller 49, synthesizes the video digital data sent from the AV signal processor 47 with the generated graphic data, and converts the synthesized data into an analog video signal to be visually output via a display device 48D.

The controller 49 includes a processor bus 49B, a CPU 49C, a bus interface (I/F) 49I, and a main memory 49M. The CPU 49C is connected to the bus I/F 49I and the main memory 49M via the processor bus 49B. The controller 49 controls the retrieval of digital data from the optical disk 41 and the transmission of the digital data in accordance with external commands received by the input section 45 under the control of the operating system (OS) and a program for controlling reproduction of data from the optical disk 41 loaded in the main memory 49M. The file management information in the optical disk 41 is retrieved at the initialization operation performed in loading the optical disk 41, and stored in the main memory 49M of the controller 49. By searching the file management information in accordance with the ISO 13346 standard, the recording address of a file stored in the optical disk 41 can be obtained from the file name.

The controller 49 performs an AV data reproduction control when the input section 45 receives an external command for reproducing an AV data file, and performs a copying control when the input section 45 receives an external command of copying a file stored in the optical disk 41.

In the AV data reproduction control, the controller 49 judges whether or not the specified file is a file which stores the AV data. More specifically, when the specified file is stored under a directory named DVD_VIDEO, the file is judged to be an AV data file. The controller 49 sends the AV data reproduction command (IO_PLAY) to the AV signal processor 47 via the I/O bus 42 so as to read the file. When the specified file is judged not to be an AV data file, the controller 49 warns the user that there occurs an error by a beeping sound and the like.

In the copying control, the controller 49 judges whether or not the specified file is a file which stores the AV data from the directory name under which the file is stored. When the specified file is judged not to be an AV data file, the controller 49 sends the data read I/O command (IO_READ) to the AV signal processor 47 via the I/O bus 42 so as to read the file. When the specified file is judged to be an AV data file, the controller 49 warns the user that there occurs an error by a beeping sound and the like as copyright protection processing.

The controller 49 also outputs the I/O command mentioned above, the controller 49 also outputs the ID code for specifying a drive for reading data and the start address of a file to be reproduced as parameters affixed to the I/O commands.

Hereinbelow, the operation for reproducing data in the above information recording medium by the above information processing apparatus with the above configuration will be described. Herein, it is assumed that the file management information is held in the main memory 49M of the controller 49 at the initialization operation performed when the optical disk 41 is mounted in the disk reproduction drive 46.

Figure 9:
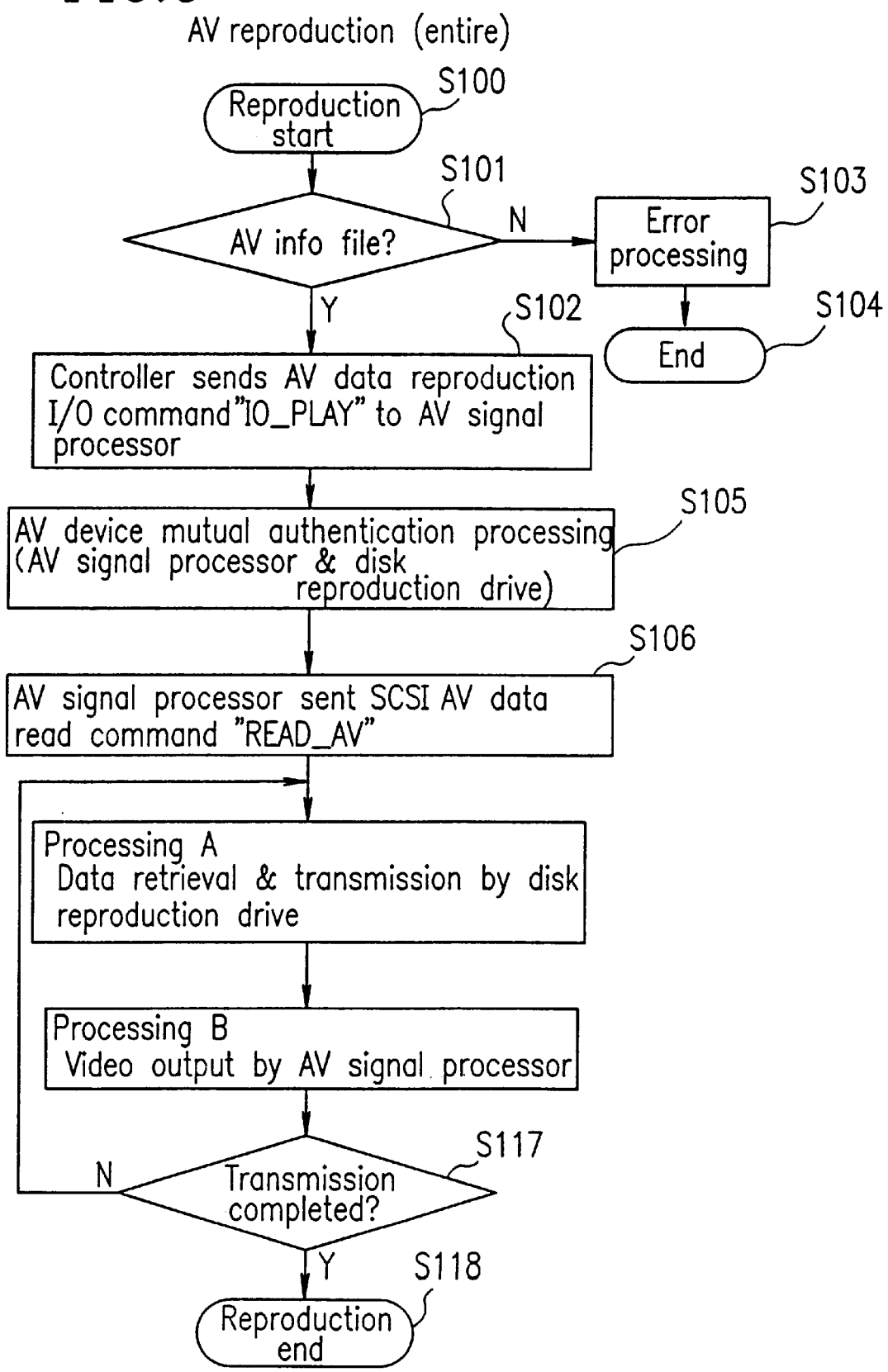
FIG. 9 is a flowchart showing a process for reproducing an AV data file in the optical disk 41.

First, the operation of the information processing apparatus performed when an AV data file is reproduced and output will be described. FIG. 9 is a flowchart showing a process for reproducing an AV data file in the optical disk 41.

When the controller 49 receives a request for reproducing an AV data file (step S100), it judges whether or not the specified data file is an AV data file by examining the name of a directory under which the specified data file is stored (step S101).

If the controller 49 judges that the specified data file is an AV data file, it sends an AV data reproduction I/O command (IO_PLAY) to the AV signal processor 47 requesting to read the data file from the disk reproduction drive 46 (step S102). If the controller 49 judges that the specified data file is not an AV data file, it performs an error processing (e.g., warns the user that there occurs an error by a beeping sound) (step S103), and terminates the process (step S104).

Upon receipt of the AV data reproduction I/O command (IO_PLAY), the AV signal processor 47 sends the SCSI authentication command (INQUIRY) to the disk reproduction drive 46 to perform the AV device mutual authentication (step S105).

When the AV device mutual authentication is found successful, the AV signal processor 47 sends the SCSI AV data read command (READ_AV) to the disk reproduction drive 46 (step S106).

Figure 10:
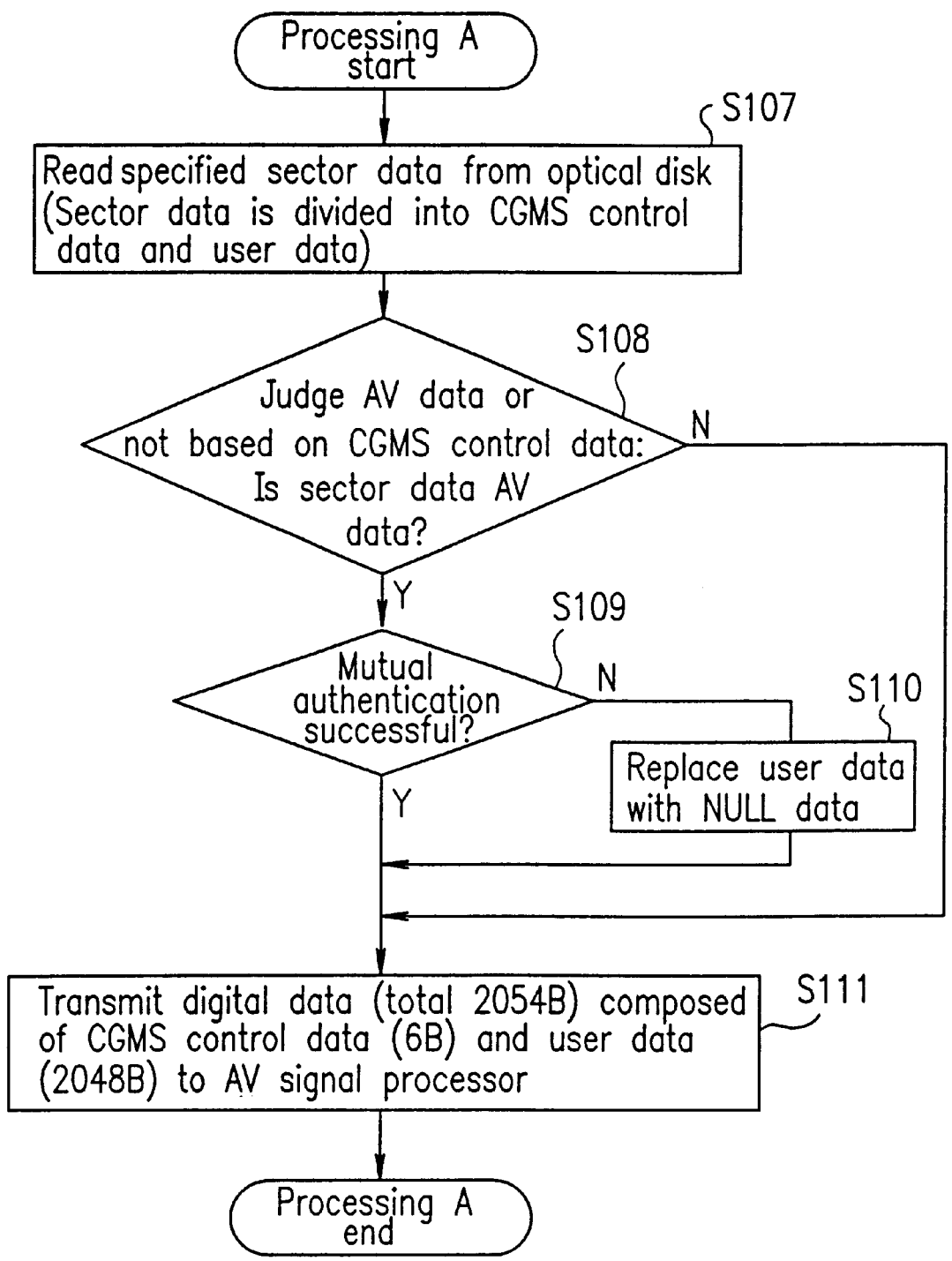
FIG. 10 is a flowchart showing the steps of processing A.

Then, processing A is performed. FIG. 10 is a flowchart showing the steps of processing A. The disk reproduction drive 46 which has received the SCSI AV data read command (READ_AV) reads data from a specified address in the optical disk 41, and stores the CGMS control data and user data in the CGMS control data memory 502 and the user data memory 503, respectively (step S107). Then, it is judged whether or not the sector data is AV data based on the CGMS control data (step S108). If the sector data is not AV data, the process jumps to step Sill. If the sector data is AV data, the process proceeds to step S109.

The disk reproduction drive 46 judges whether or not the AV device mutual authentication is successful (i.e., whether or not the receiving device is a proper data receiving device) (step S109). If successful, the data of a total of 2054 bytes composed of the CGMS control data (6 bytes) and the user data (2048 bytes) as a data transmission unit is transmitted to the AV signal processor 47 (step S111). If not successful, the disk reproduction drive 46 replaces the user data with null data in the user data replacing circuit 506 (step S110) and transmits the null data to the AV signal processor 47 (step S111).

Figure 11:
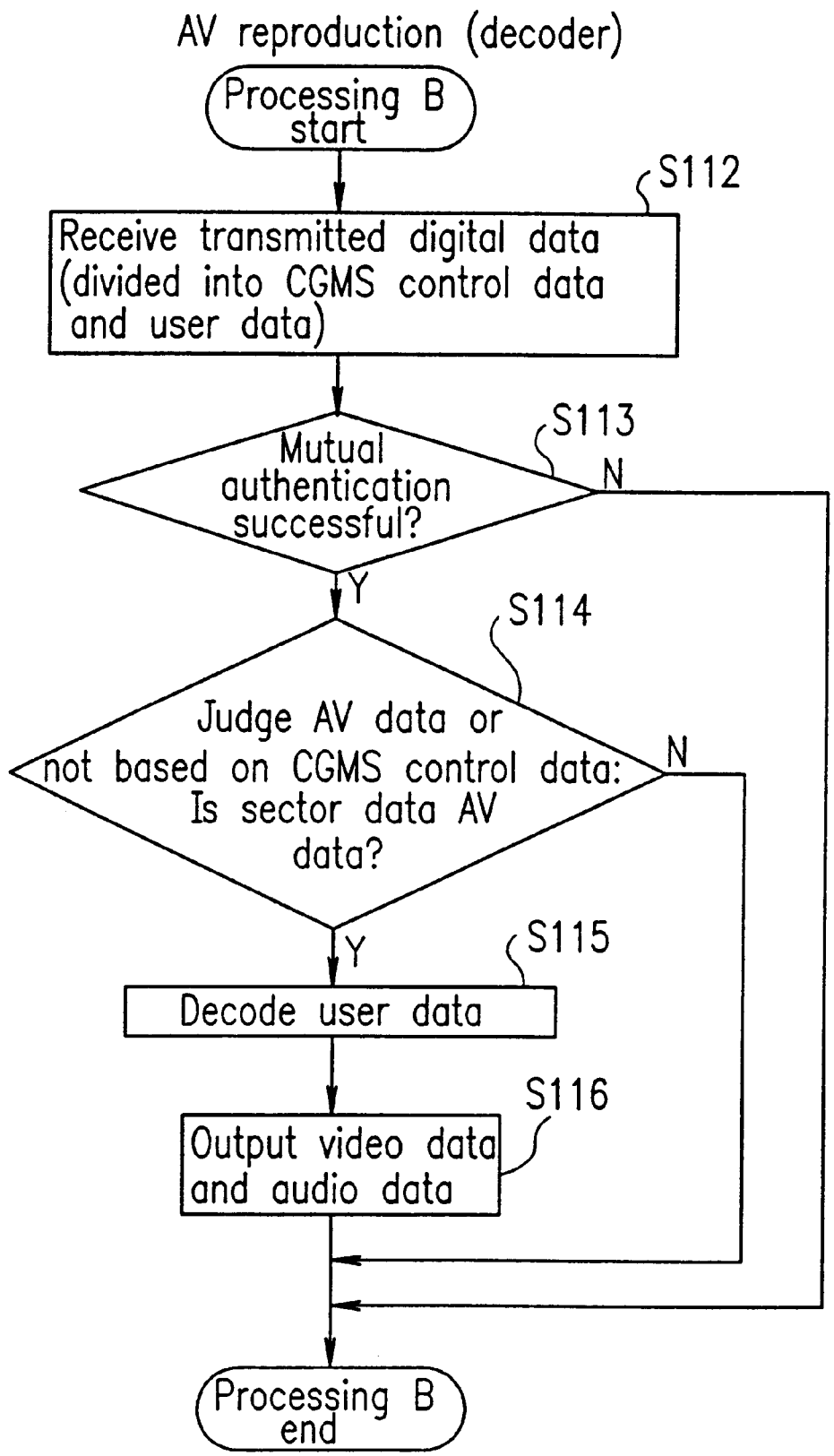
FIG. 11 is a flowchart showing the steps of processing B.

Subsequently, processing B is performed. FIG. 11 is a flowchart showing the steps of processing B. The AV signal processor 47 receives the digital data from the disk reproduction drive 46 and separates the digital data into the CGMS control data and the user data (step S112). The AV signal processor 47 judges whether or not the AV device mutual authentication is successful (i.e., whether or not the transmitting device is a proper data transmitting device) (step S113). If not successful, processing B is terminated. If successful, it is judged whether or not the user data is AV data based on the CGMS control data. If the user data is not AV data, processing B is terminated. If the user data is AV data, the user data is decoded (step S115) and output as video data and audio data (step S116). Processing B is then terminated.

The analog audio signal is output via the speaker 47S, while the digital video signal is synthesized with graphic data by the video signal processor 48, converted into an analog video signal, and visually displayed on the display device 48D as images (step S116).

The above process is repeated for a specified length of transmission, and then the processing for reproducing the AV data file is terminated (steps S117 and S118).

The operation of the information processing apparatus performed when a file in the optical disk 41 is copied to the recording section 44 as a hard disk will be described.

Figure 12:
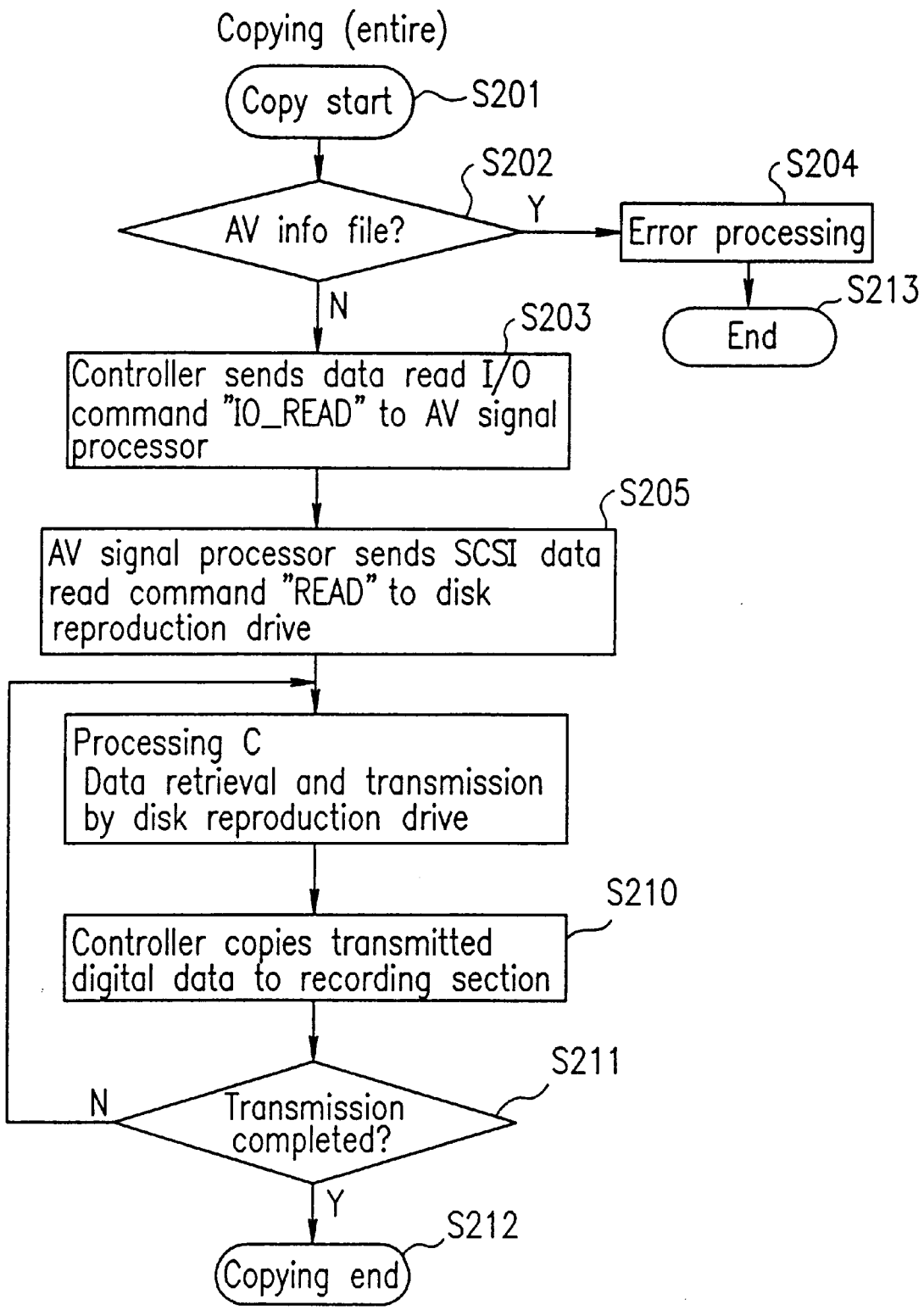
FIG. 12 is a flowchart showing a process for copying a file in the optical disk 41 to a recording section 44.

FIG. 12 is a flowchart showing the steps of copying a file in the optical disk 41 to the recording section 44. When the controller 49 receives a request for copying a file, it judges whether or not the specified file is an AV data file by examining the name of a directory under which the specified file is stored (steps S201 and S202).

If the controller 49 judges that the specified file is an AV data file, it informs the user by an error message and terminates the process (steps S202, S204 and S213). If the controller 49 judges that the specified file is not an AV data file, it sends the data read I/O command (IO_READ) to the AV signal processor 47 (steps S202 and S203).

The AV signal processor 47 which has received the data read I/O command (IO_READ) sends the SCSI data read command (READ) to the disk reproduction drive 46 (step S205).

Figure 13:
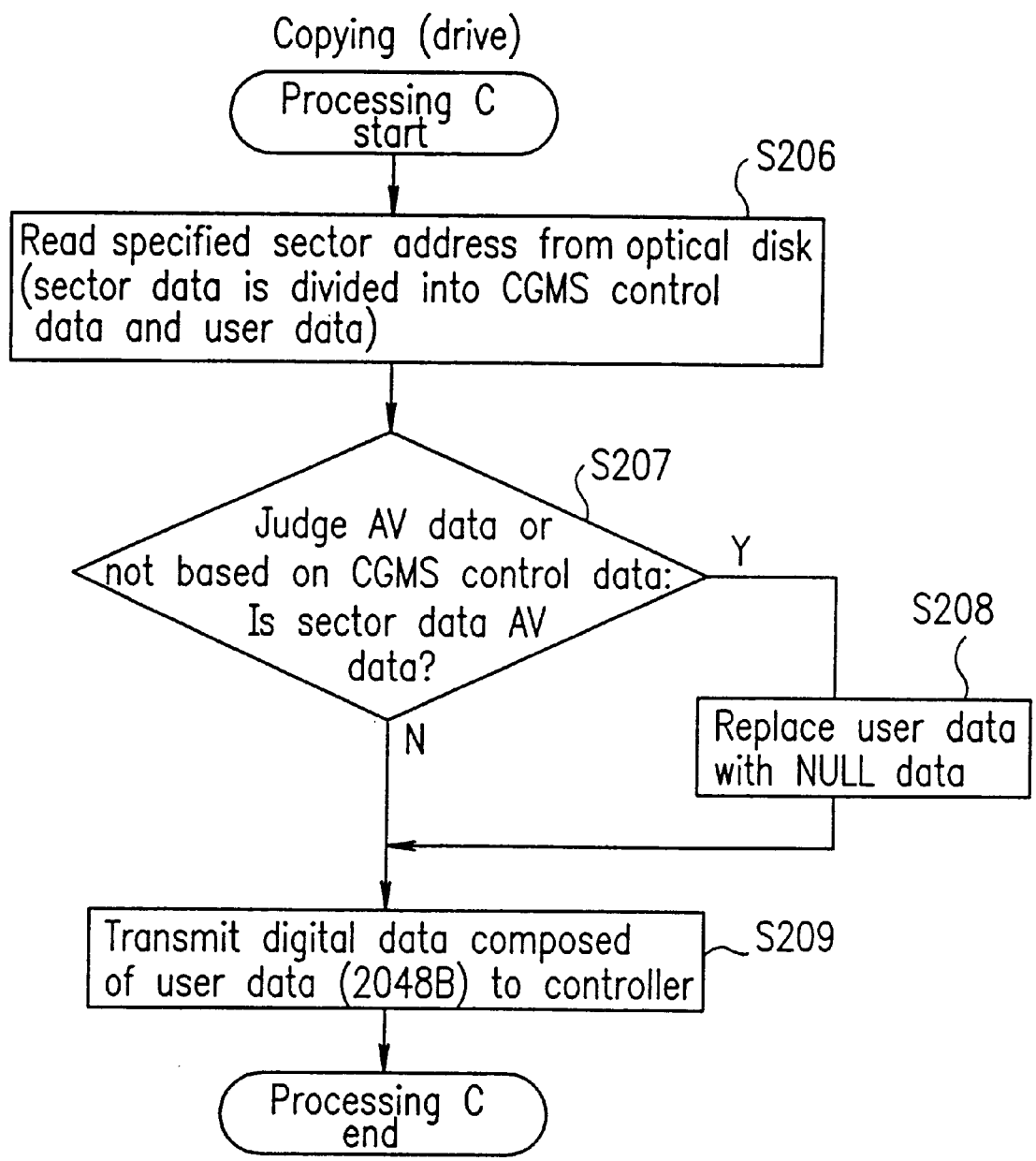
FIG. 13 is a flowchart showing the steps of processing C.

Then, processing C is performed. FIG. 13 is a flowchart showing the steps of processing C. The disk reproduction drive 46 which has received the SCSI data read command (READ) reads digital data from a specified address in the optical disk 41, and detects the CGMS control data prefixed to the user data of the digital data (step S206). The disk reproduction drive 46 then judges whether or not the data attribute of the user data is AV data based on the CGMS control data (step S207). If it is judged that the data attribute of the read user data is not AV data, the disk reproduction drive 46 transmits the user data (2048 bytes) to the AV signal processor 47 (step S209). Reversely, if it is judged that the data attribute of the read user data is AV data, the disk reproduction drive 46 replaces the user data with null data in the user data replacing circuit 506 and transmits the null data to the AV signal processor 47 (step S208).

The digital data transmitted to the AV signal processor 47 is re-transmitted to the controller 49, and then written in the recording section 44 by the controller 49 (step S210). More specifically, the controller 49 sends back the digital data to the AV signal processor 47, together with the data write I/O command (IO_WRITE) specifying the recording section 44 as the destination device. The AV signal processor 47 writes the input digital data to the recording section 44 in response to the SCSI data write command (WRITE).

The above process is repeated for a specified length of transmission, and then the processing for copying a file is terminated (steps S211 and S212).

Figure 14:
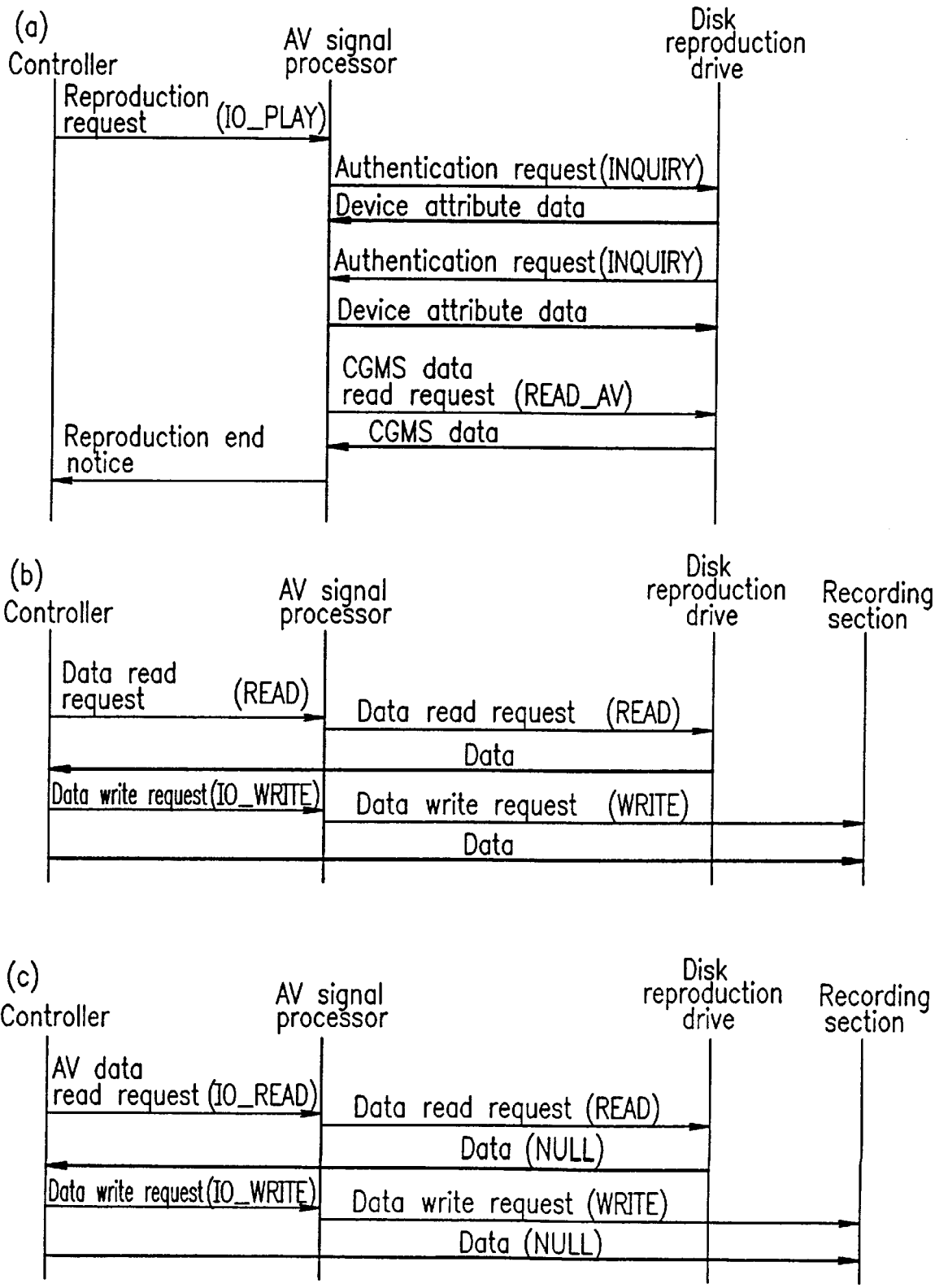
FIG. 14 is a view illustrating a protocol used when AV data reproduction operation and copying operation are realized.

FIG. 14 shows protocols for the above AV data reproduction and copying operations. Portion (a) of FIG. 14 corresponds to the reproduction operation of a file shown in FIGS. 9, 10 and 11. Portion (b) of FIG. 14 corresponds to the copying operation of a non-AV data file shown in FIGS. 12 and 13. Portion (c) of FIG. 14 corresponds to the copying operation of an AV data file shown in FIGS. 12 and 13.

As described above, the data transmitting device (the disk reproduction drive 46) of the information processing apparatus according to the present invention is provided with the control section which controls to output the AV data only when the digital data is judged to include AV data and the data receiving device is authenticated to be a proper data receiving device. The data receiving device (the AV signal processor 47) of the information processing apparatus according to the present invention has the function of converting digital data into video data and is provided with the authentication section which generates and outputs authentication data indicating this. Thus, the information processing apparatus according to the present invention including the data transmitting device and the data receiving device can prohibit AV data from being output to devices other than a proper data receiving device which performs video reproduction.

With the above configuration, even if the user mistakenly input a command of copying an AV data file to the recording section 44, the AV data file is not output from the disk reproduction drive 46, and thus it is not copied to the recording section 44, since the recording section 44 fails to respond to the authentication inquiry from the disk reproduction drive 46.

With the above configuration, even if the SCSI data read command (READ) requesting to read an AV data file and send it to the recording section 44 is sent to the disk reproduction drive 46 due to an error in the OS or a reproduction control program loaded in the controller 49, the disk reproduction drive 46 outputs digital data only when the SCSI AV data read command (READ_AV) is received. This prevents digital data in the AV data file from being mistakenly stored in the recording section 44.

As another erroneous operation due to an error in the reproduction control program, the SCSI AV data read command (READ_AV) requesting to read an AV data file and send it to the recording section 44 may be received by the disk reproduction drive 46. According to the present invention, in order to output digital data under the SCSI AV data read command (READ_AV), the mutual authentication should be successfully performed to authenticate that the destination of the digital data is an AV device. When the recording section 44 is specified as the destination, the mutual authentication is not successful. Thus, the information processing apparatus of this example prevents AV data from being mistakenly output to the recording section 44.

In the authentication by the data transmitting device and the data receiving device mentioned above, the authentication data may be changed every time they are generated. This ensures the protection of AV data at a high security level.

In the data transmitting device and the data receiving device mentioned above, both the data transmitting device and the data receiving device authenticate each other (mutual authentication). This ensures the protection of AV data at a higher security level than authentication by only one device. The mutual authentication is significant to the copyright protection processing for the following reasons. The data transmitting device authenticates a proper data receiving device so as to prevent AV data from being output to a device which does not have the video reproduction function such as the recording section. The data receiving device authenticates a proper data transmitting device so that AV data which has happened to be recorded in the recording section and the like due to an erroneous operation or left undeleted in the memory of the controller will not be visually reproduced.

In the judgement by the data transmitting device mentioned above, it is judged whether or not digital data recorded in the information recording medium includes AV data based on the data attribute flag stored in the header region of each sector. This realizes delicate protection of AV data per sector.

When the destination of the AV data is not a proper data receiving device or is not authenticated to be a proper data receiving device, the data transmitting device can replace the AV data with null data having the same length as the AV data and output the replaced data, as the copyright protection processing. This makes it possible to prohibit the output of video digital data without affecting the OS and the like in the controller 49.

According to the information processing apparatus of this example, the controller 49 can indirectly instruct the disk reproduction drive 46 to read digital data via the AV signal processor 47. As a result, AV digital data can be directly sent to the AV signal processor 47, not via the controller 49. This avoids a trouble that AV data is extracted when it is held in the controller 49 due to an error of the reproduction control program and the like.

The data transmitting device outputs digital data together with data attribute information thereof. The data receiving device may be configured to include the controller 49 prohibits input digital data from being output externally without converting the digital data into a video data and the AV data is not converted into video data (i.e., digital data obtained by decompressing the MPEG stream) if the input digital data includes AV data (an MPEG stream). This prevents the AV data from being extracted by the controller 49 without being converted into video data. Thus, together with the above-described effect, it is completely ensured that video data is transmitted only between the data transmitting device and the data receiving device.

In general, since the amount of decompressed video data becomes enormous, storing such decompressed video data in a secondary memory is economically impractical. Output of decompressed digital data to the controller is therefore considered allowable under the copyright protection. It may be possible to output the decompressed digital data to the controller 49 after it is converted into video data.

In the data receiving device, the conversion of digital data into video data may be discontinued if the present digital data is found not to be AV data by judging the data attribute information sent together with the digital data. This protects the display device connected to the video output and the speaker connected to the audio output from being destroyed due to an abnormal signal generated because computer data has been included in the digital data due to an erroneous operation and the like.

In this example, all instructions of the controller 49 to the disk reproduction drive 46 requesting to read digital data were directed to the AV signal processor 47. Actually, these instructions other than the AV data reproduction I/O command (IO_PLAY) are not necessarily sent via the AV signal processor 47. As for the data read I/O command (IO_

READ), therefore, the controller 49 may directly send the SCSI data read command (READ) to the disk reproduction drive 46 through an SCSI control board which is separately provided.

In the information processing apparatus of this example, it is preferable to set an actual parameter for image information stored in the optical disk 41 as follows. That is, it is preferable to record high-resolution moving information with a horizontal resolution of 450 lines or more to the optical disk 41 as data complying with the MPEG standard (i.e., as inter-flame compressed digital data). This provides high image quality required for movie applications, and thus the effect of the copyright protection according to the present invention is remarkable.

According to the information recording medium of this example, AV digital data can be recorded so as to be doubly authenticated at the file management level and the sector management level. Accordingly, AV digital data can be identified by any of an apparatus which authenticates data only at the file management level (e.g., a personal computer) and an apparatus which authenticates data only at the sector management level (e.g., a disk drive). A system including a personal computer and a disk drive can therefore identify whether or not digital data transmitted inside the system is AV data. Such an information recording medium is suitable for an information recording medium reproduced by the information processing apparatus according to the present invention.

EXAMPLE 2

Figure 15:
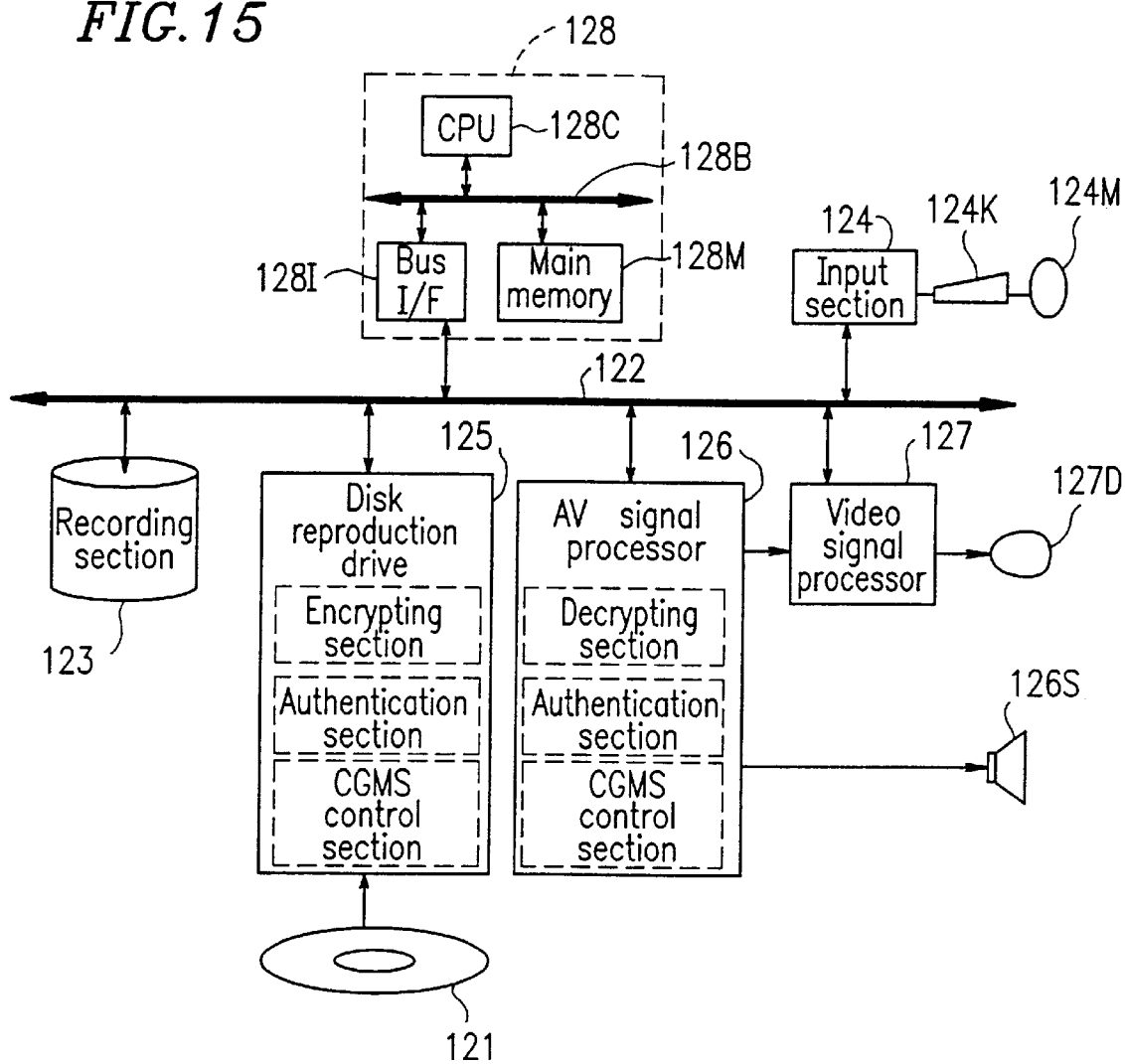
FIG. 15 is a block diagram of an information processing apparatus of Example 2 according to the present invention.

FIG. 15 is a block diagram of an information processing apparatus of Example 2 according to the present invention. The information processing apparatus shown in FIG. 15 includes a disk reproduction drive 125 as the data transmitting device and an AV signal processor 126 as the data receiving device. An I/O bus 122 is used as a digital interface for the transmission of AV data between the these two devices. In FIG. 15, reference numeral 121 denotes an optical disk, reference numeral 122 denotes an I/O bus, reference numeral 123 denotes a recording section, reference numeral 124 denotes an input section, reference numeral 125 denotes a disk reproduction drive, reference numeral 126 denotes an AV signal processor, reference numeral 127 denotes a video signal processor and reference numeral 128 denotes a controller.

In Example 2, unlike Example 1 where the SCSI is used as the digital interface, an ATAPI (at attachment packet interface) where both the disk reproduction drive 125 and the AV signal processor 126 are connected to the I/O bus 122 is used as the digital interface. In the ATAPI, unlike the SCSI, since only the controller 128 can be a bus master, direct exchange of AV data and commands between the disk reproduction drive 125 and the AV signal processor 126 is not allowed. All AV data and commands are first transmitted to the controller 128 via the I/O bus 122 and then delivered to final destination devices through the controller 128. Accordingly, in order to protect AV data at a high security level, the information processing apparatus of Example 2 is provided with components which encrypt and decrypt data, in addition to the mutual authentication between the data transmitting device and the data receiving device. With this configuration, since AV data has been encrypted, the copyright protection of AV data is ensured even if AV data on the I/O bus 122 is extracted by the controller 128 due to an erroneous operation.

Now, the configuration and the operation of the information processing apparatus of Example 2 will be described.

The optical disk 121 as the information recording medium is a disk in accordance with the DVD standard. The optical disk 121 stores digital data in accordance with the disk structure and the data structure described in Example 1 with reference to FIGS. 1, 2, 3 and 4.

The I/O bus 122 is an internal bus for connecting the controller 128, the input section 124, the recording section 123, the disk reproduction drive 125, the AV signal processor 126, and the video signal processor 127. As the I/O bus 122, a PCI bus or an ISA bus may be used, for example.

The recording section 123 is typically a hard disk, which records digital data and outputs the recorded digital data in response to an instruction from the controller 128. The recording section 123 is not limited to a hard disk. As long as the recording section 123 has a function of secondarily record digital data, it may be any type of memory. For example, the recording section 123 may be a magneto-optical (MO) disk.

The input section 124 for receiving external instructions from the user is connected with a mouse 124M and a keyboard 124K.

The video signal processor 127 generates graphic data in accordance with an instruction from the controller 128, synthesizes the video digital data sent from the AV signal processor 126 with the generated graphic data, and converts the synthesized data into an analog video signal to be visually output via a display device 127D.

Figure 16:
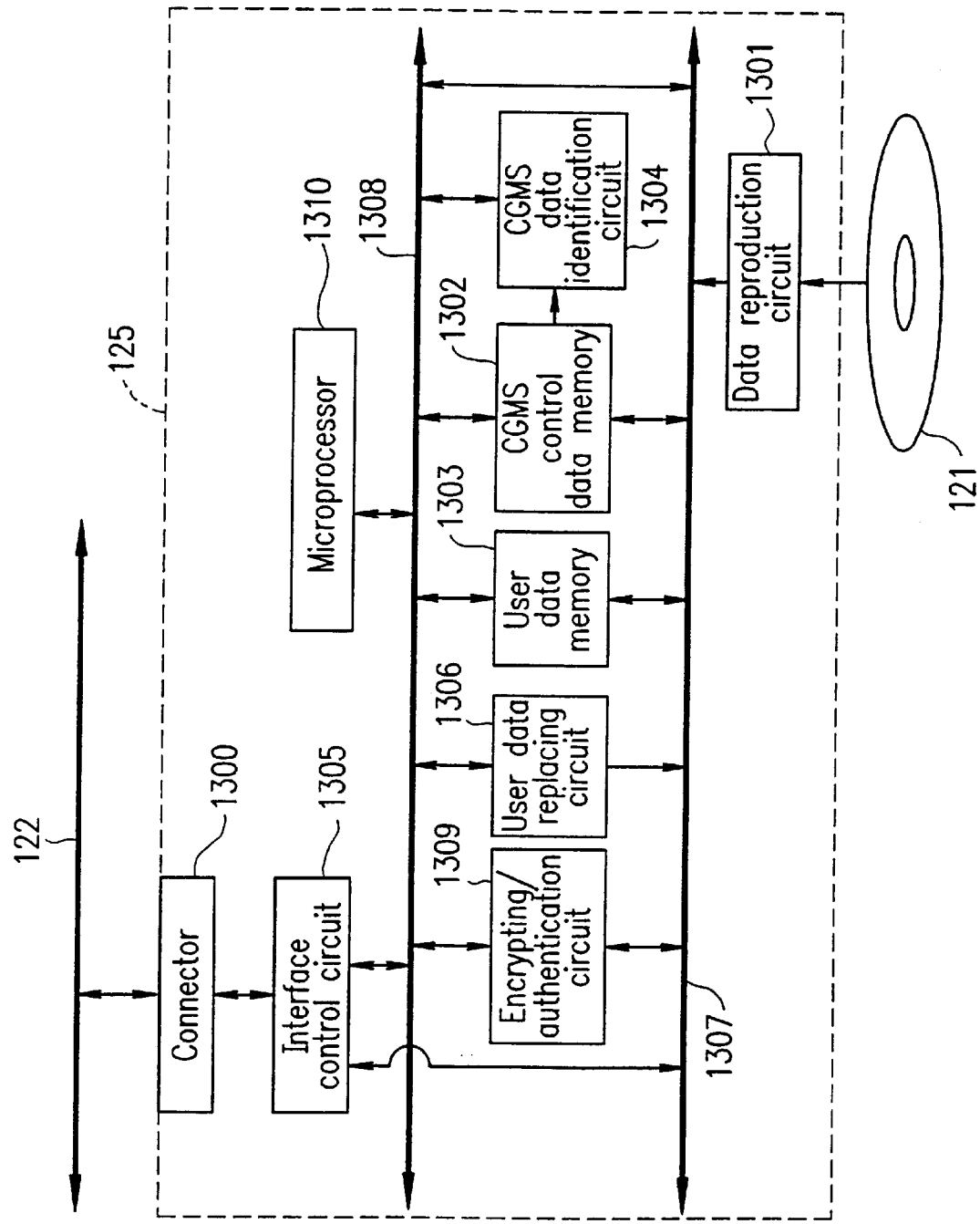
FIG. 16 is a block diagram of a disk reproduction drive 125.

FIG. 16 is a block diagram of the disk reproduction drive 125. As shown in FIG. 16, the disk reproduction drive 125 includes a connector 1300, a data reproduction circuit 1301, a CGMS (copy generation management system) control data memory 1302, a user data memory 1303, a CGMS data identification circuit 1304, an interface control circuit 1305, a user data replacing circuit 1306, an internal data bus 1307, a control bus 1308, an encrypting/authentication circuit 1309, and a microprocessor 1310.

Hereinafter, the configuration and the operation of the disk reproduction drive 125 will be described. The connector 1300 connects the disk reproduction drive 125 to the I/O bus 122. The data reproduction circuit 1301 controls a relevant disk driver (not shown) in accordance with a specified sector number as address information, and reads digital data stored in the specified sector from the optical disk 121. The information recording region of the optical disk 121 has a sector structure, and each sector has the header region and the user data region. User data stored in the user data region is stored in the user data memory 1303, while CGMS control data stored in the header region is stored in the CGMS control data memory 1302. The CGMS control data is used to manage the generation of copying by controlling reproduction of the sector.

The CGMS control data memory 1302 receives the CGMS control data via the internal data bus 1307 and stores the data. The user data memory 1303 receives the user data via the internal data bus 1307 and stores the data.

The CGMS data identification circuit 1304 records the CGMS control data stored in the CGMS control data memory 1302, determines whether the data attribute of the user data stored in the user data memory 1303 is "unspecified" or "AV data" based on the data attribute code of the CGMS control data, and sends the results to the microprocessor 1310. The CGMS data identification circuit 1304 also determines whether the copy restricting information of the user data stored in the user data memory 1303 is "copying permitted", "one-generation copying permitted", or "copying prohibited" based on the CGMS data of the CGMS control data and sends the results to the microprocessor 1310.

The interface control circuit 1305 controls the transmission/receiving of commands and data via the I/O bus 122 according to the ATAPI (at attachment packet interface) method.

The user data replacing circuit 1306 reads the user data stored in the user data memory 1303 in response to an instruction from the microprocessor 1310 and replaces the data with null data.

The internal data bus 1307 transmits data read by the data reproduction circuit 1301 or data output from the interface control circuit 1305 to the I/O bus 122. The control bus 1308 transmits instruction information output from the microprocessor 1310 and processing result information output from the respective circuits.

The encrypting/authentication circuit 1309 encrypts digital data to be output to the I/O bus 122 and performs authentication prior to the output of the digital data, in accordance with the request from the microprocessor 1310. The authentication in this example is performed by exchanging authentication data between the data transmitting device and the data receiving device so as to authenticate whether or not the respective devices are proper devices. The authentication performed by the encrypting/authentication circuit 1309 includes generating authentication data, judging authentication results, and generating proof data. The encrypting performed by the encrypting/authentication circuit 1309 includes generating a encrypting key and encrypting. The encrypting/authentication circuit 1309 performs a random number generation operation and an operation represented by an encrypting function E(KEY, DATA). Hereinbelow, the random number generation operation and the encrypting function E(KEY, DATA) will be described.

An encrypting function E(KEY1, DATA) encrypts data "DATA" with an encrypting key "KEY1". The encrypting function E(KEY1, DATA) has an inverse function, i.e., a decrypting function D(KEY2, DATA) where KEY2 denotes a decrypting key. That is, when EncryptData=E(KEY1, Data) where "EncryptData" denotes encrypted data, Data= D(KEY2, EncryptData) is satisfied. Accordingly, the original data "Data" can be obtained by operating the decrypting function D(KEY2, EncryptData) for the encrypted data "EncryptData" which has been encrypted by the encrypting function E(KEY1, Data). In this example, it is assumed that the encrypting key KEY1 in the encrypting function E is equal to the decrypting key KEY2 in the decrypting function D (i.e., "KEY1"="KEY2").

The random number generation operation generates a 16-bit random number. Typically, such random number is generated using a dynamic hardware value. For example, data for initialization which is different depending on each of the applications stored in the lead-in region of the optical disk may be used as the random number, since it is held in the disk reproduction drive prior to the reproduction of digital data. Alternatively, a timer may be additionally provided and used for the generation of the random number.

The operations performed by the encrypting/authentication circuit 1309, i.e., generation of authentication data, judgment of authentication results, generation of proof data, generation of the encrypting key, and encrypting will be described in this order.

The generation of authentication data performed by the encrypting/authentication circuit 1309 will be described. The encrypting/authentication circuit 1309 first generates two 16-bit random numbers R1 and R2, and integrates the two random numbers to obtain 32-bit data with the random number R1 as the 16 most significant bits and the random number R2 as the 16 least significant bits. This 32-bit data is herein represented as "data R1∥R2". The encrypting/authentication circuit 1309 previously holds an encrypting key S therein as a fixed key. Authentication data C1 is generated using the data R1∥R2, the encrypting key S, and the encrypting function E(KEY, DATA). Specifically, the equation C1=E(S, R1∥R2) is established.

Next, the judgment of authentication results performed by the encrypting/authentication circuit 1309 will be described. The disk reproduction drive 125 as the data transmitting device authenticates whether or not the AV signal processor 126 as the data receiving device is a proper data receiving device. The authentication whether or not the data receiving device is a proper data receiving devices is realized by judging whether or not the data receiving device has the decrypting function D(KEY, DATA) and the decrypting key S. The steps for the judgement are as follows. The disk reproduction drive 125 first outputs authentication data C1 (=E(S, R1∥R2)) obtained in the generation of authentication data described above to the AV signal processor 126 which is the object of the authentication. The AV signal processor 126 calculates a variable corresponding to the random number R2 from the received authentication data C1 and sends the results back to the disk reproduction drive 125 as proof data K1. If the AV signal processor 126 has the decrypting function D(KEY, DATA) and the decrypting key S, it can calculate the random number R2 from the authentication data C1 because the authentication data C1 is obtained by converting the data R1∥R2 using the encrypting function E(KEY, DATA) and the encrypting key S. The disk reproduction drive 125 judges the authentication results using the proof data K1 from the data receiving device input via the microprocessor 1310. If K1=R2, the authentication is successful, which is announced to the microprocessor 1310. If K1≠R2, the authentication fails, which is also announced to the microprocessor 1310.

In reverse, when the disk reproduction drive 125 is the object for authentication by the AV signal processor 126, the disk reproduction drive 125 is requested to generate proof data to prove that it is a proper data transmitting device for the data receiving device. The encrypting/authentication circuit 1309 has a function of generating proof data. Specifically, the disk reproduction drive 125 proves itself as a proper data transmitting device by showing to the AV signal processor 126 that it has the encrypting function E(KEY, DATA) and the encrypting key S. More specifically, the AV signal processor 126 sends authentication data C2 obtained by converting data R3∥R4 composed of two random numbers R3 and R4 using the decrypting function D(KEY, DATA) and the decrypting key S to the disk reproduction drive 125. The authentication data C2 is equal to D(S, R3∥R4). The disk reproduction drive 125 obtains a value corresponding to the random number R4 from the received authentication data C2 using the encrypting function E(KEY, DATA) and the encrypting key S possessed by the disk reproduction drive 125, and sends the value back to the AV signal processor 126 as proof data K2. More precisely, the data R3∥R4 is obtained by operating E(S, C2), and then the value corresponding to the random number R4 which is obtained by further operation is output as the proof data K2. The AV signal processor 126 judges the authentication results using the proof data K2 from the data transmitting device. If K2=R4, the authentication is successful. If K2≠R4, the authentication fails.

In the generation of the encrypting key, the data R1∥R3 composed of the random numbers R1 and R3 obtained in the generation of authentication data and proof data is generated as the encrypting key, if the microprocessor 1310 instructs to do so. This encrypting key therefore has a different value each time the authentication is performed between the disk reproduction drive 125 and a data receiving device.

In the encrypting operation, the input digital data is encrypted using the encrypting function E(KEY, DATA) and the encrypting key R1∥R3 which is generated in the generation of the encrypting key. More specifically, the input data "Data" is converted into encrypted data "EncryptData" by operating EncryptData=E(R1∥R3, Data).

The microprocessor 1310 controls the entire disk reproduction drive 125. Hereinbelow, the control by the microprocessor 1310 upon receipt of commands in relation with the present invention, i.e., the data read command (READ), the AV data read command (READ_AV), a data receiving device authentication request command (CHALLENGE_RECEIVER), a data receiving device confirmation request command (CONFIRM_RECEIVER), a data transmitting device proof request command (PROOF_SENDER), and a proof data request command (GET_PROOF_INFO) will be described. The data receiving device authentication request command (CHALLENGE_RECEIVER), the data receiving device confirmation request command (CONFIRM_RECEIVER), the data transmitting device proof request command (PROOF_SENDER), and the proof data request command (GET_PROOF_INFO) are input in a series of authentication operations performed prior to the input of the AV data read command (READ_AV).

When the microprocessor 1310 judges that the received command is the data read command (READ), it controls the data reproduction circuit 1301 to read digital data in the optical disk 121 in accordance with the sector number affixed to the command as a parameter. The digital data read by the data reproduction circuit 1301 is separated into CGMS control data stored in the header region of the sector and user data stored in the user data region of the sector, and these data are stored in the CGMS control data memory 1302 and the user data memory 1303, respectively.

After the digital data of the sector is read, the microprocessor 1310 instructs the CGMS data identification circuit 1304 to judge whether or not the user data (2048 bytes) stored in the user data memory 1303 is AV data. When the user data is not AV data, the microprocessor 1310 controls the interface control circuit 1305 to output the user data (2048 bytes). When the user data is AV data, the microprocessor 1310 instructs the user data replacing circuit 1306 to replace the user data (2048 bytes) with null data (2048 bytes) as a copyright protection processing and controls the interface control circuit 1305 to output the resultant digital data.

When the microprocessor 1310 judges that the input command is the data receiving device authentication request command (CHALLENGE_RECEIVER), it controls the encrypting/authentication circuit 1309 to generate authentication data and outputs the data to the controller 128 via the interface control circuit 1305.

When the microprocessor 1310 judges that the input command is the data receiving device confirmation request command (CONFIRM_RECEIVER), it controls the encrypting/authentication circuit 1309 to examine proof data input together with the command and judge whether or not the authentication is successful. The authentication results are held in the microprocessor 1310.

When the microprocessor 1310 judges that the input command is the data transmitting device proof request command (PROOF_SENDER), it controls the encrypting/authentication circuit 1309 to generate proof data from the authentication data input together with the command. The generated proof data is held in the microprocessor 1310.

When the microprocessor 1310 judges that the input command is the proof data request command (GET_PROOF_INFO), it controls the output of the proof data held therein to the controller 128 via the interface control circuit 1305.

When the microprocessor 1310 judges that the input command is the AV data read command (READ_AV), it controls the data reproduction circuit 1301 to read digital data of a specified sector number in the optical disk 121. The CGMS control data stored in the header region of the sector and user data stored in the user data region of the sector are stored in the CGMS control data memory 1302 and the user data memory 1303, respectively.

After the digital data of the sector is read, the microprocessor 1310 instructs the CGMS data identification circuit 1304 to Judge whether or not the user data (2048 bytes) stored in the user data memory 1303 is AV data. When the user data (2048 bytes) is not AV data or when the user data (2048 bytes) is AV data and the authentication with the data receiving device is successful, the microprocessor 1310 switches the data transmission unit to 2054 bytes, instructs the encrypting/authentication circuit 1309 to encrypt the digital data of a total of 2054 bytes composed of the CGMS control data (6 bytes) stored in the CGMS control data memory 1302 and the user data (2048 bytes) stored in the user data memory 1303, and controls the interface control circuit 1305 to output the results to the controller 128.

If the user data is AV data and the authentication with the data receiving device fails, the microprocessor 1310 instructs the user data replacing circuit 1306 to replace the digital data stored in the user data memory 1303 with null data and output the replaced data, as a copyright protection processing.

The description of the disk reproduction drive 125 is terminated.

Figure 17:
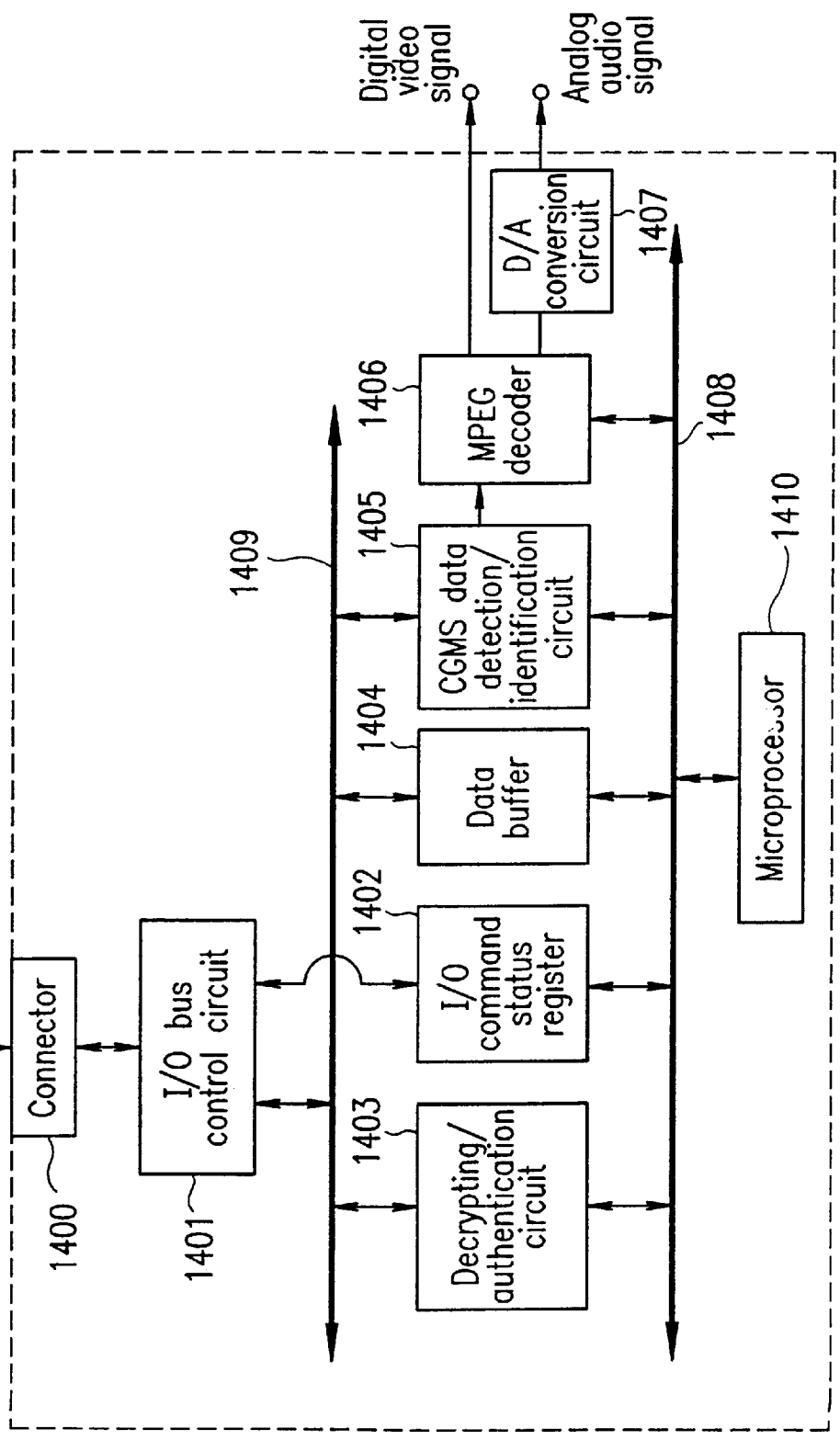
FIG. 17 is a block diagram of an AV signal processor 126.

Next, the configuration and the operation of the AV signal processor 126 will be described. FIG. 17 is a block diagram of the AV signal processor 126.

The AV signal processor 126 includes a connector 1400, an I/O bus control circuit 1401, an I/O command status register 1402, a decrypting/authentication circuit 1403, a data buffer 1404, a CGMS data detection/identification circuit 1405, an MPEG decoder 1406, a D/A conversion circuit 1407, a control bus 1408, an internal data bus 1409, and a microprocessor 1410.

The connector 1400 connects the AV signal processor 126 to the I/O bus 122. The I/O bus control circuit 1401 identifies a signal received from the I/O bus 122. When the input signal is data, the I/O bus control circuit 1401 sends the data to the data buffer 1404. When the input signal is a control signal such as an I/O command, the I/O bus control circuit 1401 sends the signal to the I/O command status register 1402. The I/O command status register 1402 stores commands sent from the controller 128 to the AV signal processor 126 and results of the processing by the AV signal processor 126.

The decrypting/authentication circuit 1403 performs generation of proof data, generation of authentication data, judgment of authentication results, generation of a decrypting key, and decrypting. These operations include a random number generation operation and an operation according to a decrypting function D(KEY, DATA).

The decrypting function D(KEY, DATA) decrypts encrypted data specified by DATA with an decrypting key specified by KEY. The encrypted data has been encrypted by the encrypting function E(KEY, DATA) which is an inverse function of the decrypting function D(KEY, DATA). The encrypting function E(KEY, DATA) is the same function as the encrypting function used in the encrypting by the encrypting/authentication circuit 1309 of the disk reproduction drive 125. Specifically, the equations EncryptData=E(KEY, Data) and Data=D(KEY, EncryptData) are established. Thus, data encrypted by the encrypting function E(KEY, DATA) can be decrypted by the decrypting function D(KEY, DATA).

The operations performed by the decrypting/authentication circuit 1403 will be described.

In the generation of proof data, the decrypting/authentication circuit 1403 generates proof data to prove that the AV signal processor 126 is a proper data receiving device for the data transmitting device when the AV signal processor 126 is the object for authentication. The AV signal processor 126 in this example proves itself as a proper data transmitting device by showing to the data transmitting device that it has the decrypting function D(KEY, DATA) and the decrypting key S. More specifically, the data transmitting device sends authentication data C1 obtained by converting data R1∥R2 composed of two random numbers R1 and R2 using the encrypting function E(KEY, DATA) and the encrypting key S to the AV signal processor 126. With this sending, the data transmitting device requires the AV signal processor 126 to calculate R2 from the authentication data C1 using the decrypting function D(KEY, DATA) and the decrypting key S which should be possessed by the AV signal processor 126 and send the results back to the data transmitting device as proof data K1. In the generation of the proof data, R2 is calculated by the microprocessor 1410 from the authentication data C1 sent from the data transmitting device so as to generate the proof data K1. Specifically, the data R1∥R2 is obtained by calculating D(S, C1) and then the data R2 is obtained as the proof data K1 by separating the data R1∥R2.

In the generation of authentication data, data R3∥R4 composed of two random numbers R3 and R4 is converted using a decrypting key S which previously held therein as a fixed key and the decrypting function D(KEY, DATA) thereby to obtain the authentication data. Specifically, authentication data C2 is obtained by calculating C2=D(S, R3∥R4).

The judgment of authentication results use an operation for judging whether or not the authentication of the data transmitting device by the AV signal processor 126 is successful. The authentication by the AV signal processor 126 whether or not the data transmitting device is a proper CGMS compatible transmitter is performed by judging whether or not the data transmitting device as the object for authentication has the encrypting function E(KEY, DATA) and the encrypting key S. For this judgment, the authentication data C2 generated in the generation of authentication data is output to the data transmitting device, requesting to send back the random number R4 included in the authentication data C2 as proof data K2. If the data transmitting device has the encrypting function E(KEY, DATA) and the encrypting key S, the random number R4 can be obtained from the authentication data C2 since the authentication data C2 has been obtained by converting the data R3∥R4 using the decrypting function D(KEY,DATA) and the decrypting key S. In the judgment of authentication results, therefore, it is judged whether or not the proof data K2 sent from the data transmitting device is equal to R4. If so, the authentication is successful, which is announced to the microprocessor 1410. If not, the authentication fails, which is also announced to the microprocessor 1410.

In the generation of the decrypting key, data R1∥R3 composed of the random numbers R1 and R3 previously obtained in the generation of authentication data and proof data is generated as the decrypting key, if the microprocessor 1410 instructs to do so. This decrypting key therefore has a different value each time the authentication is performed between the AV signal processor 126 and a data transmitting device.

In the decrypting operation, the input encrypted digital data is decrypted using the decrypting function D(KEY, DATA) and the data R1∥R3 as the decrypting key generated in the generation of the decrypting key. More specifically, the input encrypted data "EncryptData" is decrypted into decrypted data "Data" by operating Data=D(R1∥R3, EncryptData).

The data buffer 1404 temporarily stores the data. The CGMS data detection/identification circuit 1405 detects CGMS control data from digital data input therein and judges the data attribute from the data attribute code of the CGMS control data. When the input digital data is AV data, only user data is output to the MPEG decoder 1406. When the input digital data is not AV data, the digital data is not output to the MPEG decoder 1406.

The MPEG decoder 1406 performs predetermined processing to the input digital data which is an MPEG stream and converts the digital data into video digital data and audio digital data. The D/A conversion circuit 1407 converts the audio digital data sent from the MPEG decoder 1406 into audio analog data.

The control bus 1408 transmits instruction information sent from the microprocessor 1410 and processing result information output from the respective circuits. The internal data bus 1409 transmits digital data.

The microprocessor 1410 controls the entire AV signal processor 126 in accordance with commands received by the I/O command status register 1402. Hereinbelow, only commands in relation with the present invention, i.e., a data receiving device proof request I/O command (PROOF_RECEIVER), a proof data request I/O command (GET_PROOF_INFO), a data transmitting device authentication request I/O command (CHALLENGE_SENDER), a data transmitting device confirmation request I/O command (CONFIRM_SENDER), an AV data write request I/O command (WRITE_AV) will be described. The former four commands are performed in a series of authentication steps prior to the input of the AV data write request I/O command.

When the microprocessor 1410 judges that the command input into the I/O command status register 1402 is the data receiving device proof request I/O command (PROOF_RECEIVER), it controls the decrypting/authentication circuit 1403 to generate proof data based on the authentication data input together with the command and holds the proof data therein.

When the microprocessor 1410 judges that the command input into the I/O command status register 1402 is the proof data request I/O command (GET_PROOF_INFO), it outputs the proof data held therein to the controller 128 via the I/O bus control circuit 1401.

When the microprocessor 1410 judges that the command input into the I/O command status register 1402 is the data transmitting device authentication request I/O command (CHALLENGE_SENDER), it controls authentication data to be generated by the decrypting/authentication circuit 1403 and outputs to the controller 128 via the I/O bus control circuit 1401.

When the microprocessor 1410 judges that the command input into the I/O command status register 1402 is the data transmitting device confirmation request I/O command (CONFIRM_SENDER), it controls the decrypting/ authentication circuit 1403 to examine the proof data input together with the command and judge whether or not the authentication is successful. The authentication results are held therein.

When the microprocessor 1410 judges that the command input into the I/O command status register 1402 is the AV data write request I/O command (WRITE_AV), it performs no processing to the input digital data if the preceding authentication by the decrypting/authentication circuit 1403 has failed. If the authentication has been successful, the transmitted encrypted digital data is temporarily stored in the data buffer 1404, decrypted by the decrypting/ authentication circuit 1403, and the decrypted digital data is input into the MPEG decoder 1406 via the CGMS data detection/identification circuit 1405. If the CGMS data detection/identification circuit 1405 judges that the digital data is not AV data, the microprocessor 1410 terminates the processing of the digital data, that is, terminates the transmission of the digital data to the MPEG decoder 1406. If the CGMS data detection/identification circuit 1405 judges that the digital data is AV data, the digital data is input into the MPEG decoder 1406, where the digital data is decompressed in a predetermined manner and converted into video digital data and audio digital data. The converted audio digital data is then converted into an audio analog signal by the D/A conversion circuit 1407 to be audibly output via the speaker 126S. The converted video digital data is externally output as a video digital signal.

The description of the AV signal processor 126 is terminated here.

Next, the configuration and operation of the controller 128 will be described. The controller 128 includes a CPU 128C, a main memory 128M, and a bus I/F 128I. The controller 128 controls the retrieval of digital data from the optical disk 121 and the transmission of the digital data in accordance with external instructions received by the input section 124 under the control of the OS and a program for control of reproduction from the optical disk 121 loaded in the main memory 128M. The file management information in the optical disk 121 is retrieved at the initialization operation performed in loading the optical disk 121, and stored in the main memory 128M of the controller 128. The recording address of a file recorded in the optical disk 121 can be obtained from the file name by searching through the file management information in accordance with the ISO 13346 standard.

When the input section 124 receives an instruction for reproducing an AV data file in the optical disk 121, the controller 128 judges whether or not the specified file is a file storing AV data. More specifically, when the specified file is stored under a directory named DVD_VIDEO, the file is judged to be an AV data file. When the controller 128 judges that the specified file is not an AV data file, it warns the user that there occurs an error by a beeping sound and the like. When the controller 128 judges that the specified file is an AV data file, it starts control of the reproduction of the AV data file. More specifically, the controller 128 controls the authentication between the disk reproduction drive 125 and the AV signal processor 126, the retrieval of digital data in the AV data file from the disk reproduction drive 125, the transmission of the retrieved digital data to the AV signal processor 126, and the output of the data as images.

The description of the controller 128 and thus the description of the configuration of the information processing apparatus of Example 2 are terminated here.

Hereinbelow, the reproduction of data in the information recording medium by the information processing apparatus of Example 2 with the above configuration will be described. Herein, it is assumed that the file management information in the optical disk 121 is held in the main memory 128M of the controller 128 at the initialization operation performed when the optical disk 121 is mounted in the disk reproduction drive 125.

First, the transmission of data and commands performed among the controller 128, the disk reproduction drive 125, and the AV signal processor 126 at the reproduction of AV data will be described with reference to FIG. 18.

Figure 18:
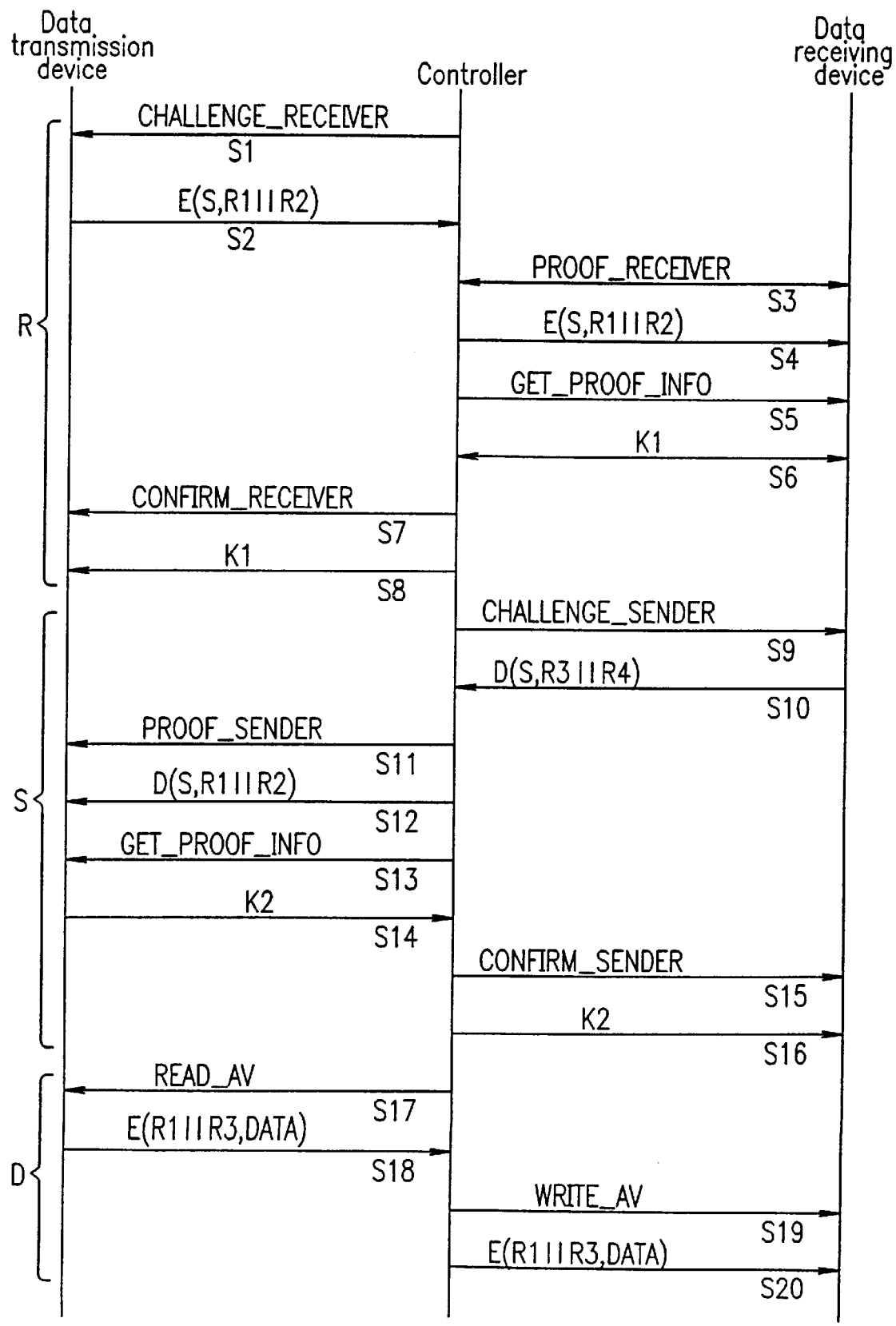
FIG. 18 is a view illustrating command interface in the reproduction control of an AV data file according to the present invention.

FIG. 18 is a data protocol illustrating a procedure of the transmission of AV data and commands among the controller 128, the disk reproduction drive 125, and the AV signal processor 126. Referring to FIG. 18, in phase R, the data receiving device is authenticated whether or not it is proper. In phase S, the data transmitting device is authenticated whether or not it is proper. In phase D, digital data is transmitted. Phase R includes steps S1 to S8, phase S includes steps S9 to S16, and phase D includes steps S17 to S20.

In the reproduction of AV data, phase R where the disk reproduction drive 125 authenticates the AV signal processor 126 is first performed. In phase R, the controller 128 sends the data receiving device authentication request command (CHALLENGE_RECEIVER) to the disk reproduction drive 125 as the data transmitting device (step S1).

Upon receipt of the data receiving device authentication request command (CHALLENGE_RECEIVER), the disk reproduction drive 125 sends back authentication data C1 generated by the encrypting/authentication circuit 1309 to the controller 128 (step S2). The authentication data C1 is generated from the random numbers R1 and R2, the encrypting key S, and the encrypting function E(KEY, DATA), so that the equation C1=E(S, R1||R2) is satisfied.

Upon receipt of the authentication data C1, the controller 128 sends the data receiving device proof request command (PROOF_RECEIVER) together with the authentication data C1 to the AV signal processor 126 (steps S3 and S4). Upon receipt of the data receiving device proof request command (PROOF_RECEIVER), the AV signal processor 126 instructs the decrypting/authentication circuit 1403 to calculate the authentication data C1 sent together with the command to obtain the random number R2 as proof data K1.

The controller 128 sends the proof data request command (GET_PROOF_INFO) to the AV signal processor 126 (step S5). The AV signal processor 126 sends back the proof data K1 to the controller 128 (step S6).

Upon receipt of the proof data K1, the controller 128 sends the data receiving device confirmation request command (CONFIRM_RECEIVER) together with the proof data K1 to the disk reproduction drive 125 (steps S7 and S8). Upon receipt of the data receiving device confirmation request command (CONFIRM_RECEIVER), the disk reproduction drive 125 instructs the encrypting/ authentication circuit 1309 to examine the proof data K1 sent together with the command, to judge whether or not the authentication of the AV signal processor 126 as the data receiving device is successful and hold the authentication results therein. More specifically, the encrypting/ authentication circuit 1309 judges whether or not the proof data K1 is equal to the random number R2. If so, the authentication of the data receiving device as a proper device is successful.

Then, phase S where the AV signal processor 126 authenticates the disk reproduction drive 125 is performed.

The controller 128 sends the data transmitting device authentication request command (CHALLENGE_SENDER) to the AV signal processor 126 (step S9). Upon receipt of the data transmitting device authentication request command (CHALLENGE_SENDER), the AV signal processor 126 sends back authentication data C2 generated by the decrypting/authentication circuit 1403 to the controller 128 (step S10). The authentication data C2 is generated from the random numbers R3 and R4, the decrypting key S, and the decrypting function D(KEY, DATA), so that the equation C2=D(S, R3∥R4) is satisfied.

Upon receipt of the authentication data C2, the controller 128 sends the data transmitting device proof request command (PROOF_SENDER) together with the authentication data C2 to the disk reproduction drive 125 (steps S11 and S12). Upon receipt of the data transmitting device proof request command (PROOF_SENDER), the disk reproduction drive 125 instructs the encrypting/authentication circuit 1309 to calculate the authentication data C2 sent together with the command to obtain the random number R4 as proof data K2.

The controller 128 sends the proof data request command (GET_PROOF_INFO) to the disk reproduction drive 125 (step S13). The disk reproduction drive 125 sends back the proof data K2 to the controller 128 (step S14).

Upon receipt of the proof data K2, the controller 128 sends the data transmitting device confirmation request command (CONFIRM_SENDER) together with the proof data K2 to the AV signal processor 126 (steps S15 and S16). Upon receipt of the data transmitting device confirmation request command (CONFIRM_SENDER), the AV signal processor 126 instructs the decrypting/authentication circuit 1403 to examine the proof data K2 sent together with the command, to judge whether or not the authentication of the disk reproduction drive 125 as the data transmitting device is successful and hold the authentication results therein. More specifically, the decrypting/authentication circuit 1403 judges whether or not the proof data K2 is equal to the random number R4. If so, the authentication of the data transmitting device as a proper device is successful.

Thereafter, phase D where AV data is transmitted is performed.

The controller 128 sends the AV data read request command (READ_AV) to the disk reproduction drive 125 (step S17). Upon receipt of the AV data read request command (READ_AV), the disk reproduction drive 125 reads data from a specified address in the optical disk 121, and stores CGMS control data in the CGMS control data memory 1302 and the user data in the user data memory 1303. The disk reproduction drive 125 judges whether or not the user data is AV data based on the CGMS control data. If the disk reproduction drive 125 judges that the user data is AV data and fails in confirming that the data receiving device is proper from the authentication results held therein, it replaces the digital data in the user data memory 1303 with null data and outputs the results. If the disk reproduction drive 125 judges that the user data is AV data and confirms that the data receiving device is proper from the authentication results held therein, it encryptes the user data (2048 bytes) and outputs encrypted digital data (2054 bytes) composed of the user data (2048 bytes) and the CGMS control data (6 bytes) as data transmission unit to the controller 128. The encrypting is performed by the encrypting/authentication circuit 1309 using data R1∥R3 composed of the random number R1 used at the generation of the authentication data C1 and the random number R3 constituting the authentication data C2 received from the AV signal processor 126 as the encrypting key. Specifically, AV data DATA is converted into encrypted AV data E(R1∥R3, DATA) and sent to the controller 128 (step S18).

Upon receipt of the digital data E(R1∥R3, DATA), the controller 128 sends the AV data write request command (WRITE_AV) together with the digital data to the AV signal processor 126 (steps S19 and S20).

Upon receipt of the AV data write request command (WRITE_AV), the AV signal processor 126 judges whether or not the data transmitting device is proper from the authentication results held therein. If it is not confirmed to be proper, the input digital data is not processed. If it is confirmed to proper, the input encrypted digital data is decrypted. The decrypting is performed by the decrypting/authentication circuit 1403 using data R1∥R3 composed of the random number R1 constituting the authentication data C1 received from the disk reproduction drive 125 and the random number R3 used at the generation of the authentication data C2 as the decrypting key. The decrypted digital data is subjected to predetermined processing in accordance with the MPEG method if the data is AV data, converted into a digital video signal and an analog audio signal, and externally output. The analog audio signal is output via the speaker 126S. The digital video signal is synthesized with graphic data by the video signal processor 127, converted into an analog video signal, and displayed on the display device 127D as images.

After the above process is repeated for a specified transmission length, the reproduction of the AV data file is completed. The description of the data protocol is terminated here.

Now, reproduction of an AV data file and copying of digital data by the information processing apparatus of Example 2 will be described with reference to FIGS. 19 to 21 and FIGS. 22 and 23, respectively.

Figure 19:
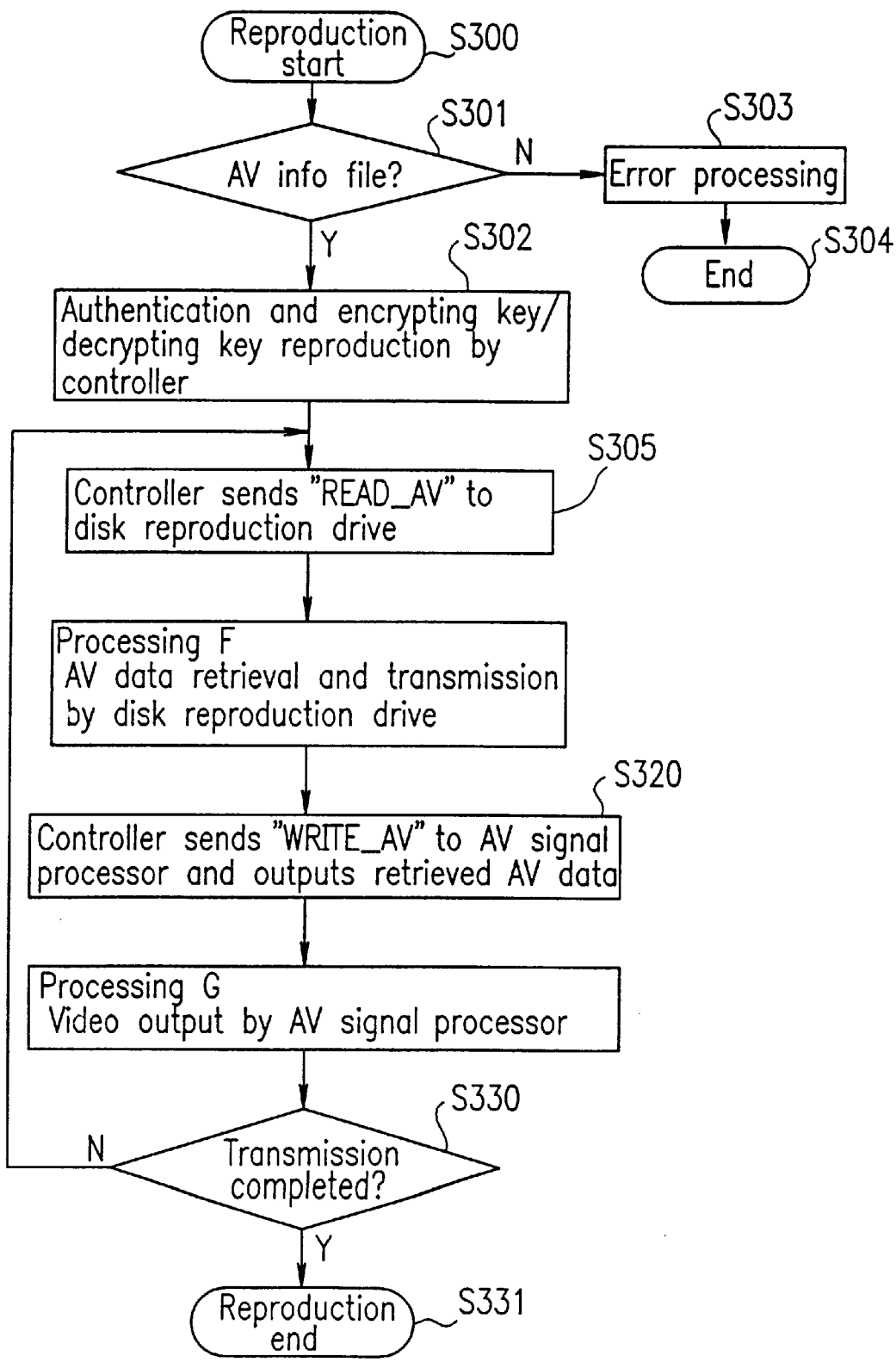
FIG. 19 is a flowchart showing a process for reproducing an AV data file in the optical disk 121.

First, the operation of the information processing apparatus performed when an AV data file is reproduced and output will be described. FIG. 19 is a flowchart showing the steps of reproducing an AV data file in the optical disk 121.

When the controller 128 receives a request for reproducing an AV data file (step S300), it judges whether or not the specified data file is an AV data file by examining the name of a directory under which the specified data file is stored (step S301). If the specified data file is judged to be an AV data file, the authentication procedure is performed and the encrypting key/decrypting keys are generated (step S302). If the specified file is not an AV data file, error processing is performed (step S303) and the reproduction is terminated (step S304).

After step S302, the controller 128 sends the AV data read command (READ_AV) to the disk reproduction drive 125 (step S305). Upon receipt of the command (READ_AV), the disk reproduction drive 125 performs processing F where the disk reproduction drive 125 retrieves and outputs the AV data.

Figure 20:
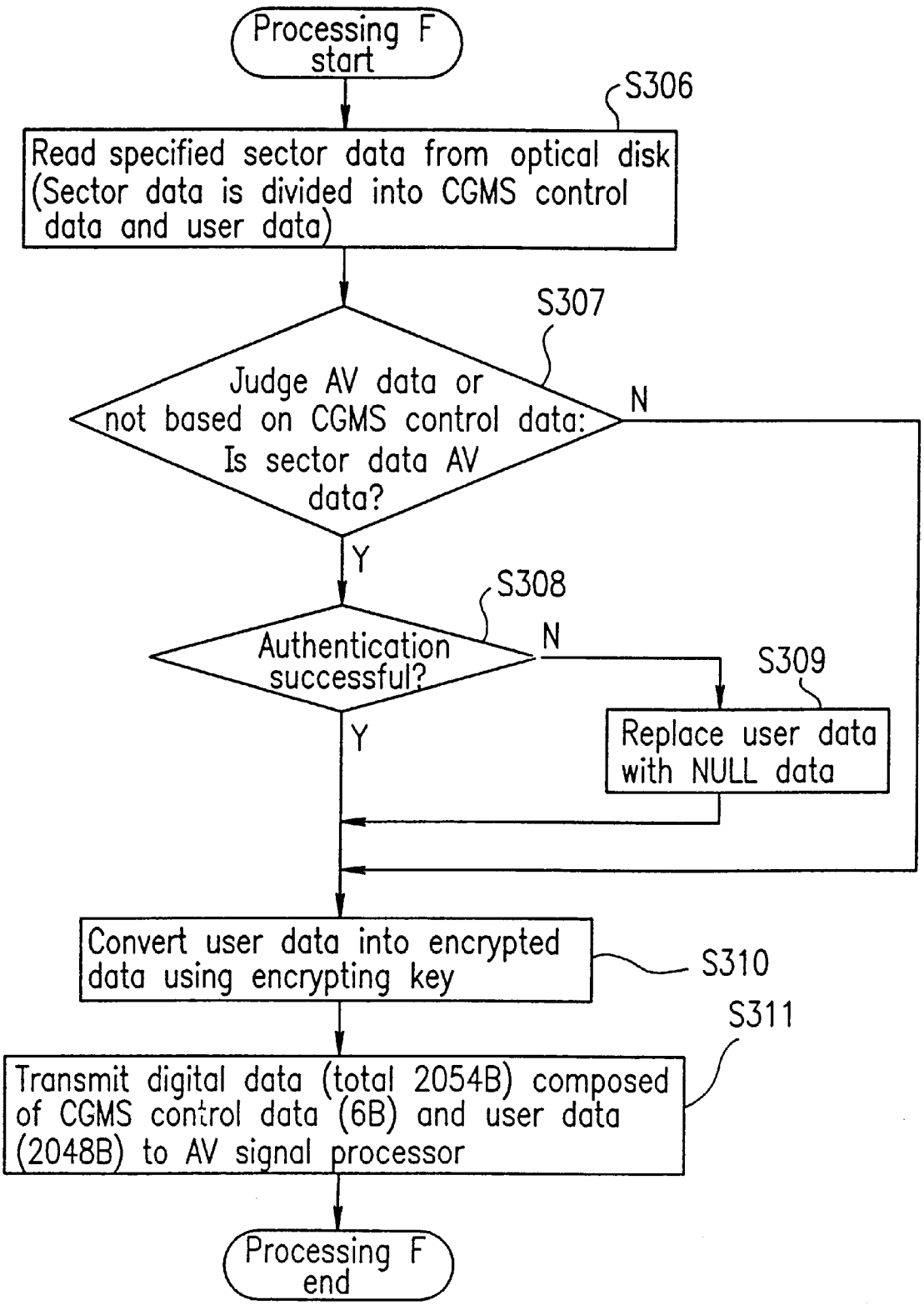
FIG. 20 is a flowchart showing the steps of processing F.

FIG. 20 is a flowchart showing the steps of processing F. Upon receipt of the AV data read command (READ_AV), the disk reproduction drive 125 reads data from a specified address in the optical disk 121 and stores CGMS control data in the CGMS control data memory 1302 and user data in the user data memory 1303 (step S306). The disk reproduction drive 125 judges whether or not the sector data is AV data based on the CGMS control data (step S307). If the sector data is not AV data, the process jumps to step S310. If the sector data is AV data, the process proceeds to step S308.

The disk reproduction drive 125 judges whether or not the authentication is successful based on the authentication results held therein (step S308). If successful, the user data is converted into encrypted data using the encrypting key (step S310). If not successful, the user data is converted into null data (step S309).

The sector data (2054 bytes) composed of the CGMS control data (6 bytes) and the user data (2048 bytes) as the data transmission unit is transmitted to the AV signal processor 126 (step S311). Processing F now terminates and the process proceeds to step S320 in FIG. 19.

The controller 128 sends the AV data write command (WRITE_AV) to the AV signal processor 126 to output the retrieved AV data to the I/O bus 122 (step S320). Then, processing G where the AV signal processor 126 processes the AV signal and outputs is performed.

Figure 21:
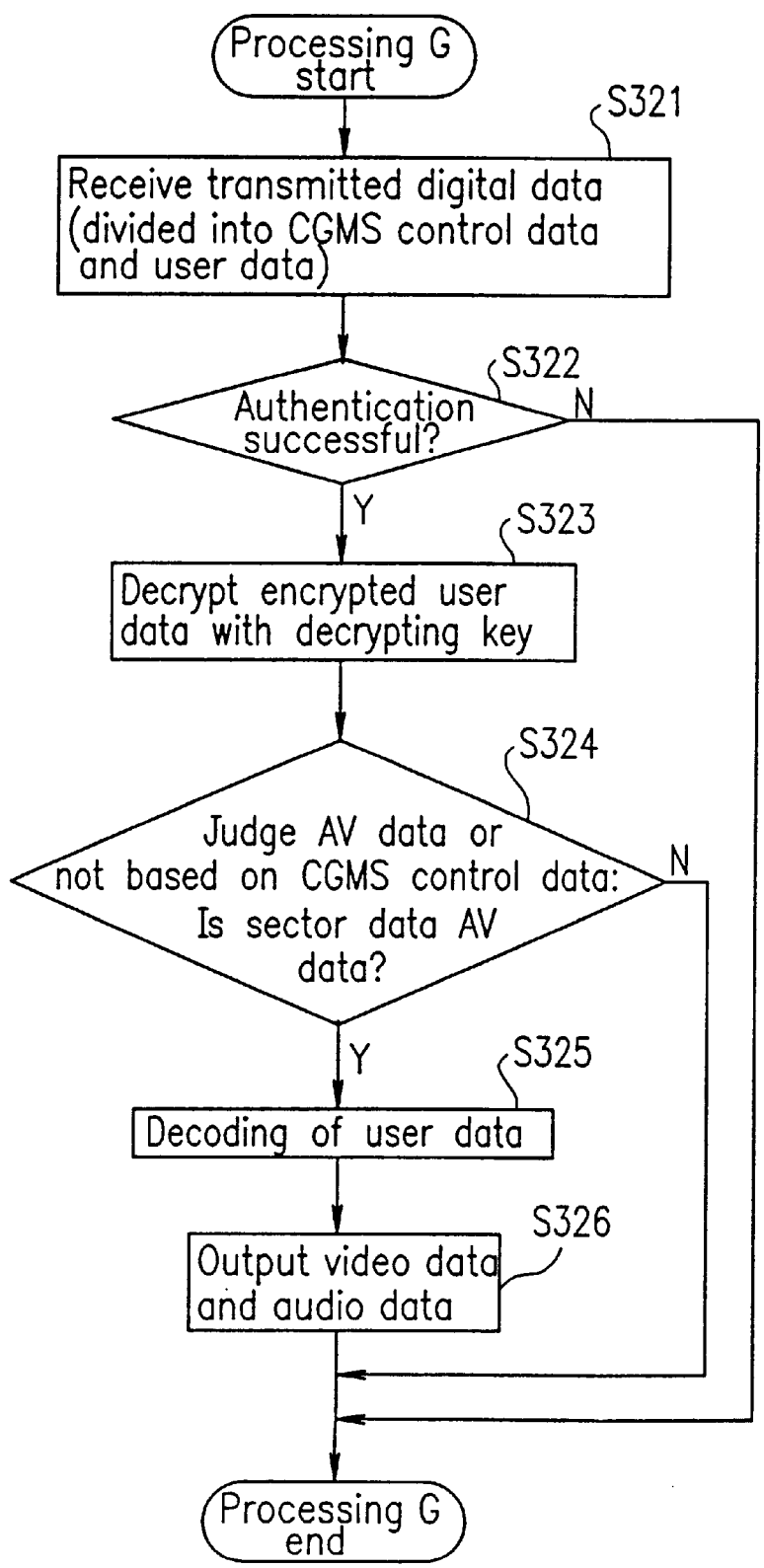
FIG. 21 is a flowchart showing the steps of processing G.

FIG. 21 is a flowchart showing the steps of processing G. Upon receipt of the AV data write command (WRITE_AV), the AV signal processor 126 receives the digital data and separates it into CGMS control data and user data (step S321). The AV signal processor 126 judges whether or not the authentication is successful based on the authentication results held therein (step S322). If successful, the encrypted user data is decrypted using the decrypting key (step S323). If not successful, processing G is terminated.

After step S323, whether or not the user data is AV data is judged based on the CGMS control data (step S324). If the user data is not AV data, processing G is terminated. If the user data is AV data, the user data is decoded (step S325) and output as video data and audio data (step S326). Processing G is then terminated.

The analog audio signal is output via the speaker 126S, while the digital video signal is synthesized with graphic data by the video signal processor 127, converted into an analog video signal, and visually displayed on the display device 127D as images.

After the above process is repeated for a specified transmission length, the reproduction of the AV data file is completed (steps S330 and S331).

The operation of the information processing apparatus performed when a file in the optical disk 121 is copied to the recording section 123 as a hard disk will be described.

Figure 22:
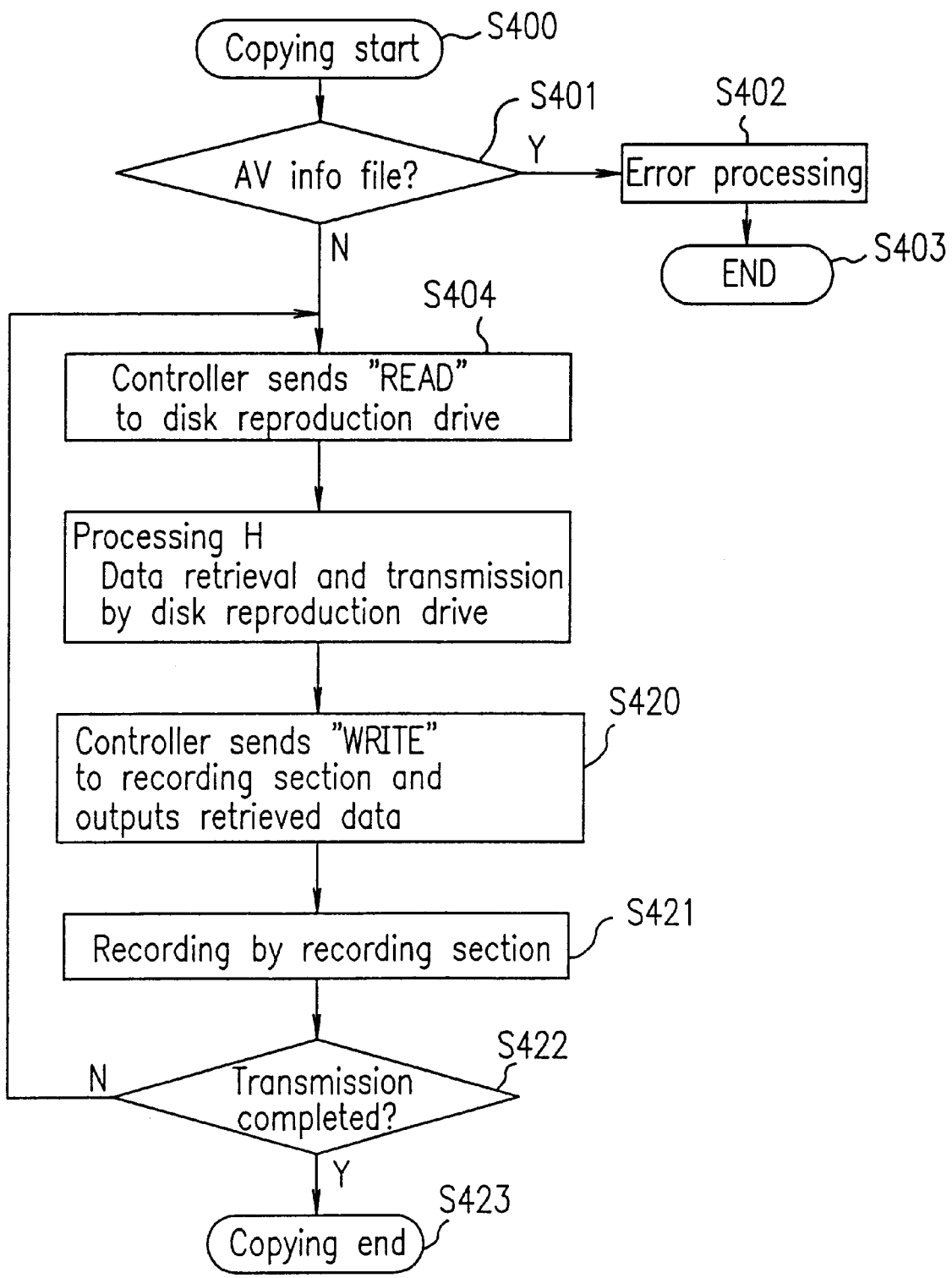
FIG. 22 is a flowchart showing a process for copying a file in the optical disk 121 to a recording section 123.

FIG. 22 is a flowchart showing the steps of copying a file in the optical disk 121 to the recording section 123. When the controller 128 receives a request for copying a file (S400), it judges whether or not the specified file is an AV data file by examining the name of a directory under which the specified file is stored (step S401).

If the controller 128 judges that the specified file is an AV data file, an error message is displayed for the user (step S402) and the process is terminated (step S403). If the controller 128 judges that the specified file is not an AV data file, it sends the data read command (READ) to the disk reproduction drive 125 (step S404).

Figure 23:
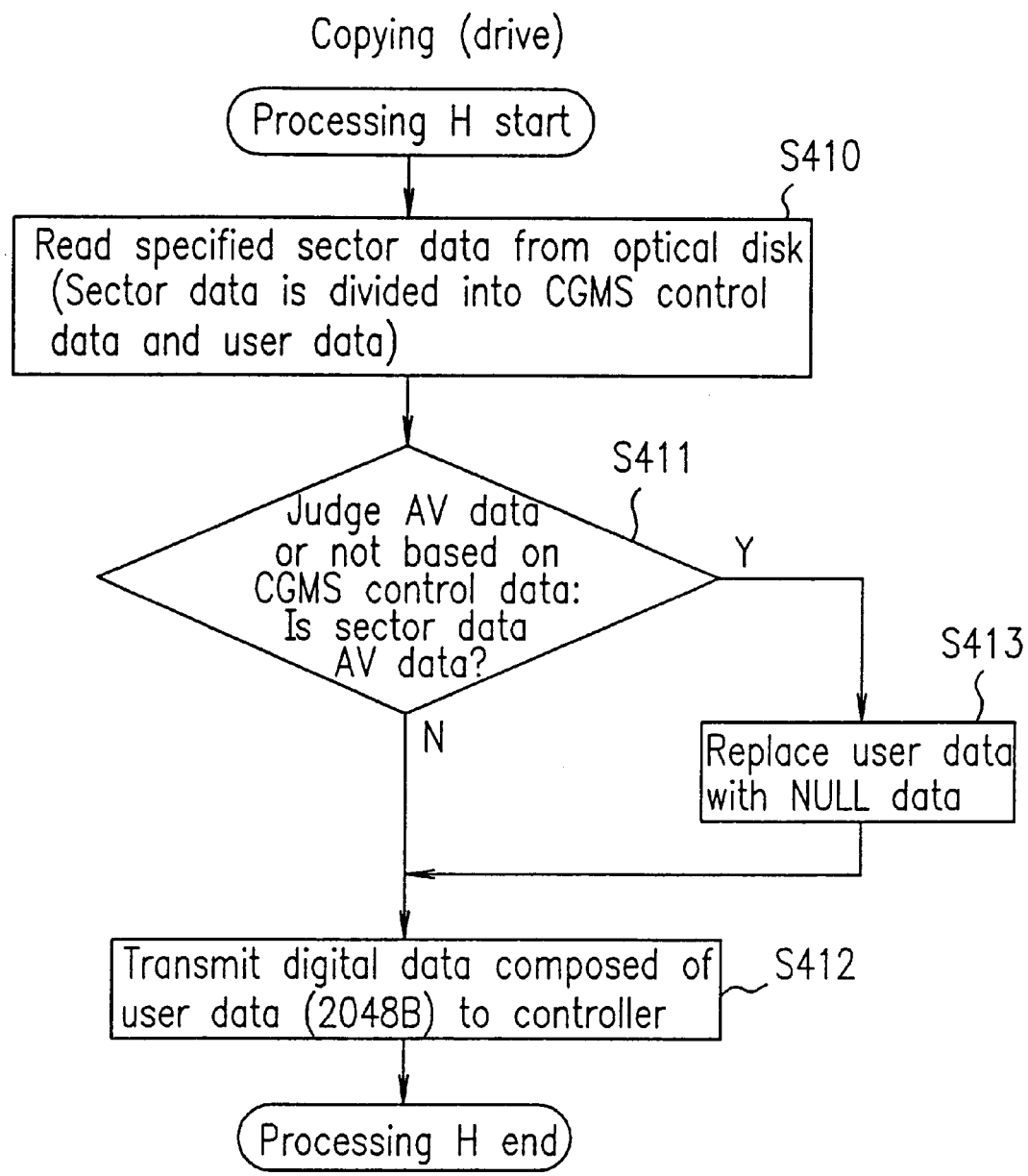
FIG. 23 is a flowchart showing the steps of processing H.

Then, processing H is performed. FIG. 23 is a flowchart showing the steps of processing H. Upon receipt of the data read command (READ), the disk reproduction drive 125 reads digital data from a specified address in the optical disk 121 and separates the sector data into CGMS control data and the user data (step S410).

The disk reproduction drive 125 judges whether or not the data attribute of the user data is AV data based on the CGMS control data (step S411). If the disk reproduction drive 125 judges that the data attribute of the user data is not AV data, it transmits the user data (2048 bytes) to the controller 128 (step S412). Reversely, if the disk reproduction drive 125 judges that the data attribute of the user data is AV data, it instructs the user data replacing circuit 1306 to replace the user data with null data and transmits the null data to the controller 128 (step S413). Processing H is then terminated, and the process proceeds to step S420 in FIG. 22.

At step S420, the controller 128 sends the write command (WRITE) to the recording section 123 and outputs the retrieved digital data. The transmitted digital data is written in the recording section 123 (step S421). After the above process is repeated for a specified transmission length, the copying of the file is completed (steps S422 and S423).

As described above, the data transmitting device (disk reproduction drive 125) of the information processing apparatus according to the present invention is provided with the control section which controls so that digital data is encrypted and output only when it is judged to be AV data and the data receiving device is authenticated to be a proper data receiving device. The data receiving device (the AV signal processor 126) according to the present invention has a function of decrypting transmitted encrypted digital data and converting the decrypted data into video data. The data receiving device also includes the authentication section which generates and outputs authentication data authenticating that the device has this function. The information processing apparatus including such data transmitting device and data receiving device according to the present invention is therefore provided with a function of prohibiting AV data from being output to devices other than a proper data receiving device for video reproduction.

With the above configuration, the copyright of AV data can be protected even if the AV data retrieved in response to the AV data read request command (READ_AV) is left in the main memory 128M of the controller 128 without being transmitted to the AV signal processor 126 due to an error in a reproduction control program loaded in the controller 128, for example. This is because the data stored in the main memory 128M has been encrypted, and thus not only reproduction but also change and modification of the data are not possible if the data is secondarily stored in a hard disk and the like.

In the encrypting and decrypting described above, the encrypting key and the decrypting key are generated based on the authentication data which is different for each authentication. This makes it possible to encrypt the AV data to be transmitted using the encrypting key which is different for each authentication. Therefore, even if one encrypting key is known, encrypting in subsequent AV data transmission at a different authentication timing remains effective.

In the encrypting and decrypting, the encrypting key and the decrypting key are generated from both the first authentication data which is generated by the data transmitting device and varies with authentication and the second authentication data which is generated by the data receiving device and varies with authentication. Therefore, AV data encrypted only when both the data transmitting device and the data receiving device are proper can be decrypted. This ensures transmission of AV data with higher security.

The reason why the data transmission with high security is realized according to the present invention will be described by exemplifying an erroneous operation which may occur when the encrypting key is generated based on only one of the data transmitting and receiving devices.

Assume that the encrypting key and the decrypting key are generated based on only the data receiving device. In this case, the data receiving device transmits the encrypting key for encrypting AV data to the data transmitting device before receiving encrypted AV data. The data transmitting device encrypts the AV data using the transmitted encrypting key. The data receiving device decrypts the encrypted AV data using the decrypting key corresponding to the encrypting key to reproduce the data as images.

If a set of the encrypting key transmitted from the data transmitting device and a method for decrypting data encrypted with the encrypting key are known, an improper data receiving device made based on the encrypted information may succeed in obtaining encrypted AV data which can be decrypted by the already-known decrypting method by sending the encrypting key having the decrypted code to the proper data transmitting device.

According to the present invention, since the generation of the encrypting key and decrypting key is associated with both the data transmitting device and the data receiving device, and the encrypting key is not generated based on only a value output from the data receiving device, the erroneous operation as described above can be avoided.

According to the present invention, whether or not digital data recorded in the information recording medium includes AV data is judged by examining the data attribute flag in the header region of each sector. This allows for delicate protection of AV data per sector.

In this example, the data transmission was performed in phase D after the completion of phases R and S. If a lower level of security where the encrypting key is generated from the authentication of only one device is allowable, only one of phases R and S may be performed before proceeding to phase D. According to the protocol shown in FIG. 18, the controller is interposed between the data transmitting device and the data receiving device in phases R and S. Alternatively, the data transmitting device and the data receiving device may be connected via an exclusive signal line so that these devices can directly exchange authentication data.

In Example 2, the encrypting section and the decrypting section may be omitted if the erroneous operation that AV data is extracted during transmission is allowable. In this case, although the effect of higher security by encrypting is not obtained, the protection of AV data can be realized by a simpler configuration.

EXAMPLE 3

Figure 24:
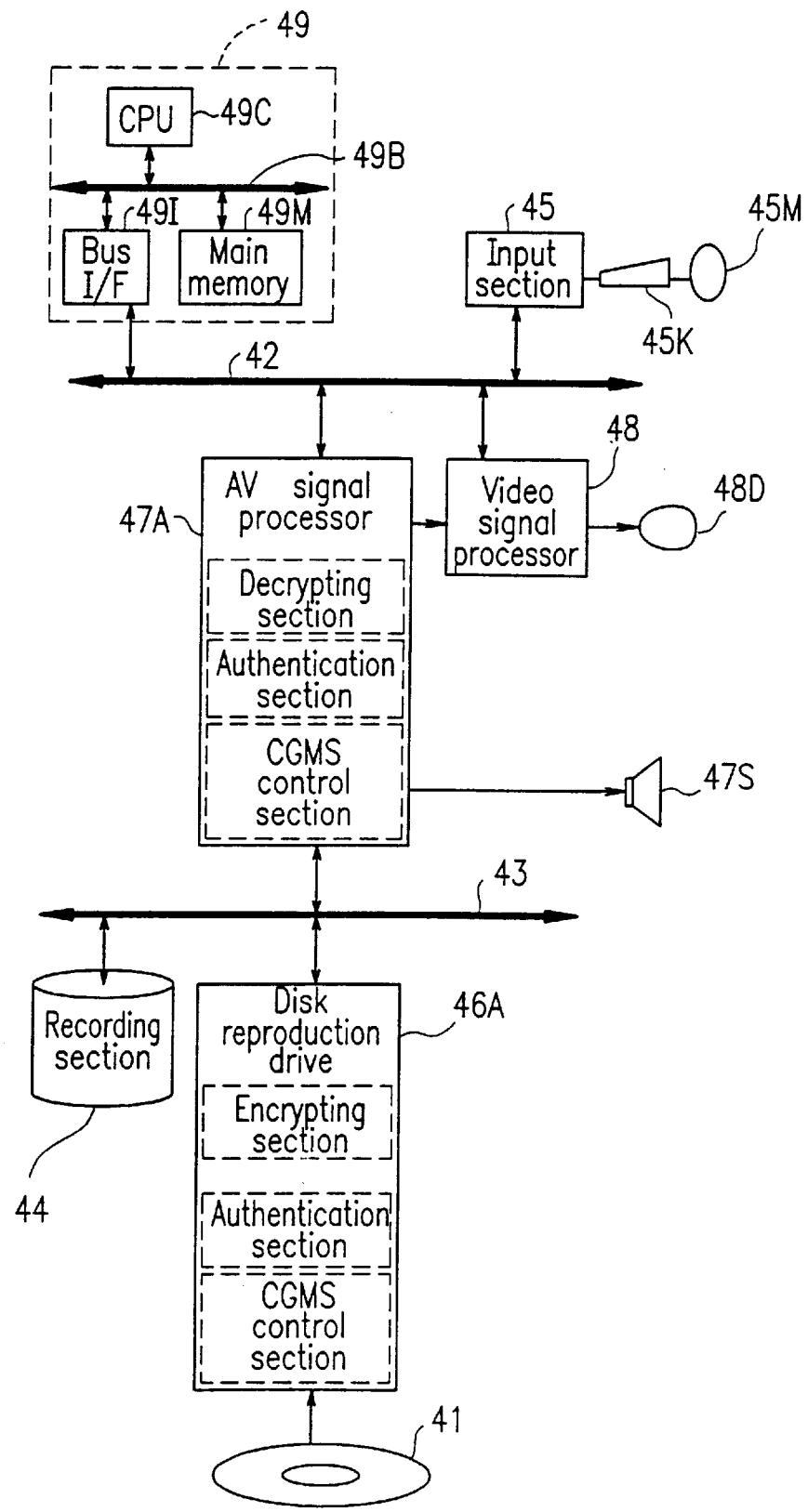
FIG. 24 is a block diagram of an information processing apparatus of Example 3 according to the present invention.

FIG. 24 is a block diagram of the information processing apparatus of Example 3 according to the present invention, which is a combination of Examples 1 and 2. More specifically, the encrypting of AV data described in Example 2 is incorporated in the information processing apparatus using the SCSI digital interface described in Example 1. The configuration of the information processing apparatus of Example 3 is therefore the same as that of the information processing apparatus of Example 1 except that a disk reproduction drive 46A and an AV signal processor 47A in this example include an encrypting section and a decrypting section, respectively. In Example 1, the authentication was realized using the SCSI authentication commands. In Example 3, however, the authentication by the encrypting/authentication circuit and the decrypting/authentication circuit described in Example 2 is employed.

The disk reproduction drive 46A encrypts AV data and outputs the encrypted AV data. The AV signal processor 47A decrypts the encrypted AV data and outputs the decrypted AV data to the video signal processor 48. Since the AV data output to the SCSI bus 43 has been encrypted, it can be protected with a higher level of security.

Figure 25:
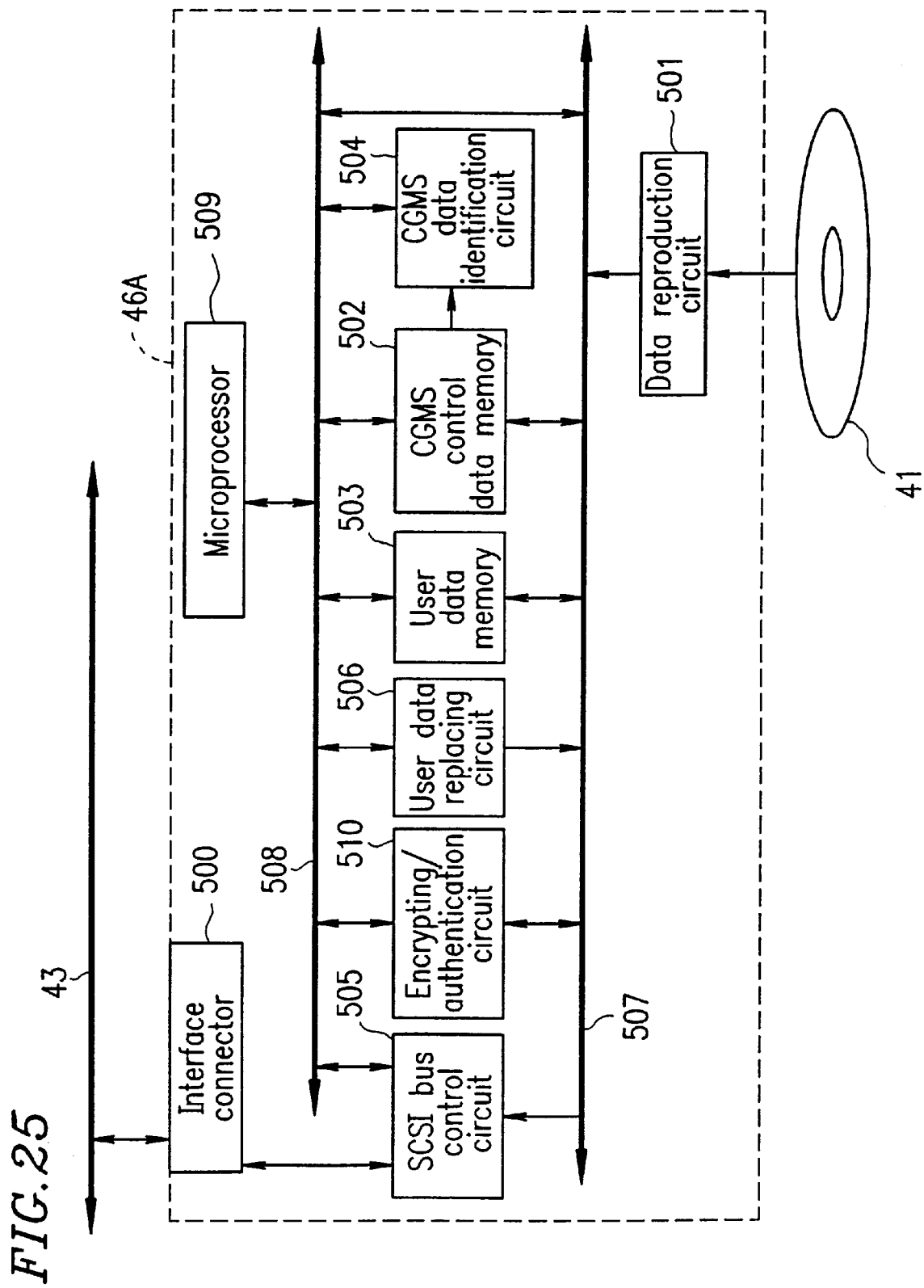
FIG. 25 is a block diagram of a disk reproduction drive 46A.

FIG. 25 is a block diagram of the disk reproduction drive 46A, which has the same configuration as the disk reproduction drive 46 in Example 1 except that an encrypting/authentication circuit 510 is provided.

Figure 26:
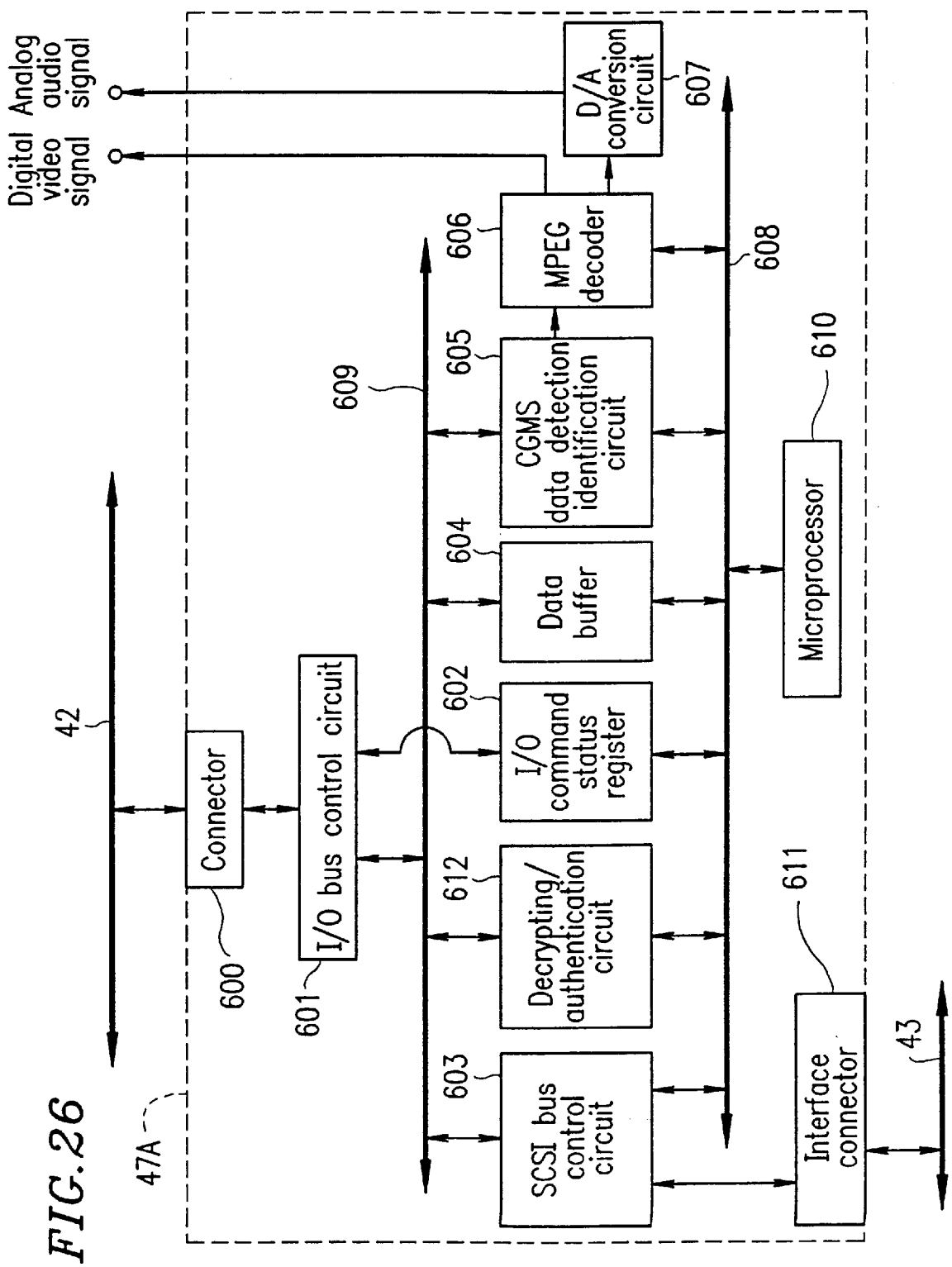
FIG. 26 is a block diagram of an AV signal processor 47A.

FIG. 26 is a block diagram of the AV signal processor 47A, which has the same configuration as the AV signal processor 47 in Example 1 except that a decrypting/authentication circuit 612 is provided.

Figure 27:
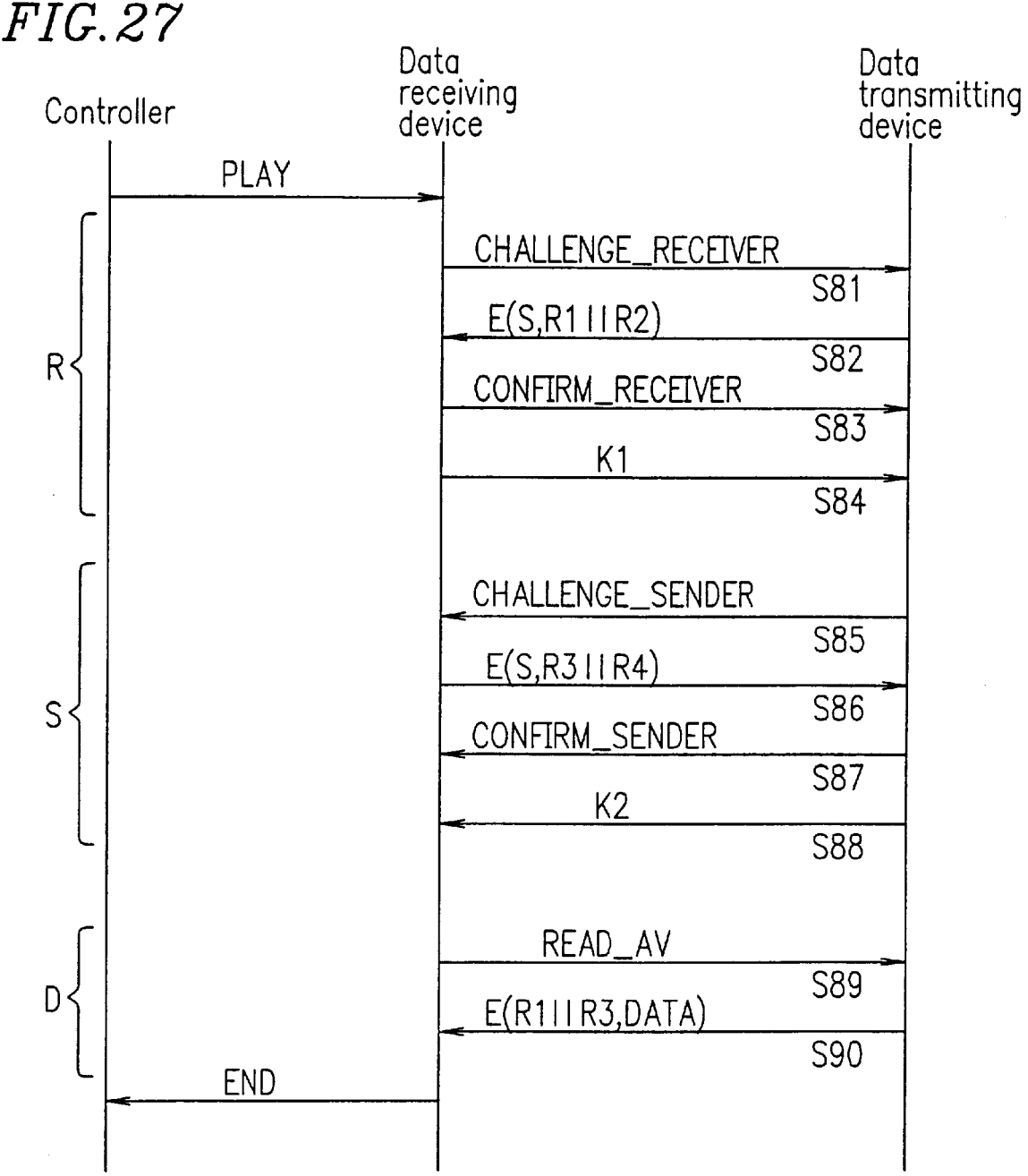
FIG. 27 is a view illustrating command interface in AV reproduction.

FIG. 27 shows a data protocol in the reproduction of AV data in this example. As shown in FIG. 27, data is directly exchanged between the disk reproduction drive 46A as the data transmitting device and the AV signal processor 47A as the data receiving device after the controller 49 sends a reproduction request command (PLAY) to the data receiving device until the controller 49 receives a reproduction end message (END) from the data receiving device.

In FIG. 27, phases R, S, and D correspond to those shown in FIG. 18. Phase R starts with the command PLAY sent from the controller 49 to the AV signal processor 47A. Phase D ends with the message END sent from the AV signal processor 47A to the controller 49. Phase R includes steps S81 to S84, phase S includes steps S85 to S88, and phase D includes steps S89 and S90. Part of the protocol shown in FIG. 18 is omitted in the protocol shown in FIG. 27. The authentication, encrypting, and decrypting described in Example 2 may be used in Example 3.

In the information processing apparatus of Example 3, since AV data transmitted through the SCSI bus 43 has been encrypted, the AV data can be protected with a higher level of security compared with the case of Example 1 where non-encrypted data is transmitted.

In the information recording medium in the above examples, whether or not data in each sector is AV data is indicated by the data attribute code in the header region of the sector. Another method of indicating whether or not the sector data is AV data may be employed as long as it is discernible by the disk reproduction drive. For example, map information indicating the sector where AV data has been stored may be stored in the lead-in region of the information recording medium. Hereinbelow, such an information recording medium will be described.

Figure 28:
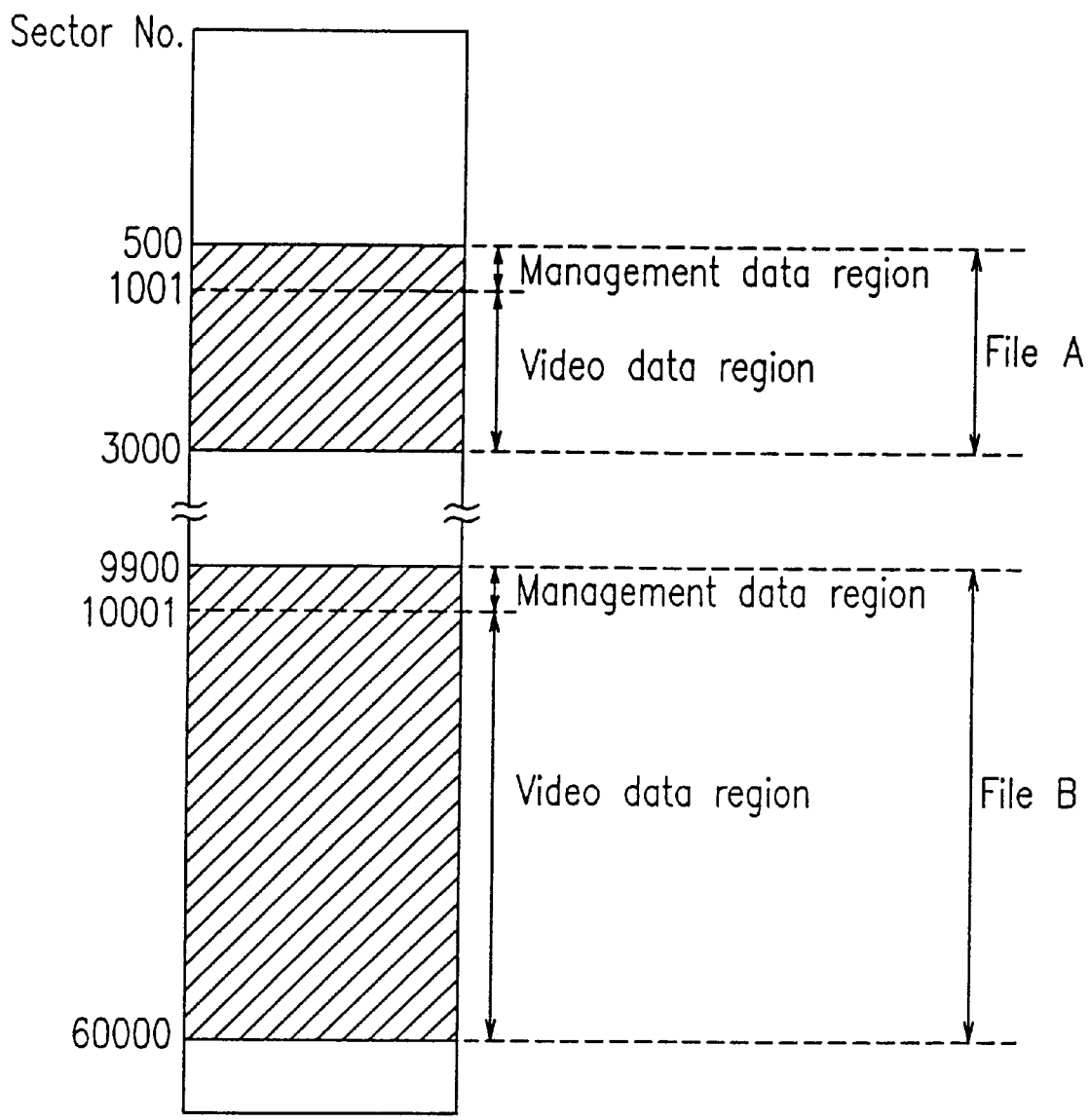
FIG. 28 is a view illustrating an example of data held by the information recording medium according to the present invention.
Figure 30:
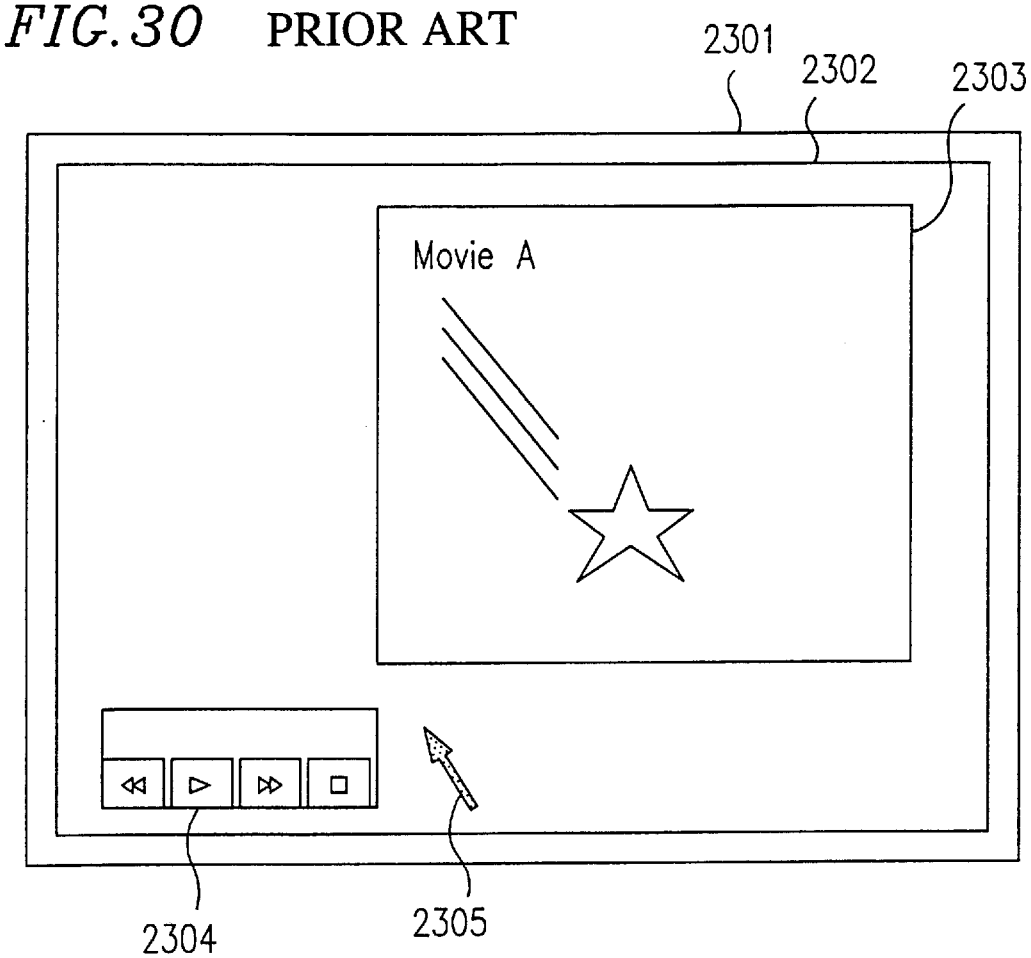
FIG. 30 is a front view of a display device.

FIG. 28 shows an exemplified configuration of data file storage in the information recording medium. Data is managed per sector. Each sector has a sector number as a sector address. In FIG. 28, sectors 500 to 1000 are used as a management data region where data other than video data of file A (e.g., an advance billing of movie A) is stored. Sectors 1001 to 3000 are used as a video data region where video data of file A is stored. Sectors 9900 to 10000 are used as a management data region for file B (e.g., movie A itself). Sectors 10001 to 60000 are used as a video data region for file B. In the case shown in FIG. 28, copying of file B is often prohibited under the copyright protection while copying of file A is permitted.

FIG. 29 shows an example of map information stored in the lead-in region of the information recording medium. The map information includes the start sector number, the number of sectors, and the CGMS code. The CGMS code indicates either "copying permitted" or "copying prohibited". By storing map information as shown in FIG. 29 in the lead-in region 2205 shown in FIG. 1, the map information can be loaded in the disk reproduction drive before the start of data reproduction because the lead-in region 2205 is reproduced in advance to the data recording region. As a result, the disk reproduction drive which has received a command to retrieve data can judge whether or not the data is AV data without actually retrieving the data. More specifically, when the user is accessing "copying prohibited" data, a relevant error message can be promptly displayed. Also, since the judgment whether or not data is AV data is not necessary for each sector, video data can be output without delay. In order to utilize such map information, the disk reproduction drive is required to have a memory for holding the map information and a control section for controlling the output of AV data and the like based on the retrieved map information.

In the above examples, the optical disk was used as the information recording medium storing digital data including AV data. Other distribution and recording media of digital data may also be used as long as the positions of AV data in the media are discernible. For example, magneto-optical disks having a sector structure can be used.

A transmission medium, for example, radio such as broadcasting wave and a cable such as a communication line may also be used, in place of the information recording medium such as the optical disk, as long as the positions of AV data in the medium are discernible. The "transmission medium" as used herein refers to a medium which is typically defined as a physical layer of OSI (open systems interconnection) and ensures the transmission of digital data. Examples of such a transmission medium include telephone lines, internet LANs, and satellite broadcasting systems. Digital data transmitted via a transmission medium by being divided into units called packets. Each packet includes a header region and a data region which have configurations similar to the header region and the data region described in Example 1. The present invention is therefore applicable to such a transmission medium by placing an identification flag indicating whether or not data stored in the data region is AV data in the header region of each packet. It should be understood that the data transmitting device in this case is not a disk drive but a receiver for receiving the transmission medium.

In the case of digital satellite broadcasting utilizing MPEG transport streams, one of a plurality of MPEG streams transmitted is used as a management information stream for transmitting information for managing the remaining plurality of MPEG streams. The present invention may be effected by storing in the management information stream data attribute information indicating whether or not the remaining streams include AV data and CGMS data.

In the above examples, digital data obtained by compressing original data by the MPEG2 method was used as the video data. Other compression method of the video data, such as an MPEG4 method, may also be employed.

In the above examples, the video signal processor and the AV signal processor may also be card-type devices which have a connection to the I/O bus and can be detachably mounted in the information processing apparatus. Such an AV signal processor is generally called an AV signal processing card or an AV decoder card, and such a video signal processor is generally called a video card.

In the above examples, the video signal processor has the graphic generation function and the video synthesizing function. Alternatively, the video synthesizing function may be separated from this device as an external video synthesizer.

In the above examples, the DVD was used as the information recording medium. Other information recording media such as CD-ROMs, magnetic disks, and magnetooptical disks may also be used as long as they can manage the data recording region per sector and manage the sectors in the filing system.

In the above examples, the HDD was used as the recording section. Other means such as magneto-optical disks, magnetic tapes, and phase-change optical disks, may also be used as long as digital data can be recorded.

In the above examples, the judgment whether or not a file is an AV data file in the level of the filing system by the controller was performed by examining whether or not the file is stored under a DVD directory. The name of the directory where AV data is stored defined by the name rule and the judgment whether or not a file is an AV data file are not restricted to the above. A name rule for AV data files may be defined. For example, the extenders of the names of AV data files may be unified so that AV data files can be identified from the unified extender.

In the above examples, digital data in the user data region of each sector was replaced with null data as the copyright protection processing when the disk reproduction drive received the SCSI data read command (READ) requesting to output the digital data which was AV data. Any other copyright protection processing may be performed as long as it prohibits output of digital data which is video information. For example, an error code may be output instead of digital data.

In the above examples, the AV signal processor had an independent configuration. Any other configuration may also be used as long as it is an MPEG decoder which performs the CGMS control. For example, the AV signal processor may be realized by implementing a DCT circuit and a CGMS control section together with a software for MPEG soft decoding and the like.

As the digital interface, the SCSI was used in Examples 1 and 3 and the ATAPI was used in Example 2. Other interfaces may also be used as long as they can transmit AV digital data and connect a plurality of devices. For example, a digital interface defined in the IEEE P1394 may be used.

INDUSTRIAL APPLICABILITY

Thus, according to the present invention, a data transmitting device, a data transmitting method, a data receiving device, and an information processing apparatus where illegal copying of AV data to a memory such as a HDD can be prevented to protect the copyright of authors of applications.

According to the present invention, a data transmitting device, a data transmitting method, a data receiving device, and an information processing apparatus where AV data is encrypted before being output to a digital interface are provided. By encrypting, the AV data is protected even if it is externally extracted.

We claim:

1. A data transmitting device for selectively transmitting a first type of digital data representing video information and a second type of digital data representing non-video information to one of a plurality of different data receiving devices via a digital interface, the data transmitting device comprising:

a judgment section for judging whether digital data to be transmitted is the first type of digital data or the second type of digital data;

an authentication section for authenticating whether the one of the plurality of data receiving devices is a proper data receiving device to receive the digital data, a control section for controlling transmission of the digital data to the digital interface in accordance with the judging result and the authentication result so that the digital data is transmitted when the digital data is the first type and responsive to the authentication section determining that the one of the plurality of data receiving devices is the proper data receiving device, and the digital data is transmitted to the one of the plurality of data receiving device when the digital data is the second type independent of authenticating performed by said authentication section.

2. A data transmitting device according to claim 1, wherein the authentication of the one of the plurality of different data receiving devices has been successful when the one of the plurality of different data receiving devices is functioning properly in handling the first type of digital data.

3. A data transmitting device according to claim 1, wherein the authentication section authenticates the data receiving section, using authentication data which varies each time the authentication data is generated.

4. A data transmitting device according to claim 1, wherein the authentication section performs a mutual authentication between the data transmitting device and the data receiving device.

5. A data transmitting device according to claim 1, wherein the digital data to be transmitted and identification data identifying a type of the digital data to be transmitted are stored in an information recording medium, the judgment section judges whether digital data to be transmitted is the first type of digital data or the second type of digital data in accordance with the identification data.

6. A data transmitting device according to claim 1, further comprising:

an encrypting section for encrypting the digital data to be transmitted when the digital data to be transmitted is the first type of digital data, so that the encrypted digital data may be output to the digital interface.

7. A data transmitting device according to claim 1, wherein, in a case where the digital data to be transmitted is the first type of digital data, the control section permits the output of identification data identifying a type of the digital data as well as the digital data to the digital interface.

8. A data transmitting method for selectively transmitting a first type of digital data representing video information and a second type of digital data representing non-video information to one of a plurality of different data receiving devices via a digital interfaces, the data transmitting method comprising the steps of:

judging whether digital data to be transmitted is the first type of digital data or the second type of digital data;

authenticating whether the one of the plurality of data receiving devices is a proper data receiving device to receive the digital data; and controlling the output of the digital data to the digital interface in accordance with the judging result and the authentication result so that the digital data is transmitted when the digital data is the first type and responsive to the authentication section determining that the one of the plurality of data receiving devices is the proper data receiving device, and the digital data is transmitted to the one of the plurality of data receiving device when the digital data is the second type independent of authenticating performed by said authentication section.

9. A data transmitting device according to claim 1, wherein said plurality of different data receiving devices includes a first device to which transmission of the digital data is allowed and a second device to which transmission of the digital data is prohibited.

10. A data transmitting method according to claim 8, wherein said plurality of different data receiving devices includes a first device to which transmission of the digital data is allowed and a second device to which transmission of the digital data is prohibited.

11. A data transmitting device according to claim 1, wherein authenticating is performed so as to observe copyright protection of the digital data.

12. A data transmitting method according to claim 8, wherein authenticating is performed so as to observe copyright protection of the digital data.

* * * * *